US012754347B2

(12) United States Patent
Dove

(10) Patent No.: US 12,754,347 B2
(45) Date of Patent: Oct. 6, 2026

(54) VOLUMETRIC, NONLOCAL METASURFACE DEVICE THAT MAPS CERTAIN INCIDENT ELECTROMAGNETIC WAVES TO AT LEAST ONE SPOT ON A SURFACE OF THE DEVICE, AND METHODS OF MANUFACTURE

(71) Applicant: Charles Alexander Dove, Berkeley, CA (US)

(72) Inventor: Charles Alexander Dove, Berkeley, CA (US)

(73) Assignee: Charles Dove, Berkeley, CA (US)

( * ) Notice: Subject to any disclaimer, the term of this patent is extended or adjusted under 35 U.S.C. 154(b) by 267 days.

(21) Appl. No.: 18/600,167

(22) Filed: Mar. 8, 2024

(65) Prior Publication Data

US 2024/0302567 A1 Sep. 12, 2024

Related U.S. Application Data

(60) Provisional application No. 63/450,976, filed on Mar. 9, 2023.

(51) Int. Cl.

| | |
|---|---|
| ***G02B 1/00*** | (2006.01) |
| ***B82Y 20/00*** | (2011.01) |
| ***B82Y 40/00*** | (2011.01) |
| ***G02B 5/00*** | (2006.01) |
| ***G02B 26/08*** | (2006.01) |
| ***G02B 27/00*** | (2006.01) |
| ***G02F 1/01*** | (2006.01) |

(52) U.S. Cl.

CPC .............. *G02B 1/002* (2013.01); *B82Y 20/00* (2013.01); *B82Y 40/00* (2013.01); *G02B 5/00* (2013.01); *G02B 26/0875* (2013.01); *G02B 27/00* (2013.01); *G02F 1/011* (2013.01)

(58) Field of Classification Search

CPC .... B82Y 20/00; B82Y 40/00; G02B 26/0875; G02B 1/002; G02F 1/011

See application file for complete search history.

(56) References Cited

U.S. PATENT DOCUMENTS

| | | | | |
|---|---|---|---|---|
| 2011/0158575 | A1 | 6/2011 | Craighead | |
| 2018/0292644 | A1* | 10/2018 | Kamali | G02B 3/00 |
| 2020/0004201 | A1 | 1/2020 | Smith | |
| 2020/0183050 | A1* | 6/2020 | Lin | G02B 3/00 |
| 2022/0102863 | A1* | 3/2022 | Shekhar | H01Q 9/0485 |
| 2022/0381950 | A1 | 12/2022 | Alù | |
| 2023/0384481 | A1* | 11/2023 | Lai | G02B 3/02 |

OTHER PUBLICATIONS

PCT International Search Report and Written Opinion; Application No. PCT/US24/19243 Charles Dove, International filing date of Mar. 8, 2024, date of mailing Jun. 14, 2024, 2 pages.

* cited by examiner

*Primary Examiner* — Jia X Pan

(74) *Attorney, Agent, or Firm* — Patent Law Works, LLP

(57) ABSTRACT

A novel metasurface and method of manufacture are disclosed. The metasurface of the present disclosure is a volumetric and nonlocal metasurface that maps incident electromagnetic waves to a spot on the bottom of the metasurface. The metasurface defines a complex of structural optical properties to manipulate the electromagnetic wave nonlocally. The metasurface is composed of 2 more materials each having a different refractive index.

33 Claims, 55 Drawing Sheets

VOLUMETRIC, NONLOCAL METASURFACE DEVICE THAT MAPS CERTAIN INCIDENT ELECTROMAGNETIC WAVES TO AT LEAST ONE SPOT ON A SURFACE OF THE DEVICE, AND METHODS OF MANUFACTURE

CROSS-REFERENCE TO RELATED APPLICATION

This application claims the benefit of and priority to U.S. Provisional App. No. 63/450,976, titled "Volumetric, Nonlocal Metasurface Device Mapping Certain Incident Electromagnetic Waves To At Least One Spot on A Surface of The Device, And Several Devices and Systems Using Same," filed Mar. 9, 2023, which is incorporated herein by reference in its entirety.

FIELD OF THE INVENTION

The present disclosure relates to metasurfaces which manipulate electromagnetic waves. More particularly, present disclosure relates to optics and imaging systems including metasurfaces. Still more particularly, the present disclosure relates to volumetric, nonlocal metasurface devices that map incident electromagnetic waves to a spot on a surface of the device.

BACKGROUND OF THE DISCLOSURE

Optical metasurfaces are a recently developed format of optical device, consisting of a surface of patterned material or materials, either on, in, underneath, or not on a substrate, either with or without a surrounding medium. These material (s), their properties, their refractive indices, their relationships, their patterns, and/or their configuration can be designed such that the metasurface performs an optical function, e.g., lensing, on electromagnetic waves traveling through it. Certain optical functions, such as those requiring the nonlocal processing of incident electromagnetic waves, involve significant complexity to realize with a metasurface, and for this reason many such optical functions have yet to be realized in optical metasurfaces.

SUMMARY

This disclosure relates to a volumetric, nonlocal metasurface devices that map incident electromagnetic waves to a spot on a surface of the device, methods of manufacture and use of the device.

According to one aspect of the subject matter described in this disclosure, a device for processing electromagnetic waves, the device includes a first metasurface having a first surface and a second surface, the first surface of the first metasurface receiving the electromagnetic waves, the first metasurface defining a complex of structural optical properties; the first metasurface nonlocally maps the electromagnetic waves at the first surface to a spot on the second surface; and wherein the first metasurface comprises a first material and a second material, the first material having a refraction index different than the second material.

In general, another aspect of the subject matter described in this disclosure includes a method includes selecting a substrate; depositing a layer of first material on the substrate; creating a defined pattern of the first material on the substrate; and encasing the defined pattern of the first material with a second material; and wherein the first material has a refraction index different than the second material, and the encasing forms a volumetric metasurface that nonlocally maps electromagnetic waves at a first surface of the volumetric metasurface to a spot on a second surface of the volumetric metasurface.

Other implementations of one or more of these aspects include corresponding systems, apparatus, and computer programs, configured to perform the actions of the methods, encoded on computer storage devices.

These and other implementations may each optionally include one or more of the following features, or any combination thereof. For instance, the complex of structural optical properties includes 2 or more from a group of: sub-wavelength material-wave interaction; super-wavelength material-wave interaction; internal guidance; resonance; and one other effect. For instance, the first material of the first metasurface is disposed volumetrically. For example, the spot has a shape of a circle, oval, lenticular shape, rectangle, square or a polygon. In another instance, a property of the spot is dependent on an incident evanescent waves. For instance, the first metasurface also nonlocally maps the electromagnetic waves at the first surface to a second spot on the second surface. For example, the first material and the second material are discrete layers, the second material is patterned in the first material, and the pattern is one from a group of: a grid of cylinders, an unstructured arrangement, and a plurality of rings. In another instance, the first material and the second material are a continuous structure with gradients of refractive indices between a first refractive index of the first material and a second refractive index of the second material. In another example, the device also includes a sensor, the sensor positioned to sense signal from the spot of the first metasurface. In some instances, the sensor is one from a group of: a photovoltaic device, a photovoltaic cell, a photosensitive device, a spectrometer, a distance sensor, and polarization sensor and an image capture device. In some examples, the device further includes a support mechanism to hold the first metasurface in a fixed position relative to the sensor with the second surface of the metasurface and the spot facing the sensor. Still further examples of the device include a position adjuster to hold the first metasurface in a different positions relative to the sensor with the second surface of the metasurface and the spot facing the sensor, the position adjuster capable of moving the second surface and the spot of the first metasurface to different distances from the sensor. For example, the first metasurface is configured to flexibly redirect and delocalize light based one or more from a group of wavelength, polarization, incidence angle, and wavefront shape. In another example, device also includes a second metasurface having a first surface and a second surface, the first surface of the second metasurface receiving the electromagnetic waves, the second metasurface defining a second complex of structural optical properties, the second metasurface nonlocally maps the electromagnetic waves at the first surface to a second spot on the second surface of the second metasurface. For instance, the device also includes a layer positioned between the first metasurface and the second metasurface. In another instance, the layer is one or more from a group of: a uniform supporting region, a liquid crystal matrix, a nonlinear optical component, and an illuminating LED matrix. In another example, the device is part of one from a group of a smartphone, a computer, and a digital system.

All examples and features mentioned above can be combined in any technically possible way.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1A:
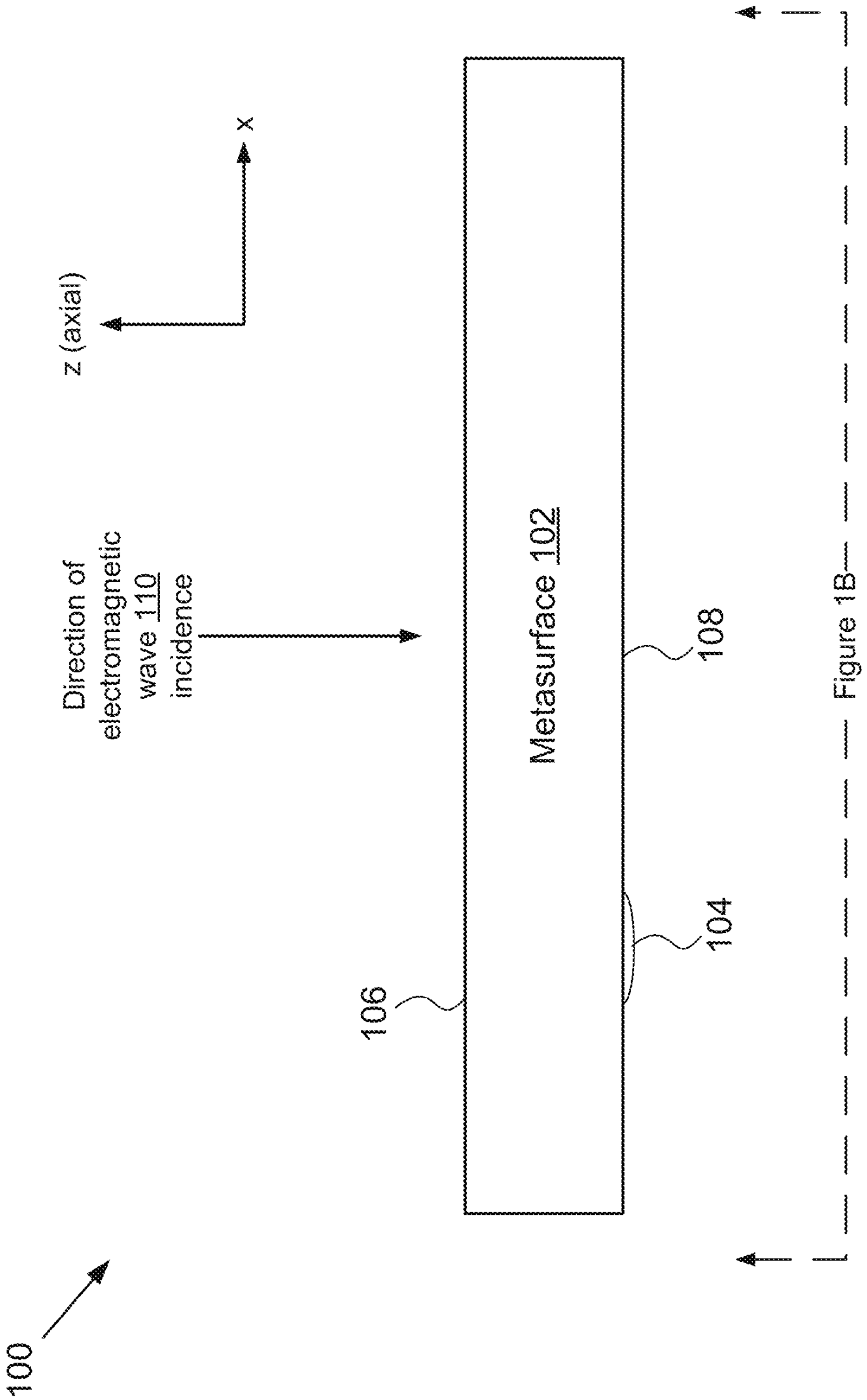
FIG. 1A shows a side view of a first example device having a metasurface with a spot on the bottom of the metasurface according to some implementations.

As shown in FIG. 1A, the present disclosure describes a device 100 including a metasurface 102 which implements a new nonlocal optical function, mapping each of a chosen set of electromagnetic waves 110 incident on a first surface 106 of the metasurface 102 to a corresponding spot 104 or set of spots 104*a*-104*n* on a second surface 108 of the metasurface 102. As shown in FIG. 1A, the metasurface 102 has a first surface 106 that receives electromagnetic waves 110. The metasurface 102 modulates the behaviors of electromagnetic waves through specific optical mechanisms, as will be described in more detail below, to map them to the corresponding spot 104 on the second surface 108. As shown in the side view of the device 100 in FIG. 1A, the top of the metasurface 102 is the first surface 106 and the bottom of the metasurface 102 is the second surface 108.

Throughout the description that follows, like components with the same or similar functionality have the same reference number. In FIG. 1A and the remaining figures, a letter after a reference number, e.g., "102*a*," represents a reference to the element having that particular reference number. A reference number in the text without a following letter, e.g., "102," represents a general reference to instances of the element bearing that reference number.

Figure 1B:
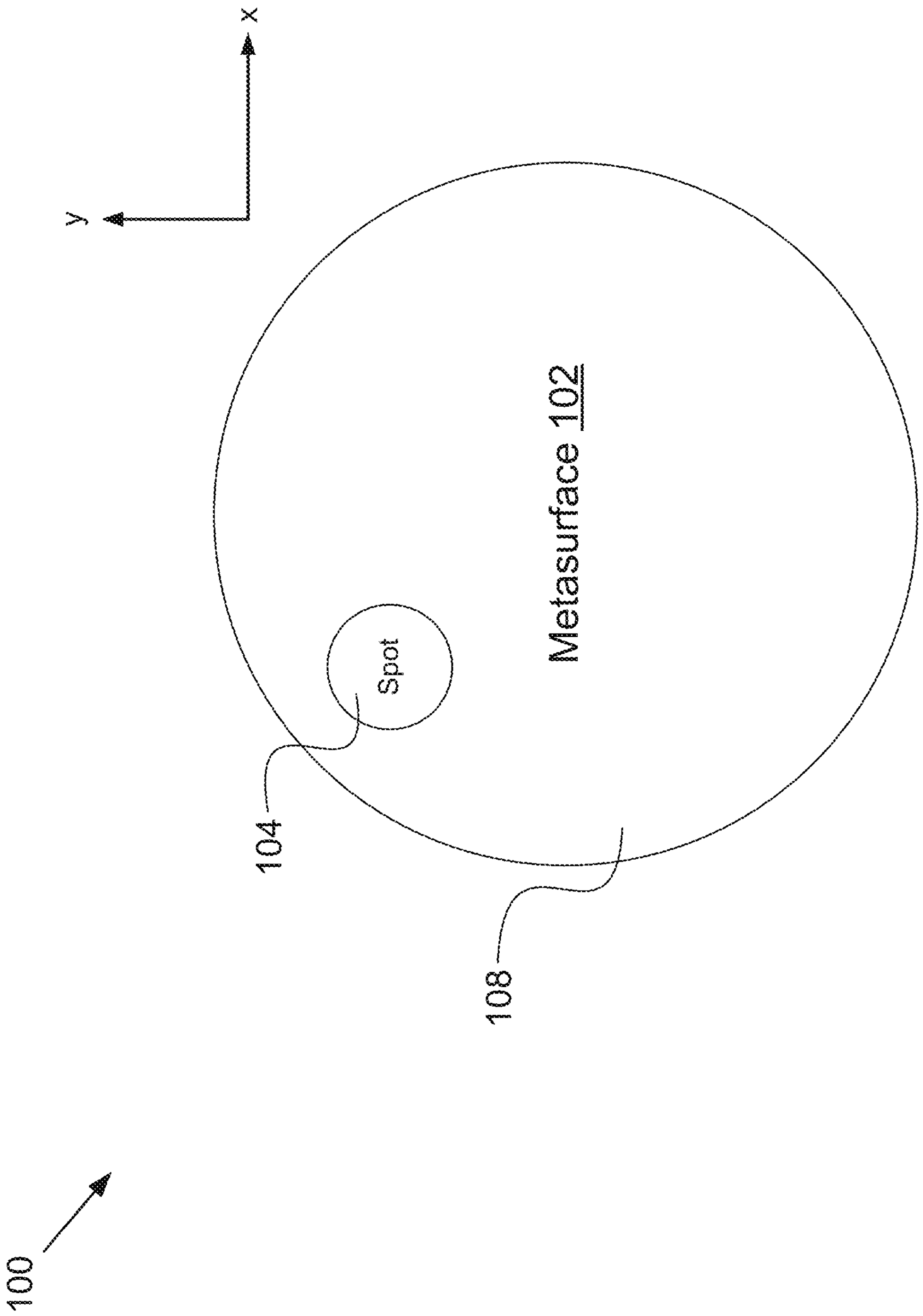
FIG. 1B shows a bottom plan view of the first example device having the metasurface with the spot on the bottom of the metasurface according to some implementations.

Referring now also to FIG. 1B, a bottom plan view of the example device 100 having the metasurface 102 and a spot 104 is shown. As can be seen by this plan view, in this implementation, the metasurface 102 has a circular shape as does the spot 104. In some implementations, the spot 104 covers a predefined area significantly less than the second surface 108 of the metasurface 102. It should be understood that while the metasurface 102 will be shown and described below with a circular or a rectangular geometry, in other implementations, the metasurface 102 may have any number of different geometries. The footprint of the metasurface 102 has a square, rectangular, circular, ovaloid, polygonal, or other shape. In some examples, the area covered by the metasurface 102 can vary between approximately 1 $mm^2$ and a 10 $cm^2$, measured along its largest diameter, are each possible, as are other sizes larger, smaller, and in between these sizes. In some implementations, the metasurface 102 has a diameter between 1 mm and 450 mm. In other implementations, depending on the technology used, the metasurface 102 may be up to a 10 cm diameter. In one specific implementation, the diameter of the metasurface 102 ranges from 4 mm to 6 mm. The thickness of the metasurface 102 can also vary from approximately 10 nanometers to 5000 micrometers when measured at its thickest point.

In some implementations, the metasurface 102 is configured to have a complex of structural optical properties. In one implementation, a complex of structural optical properties is a set of optical properties produced at least in part by a spatial pattern of at least one material. More particularly, a complex is 2 or more materials, arranged spatially in a specific pattern such that the collective patterned materials exhibit desired optical properties. Examples are described in more detail below. For example, the metasurface 102 is configured to include at least one novel, purpose-designed complex of structural optical properties. More specifically, example structural optical properties may include sub-wavelength and super-wavelength material-wave interaction, internal guidance, and, when selectivity based on wave properties is desired, resonance, optionally in conjunction with other effects, such as topological protection of states. This complex (or complexes) of structural optical properties is achieved at least in part via a volumetric component, in which at least some part of the metasurface 102 has a pattern of refractive indices, materials, material mixtures, and/or pattern of other material optical properties, such as absorptivity or conductivity, is inhomogeneous in the axial (z) direction of the metasurface 102. In some implementations, the method surface 102 is a volumetric metasurface that has at least one location on the metasurface that is not entirely homogeneous in the axial (z) direction, such that either the constituent material, the properties of the material, the mixture between materials, or another property vary with respect to the axial (z) location. In this disclosure, a material is disposed volumetrically when the material, the properties of the material, the mixture between the material and other materials, or another property of the material varies with respect to the axial (z) location.

The complex (or complexes) of structural optical properties is designed such that for a given, potentially non-exhaustive set of incident waves, each wave incident on the first surface 106 of the metasurface 102 is paired with a desired spot 104 or spots to be formed on a second surface 108. The complex (or complexes) of the metasurface 102 manipulate the incident waves nonlocally in order to perform this desired mapping. Example complexes are described below in more detail with reference to FIGS. 1C-1E, 1F-1G and 1L-1Q. In at least some cases, this design is performed using advanced computerized simulation and design techniques, incorporating differentiable programming methods such as backpropagation, iterative design techniques such as stochastic gradient descent, photonic inverse design techniques, rigorous simulations of Maxwell's equations such as the Finite Difference Time Domain method, and/or machine learning methods, such that these simulation and design techniques are capable of successfully designing what in many cases is a complicated and highly interconnected complex of structural optical properties. One example of a method for designing the metasurface 102 according to the present disclosure will be described below with reference to FIG. 22.

One particular advantage of the metasurface 102 of the present disclosure is the combination of one or more of: 1) sub-wavelength material-wave interaction, 2) super-wavelength material-wave interaction, 3) internal guidance, and, 4) when selectivity based on wave properties is desired, resonance, 5) optionally with other effects, into a specialized complex (or complexes) of structural optical properties, a complex (or complexes) which is capable of producing the desired nonlocal mapping of input electromagnetic waves to output spots and is specially designed to do so. Sub-wavelength material-wave interaction, in this case, indicates an interaction between an electromagnetic wave and one or more spatial inhomogeneities in a material optical property, such as refractive index, in which at least part of that inhomogeneity takes place over a length scale shorter than the shortest wavelength of the electromagnetic waves in the design set. At this scale, as can be modeled by Maxwell's equations, highly complex interactions can take place, such as fine-featured wavefront shaping and coupling between polarizations. In addition, the spatial fineness of the inhomogeneities allows for a higher number of degrees of freedom when designing a given metasurface 102. These sub-wavelength material-wave interactions may also be used in conjunction with super-wavelength material-wave interactions, in which the inhomogeneity takes place over a length scale longer than the shortest wavelength of the electromagnetic waves in the design set. This interaction regime allows larger-scale, bulk processing of light. The material-wave interactions described here include situations involving electromagnetic wave refraction and diffraction, which are consequences of material-wave interactions caused by inhomogeneities in material optical properties. The example complexes shown and described below with reference to FIGS. 1C-1E, 1F-1G and 1L-1Q combine these optical properties.

The metasurface 102 of the present disclosure is distinct from previous optical devices which form spots, such as lenses or local metasurfaces. Both lenses and local metasurfaces 102, for instance, rely on local wavefront shaping, and therefore, are unable to internally guide or nonlocally process electromagnetic waves. As such, previous optical devices must rely on a region of space, characterized by their focal length, in which the shaped waves converge, or focus, into the desired spot. Devices exist which attempt to compress this focal length, with the goal of allowing the convergence process, after electromagnetic waves have already been shaped by a local optic, to take place over a shorter distance. In contrast to previous optical devices which form spots, the metasurface 102 of the present disclosure, does not necessarily involve or require a focal length, and it can thus produce spots directly on its surface by transporting and processing electromagnetic waves internally due to its purpose-designed nonlocal properties. The metasurface 102 does not require auxiliary local optics to function, and the entire spot-forming function can be performed using only the metasurface 102. The guiding and processing performed by the nonlocal metasurface 102 represents an integrated, purpose-designed, nonlocal transport process which conveys incident electromagnetic waves, based on their properties, to the desired spots.

Internal guidance, in this case, means that an electromagnetic wave entering the metasurface 102 at one transverse (x-y) location on its surface can then be guided to another transverse (x-y) location. Internal guidance allows the part of the electromagnetic wave entering the metasurface 102 at a given transverse (x-y) location to be delocalized, moving it to different transverse (x-y) location(s) and potentially mixing it with waves which originally entered from other transverse (x-y) locations. Alone, however, internal guidance largely lacks the ability to satisfactorily process waves selectively, based on their specific properties, such as their wavelengths or wavefront shapes. Thus, when it is desired to selectively process waves based on their properties, such as by directing different wavelengths to different spots, the establishment of electromagnetic resonances is often required. An example of an internal guidance structure may be one which sets up a guided mode in the structure. For instance, a horizontal region of high refractive index material surrounded on the top and bottom by low refractive index material. Or the same with low refractive index material surrounded by high refractive index material. See the examples shown in FIGS. 1L, 1M 1O and 1P described in more detail below. Another example is where there are gaps or holes in the horizontal or surrounding materials, with gap spacings designed such that waves of certain wavelengths/polarizations/incidence angles are guided but others are not. For devices made of rings, a given ring of one refractive index surrounded by rings of another refractive index can serve as the waveguide, transporting light from one angular location on that ring's radius to another. Such structures could be realized with materials same as the resonances in the following paragraph.

A resonance can be created by one or more inhomogeneities in refractive index or other material optical properties of the material used for the metasurface 102, and it involves the oscillation of electromagnetic waves between, inside, or around these inhomogeneities. At shorter length scales, such as those less than or equal to 2 times the shortest wavelength in the design set of incident waves, resonance can provide selective local wave steering and splitting, based on local wave properties such as wavelength, polarization, and wavefront shape. At longer length scales, such as those greater than 2 times the shortest wavelength in the design set of incident waves, resonance can provide more global properties, such as global filtering of specific wavelengths, polarizations, or wavefronts. In some implementations, such resonances can be established by patterning small regions of high refractive index material in low refractive index materials. In such cases, the exact dimensions of each small region dictate its response to properties of light such as wavelength. An example of such a resonance could be a set of TaO5 rings embedded in SiO2 with radial thickness 400 nm, illuminated by 500 nm light. The light will be confined by the rings and resonate, and depending on the wavelength there will be constructive or destructive interference, leading to wavelength-specific optical behavior. In other implementations, circular pillars of TiO2, or thin strips of SiN may be used.

The metasurface 102 of the present disclosure is also advantageous because it performs nonlocal manipulation of incident electromagnetic waves. The nonlocal manipulation of incident electromagnetic waves means that, for at least some of the incident electromagnetic waves, the metasurface 102 transports these electromagnetic waves internally, moving at least some portion of each from the x-y location on the metasurface 102 into which the wave enters to a new, distinct x-y location. Specifically, in this disclosure, electromagnetic waves are manipulated nonlocally if, for at least one certain electromagnetic wave incident on the metasurface 102, at least some portion of the electromagnetic wave is, while in the metasurface 102, transported a distance greater than one times the wavelength of the electromagnetic wave being considered. A metasurface 102 which performs such nonlocal manipulation of electromagnetic waves is a nonlocal metasurface 102. A complex of structural optical properties is nonlocal when it is formed such that it manipulates at least some electromagnetic waves nonlocally. See the example complexes shown and described below with reference to FIGS. 1C-1E, 1F-1G and 1L-1Q combine these optical properties.

The spot or spots 104, which are formed by the metasurface 102, should be understood to be spatially localized regions of the output plane of the metasurface 102 which have a higher average electromagnetic wave intensity than regions which are not in a spot 104. The output plane of the metasurface 102 is any surface on which the spots 104 are formed. The input plane of the metasurface 102 is the surface into which the input waves are incident. The region of each of these spots 104 can be of varied shape, e.g., circles, ovals, lenticular shapes, rectangles, squares, polygons, and others. The position of each of these spots 104 can vary, and spots 104 can be anywhere on a surface of the metasurface 102. The distribution of intensity within the spot 104 region can also vary, e.g., uniform, Gaussian, an Airy disk, and others. The size of the region of each spot 104 can also vary, e.g., a 1 nm and a 10 mm spot, measured along its largest diameter, are each possible, as are other sizes larger, smaller, and in between these sizes. Different incident waves can be mapped to spots with different distributions, shapes, and/or sizes, or they can be mapped to the same spots 104. The wavefront of the electromagnetic waves as they exit a given spot 104 can also be designed as desired, with examples being a near-spherical wavefront, an angled wavefront, or a near-flat wavefront. In some implementations, spots are in most cases approximately circular. An example dimension is a radius such that the spot covers 60% of the metasurface 102 area. A minimum spot size might be approximately 10 nm, and maximum is up to 99% of the area of the metasurface 102.

Due to the spots 104 made by the metasurface 102 being, in some implementations, in the near field of the metasurface 102, the standard equation for the diffraction limit $d=\lambda/2NA$ for wavelength $\lambda$ and numerical aperture NA, does not apply, and the spots 104 can thus be significantly smaller than standard diffraction limits. For the same reason, spots 104 can even be smaller than the illuminating wavelength. This allows significantly more compact, higher resolution imaging, sensing, and electromagnetic wave production compared to conventional optics and local metasurfaces 102. While the following details some uses of the metasurface 102. There are many other uses which are not described here for which the metasurface 102 can also be used. The uses of the metasurface 102 are nearly examples and not limited to those described in detail here.

Figure 1C:
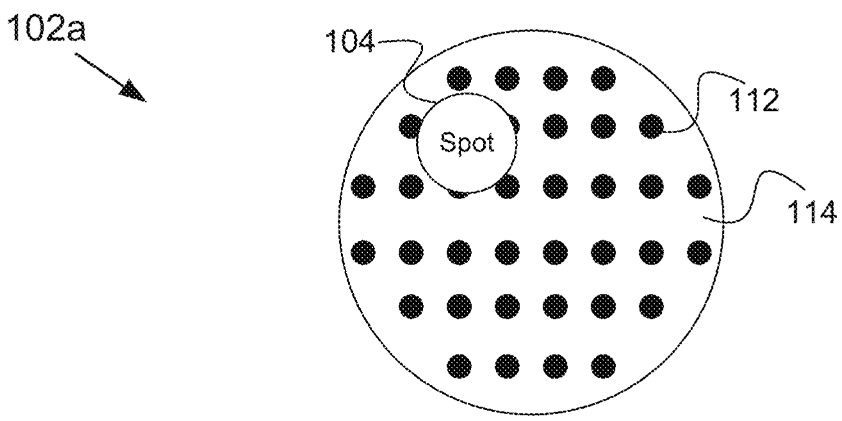
FIGS. 1C-1E shows plan views of example predesigned patterns for the material layers of the metasurfaces according to some implementations.
Figure 1D:
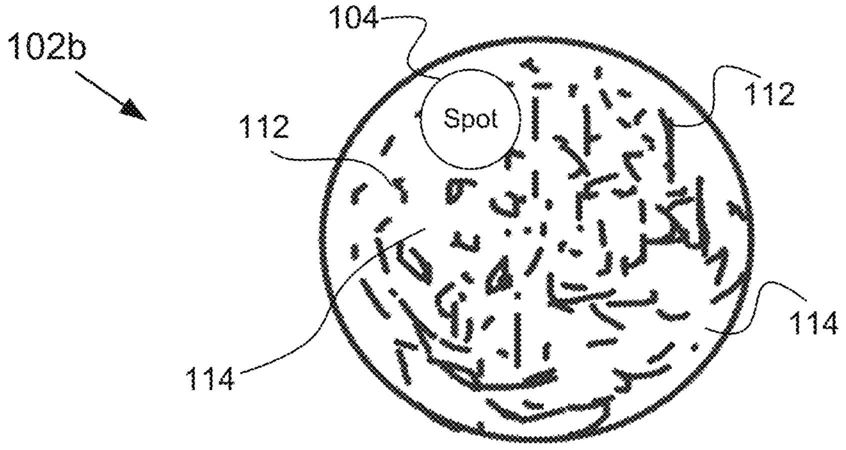
Figure 1E:
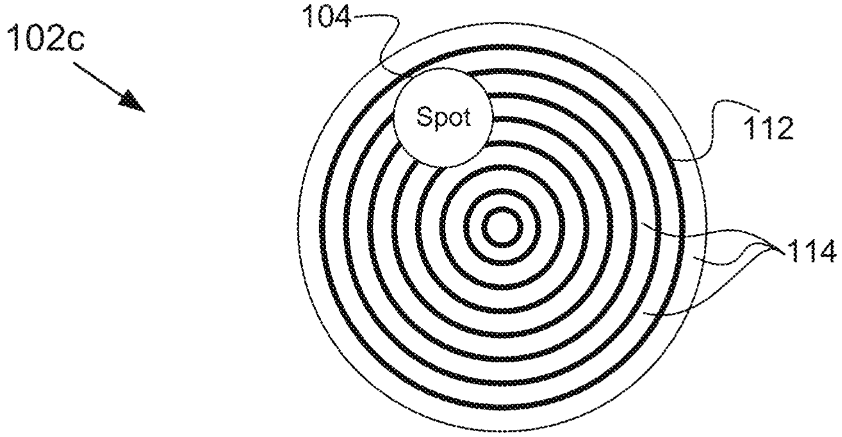

FIGS. 1C-1E show cross-sectional plan views of the example predesigned patterns for the material layers of the metasurfaces 102*a* according to some implementations. In some implementations, one or more of the first material and the second material are disposed volumetrically. In some cases, for a metasurface 102*a* fabricated using lithographic processes as will be described below with reference to FIG. 23, the metasurface 102*a* is a set of layers, at each x-y point on the layer one of two materials exists, which extends through that layer along the z axis. As should be understood, the pattern/locations that are material 1 or 2 may take a variety of forms, and FIGS. 1C-1E are merely three examples of possible patterns and locations of the first material 112 and the second material 114. In some instances, the first material may be arranged with the first material 112 having a high refractive index. Additionally, while only a small number of cylinders (e.g., less than 100) are shown in FIG. 1C for ease of understanding of the physical structure, there may be more than 100,000 or more cylinders in a typical metasurface 102*a*.

FIG. 1C shows one example of a two material layers 112, 114 of the metasurface 102*a*. In FIG. 1C, the first material layer 112 is one or more cylinders. As depicted, the first material layer 112 is a grid of cylinders across the area of the metasurface 102*a*. It should be understood that the first material layer 112 could take a variety of alternate shapes including rectangular solids, spheres, or any variety of other three-dimensional shapes. They also may or may not be organized in a grid. It should be understood that while only two materials 112, 114 are depicted in FIG. 1C, there may be any number of material layers and the materials may be any number greater than two. It should be noted that in some implementations one of the materials may be air, a vacuum, a space, or a gap. In some implementations, one or more of the materials may exhibit properties beyond those characterize by a single real-valued scalar refractive index, including birefringence, optical gain, optical absorption, or nonlinearity such as the Kerr effect, frequency mixing processes, or Pockels effect.

FIG. 1D shows a second example of the two material layers 112, 114 of the metasurface 102*b*. The metasurface 102*b* of FIG. 1D has an unstructured arrangement for the first material layer 112 and the second material layer 114. Additional examples of unstructured arrangement are shown and described below with reference to FIGS. 14A and 14B. Again, it should be understood that while only two materials 112, 114 layers are depicted in FIG. 1D, there may be any number of material layers and the materials may be any number greater than two. Similar to FIG. 1C, as noted above, there may be greater than 100,000 and more shapes in an unstructured arrangement for the metasurface 102*b*.

FIG. 1E a shows a third example of the two material layers 112, 114 of the metasurface 102*c*. As shown in this third example, the pattern provides the metamaterials 112, 114 with rotational symmetry. For a given radius r from the x-y center of the metasurface 102*c* (e.g., in a plan view) the first material 112 and the second material 114 will be the same all around the circle of the radius r. It should be understood that the pattern of rings, the width of each ring, and the frequency of swapping between one material 112 and the second material 114 are configured based on the optical properties desired for the complex. This is just one implementation for the nonlocal spot-forming metasurface 102 of the present disclosure. More specifically, this third example may include 100,000 s of rings in a ~1 mm radius metasurface, with radial thicknesses of about 1 micrometer.

Figure 1F:
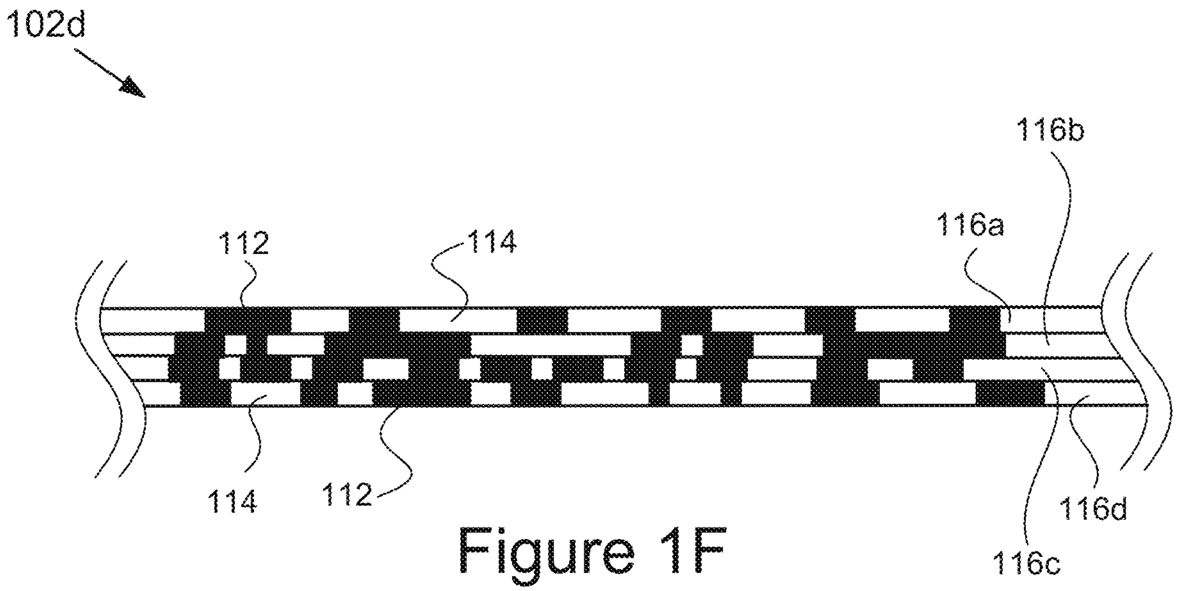
FIGS. 1F-1G shows cross-sectional views of example layers of the metasurface according to some implementations.
Figure 1G:
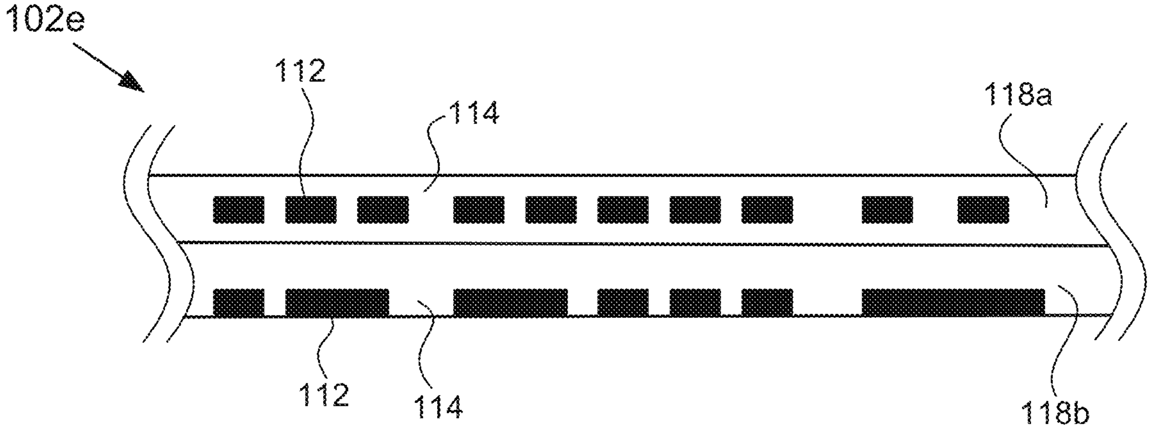

Referring now to FIGS. 1F-1G, partial cross-sectional views of example layers of the metasurface 102*d*, 102*e* according to some implementations. Other examples of the layers of the metasurface 102 are shown and described below with reference to FIGS. 13, 14A, and 14B. As seen in the example of FIG. 1F, there are four layers 116*a*, 116*b*, 116*c*, and 116*d*. These layers 116*a*, 116*b*, 116*c*, and 116*d* are merely one example and the layers may but need not have the same thickness. The thickness of each layer 116*a*, 116*b*, 116*c*, and 116*d* may be varied to produce the complexes and optical features desired for a given layer 116*a*, 116*b*, 116*c*, and 116*d*. However, in most implementations the height of each layer may be different, but the height of a given layer will be consistent for that layer. In other words, within a given layer each cylinder/piece/ring is the same height. FIG. 1F illustrates layer is made of two materials, a first material 112 and a second material 114 as has been described above. It should be noted that in other implementations, each layer may have more than two types of different materials.

Referring now also to FIG. 1G, another partial cross-section view of an example metasurface 102*e* is shown. In the implementation of FIG. 1G, the metasurface 102*e* has two layers 118*a* and 118*b*. Each layer 118*a* and 118*b* is made of two materials, a first material 112 and a second material 114 as has been described above. Also as shown in FIG. 1G, there is additional spacing or a region of material 2 above each of the two layers layer 118*a* and 118*b*, for example, a buffer between the two layers of the encasing material.

Figure 1H:
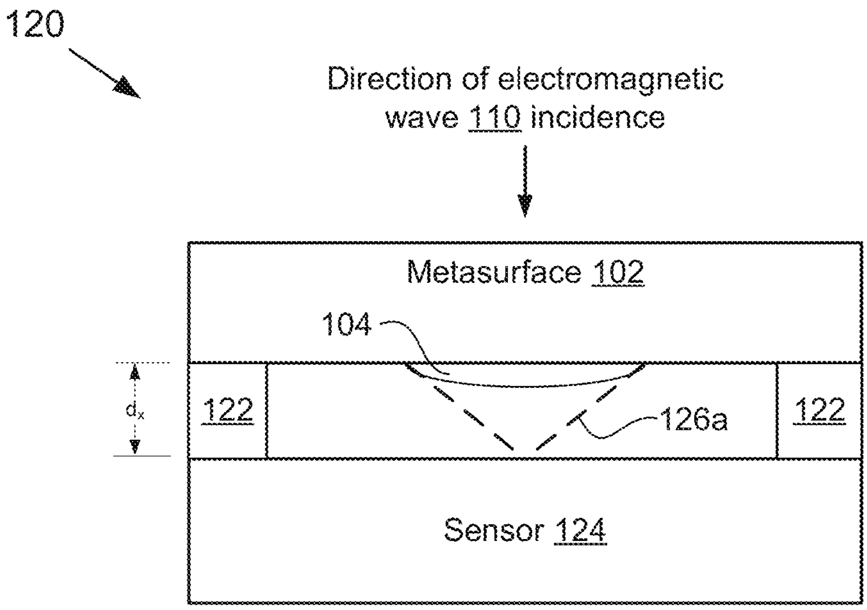
FIG. 1H shows a side view of a second example device having a metasurface with a spot on the bottom of the metasurface according to some implementations.

FIG. 1H shows a side view of a second example device 120 having a metasurface 102 with a spot 104 on the bottom of the metasurface 102 according to some implementations. The second example device 120 also includes support mechanisms 122 and a sensor 124. The metasurface 102 of the present disclosure is particularly advantageous because the metasurface 102 includes one or more multi-layer, nonlocal meta-lenses that transport light internally to the spot 104. Due to this nonlocality, the metasurface 102 performs both the function of a lens and the focal length in one flat material, meaning it needs less focal length to get the same focus. As noted above, the metasurface 102 maps incident electromagnetic waves nonlocally to corresponding spot(s) 104. The spot 104 is an area on the bottom surface of the metamaterial from which light exits. In some implementations, the metasurface 102 is positioned at a fixed distance, $d_x$, from the sensor 124, and the support mechanisms 122 have a height of that fixed distance, $d_x$. Examples for the support mechanism 122 could be a ring of material, four pillars of material, three pillars of material, etc. Moreover, the material of the support mechanism 122 could be plastic, polymer, aluminum, titanium, carbon fiber, etc. The sensor 124 may be any variety of different light sensors including but not limited to image capture devices, cameras, scanners, light sensors, a photovoltaic cell, photo resistors, photodiodes, photo transistors, complementary metal oxide semiconductor arrays, charged couple device arrays. Example applications of the metasurface 102 with such sensors 124 will be described in more detail below with reference to FIGS. 15-19. One additional advantage of the metasurface 102 is that the sensor 124 can be placed closer to the meta-lens, making the optical system much thinner. As shown in FIG. 1H, the output of the metasurface 102 on the bottom side where the spot 104 is positioned provides an area of focus 126*a* or a focal length to focus the output of the metasurface 102 a particular point on the sensor 124. This focal length can be smaller than the focal length of a similar conventional optical system, while realizing the same numerical aperture and other desired focus properties. The extent of this focal length compression is determined by the quality/complexity/thickness/number of layers of the metamaterial of the metasurface 102. This is particularly advantageous for things like phone cameras and medical devices, which need to have a compact form factor.

Figure 1I:
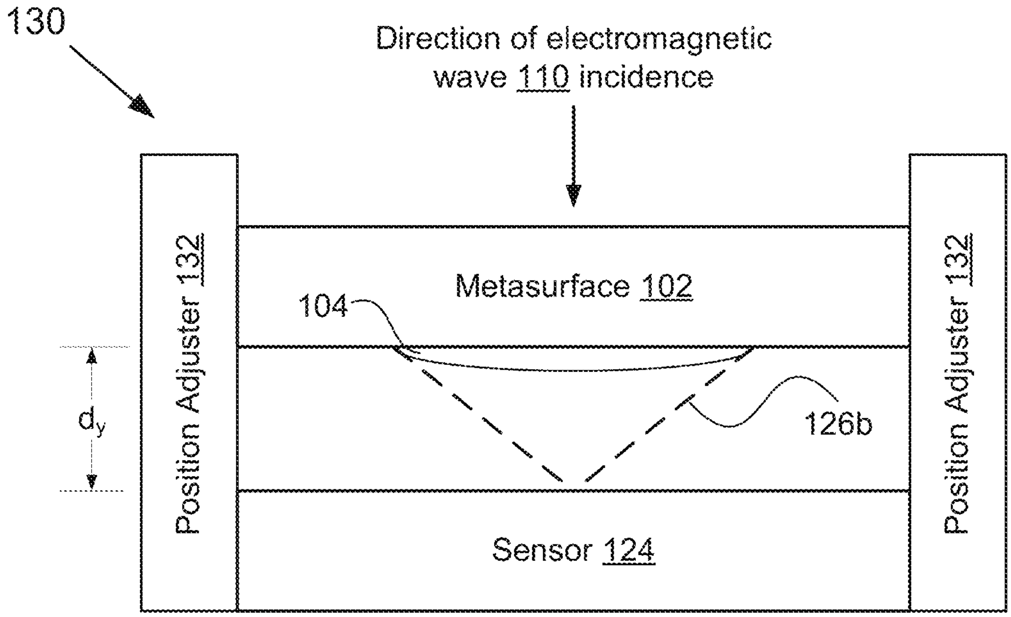
FIG. 1I shows a side view of a third example device having a metasurface with a spot on the bottom of the metasurface according to some implementations.

FIG. 1I shows a side view of a third example device 130 having a metasurface 102 with a spot 104 on the bottom of the metasurface 102 according to some implementations. The third example device 130 also includes a position adjuster 132 and a sensor 124. Similar to other implementations, the metasurface 102 maps incident electromagnetic waves nonlocally to the corresponding spot 104. The output of the spot 104 has an area of focus 126*b* or a focal length so that the output of the spot 104 is directed to a particular point on the sensor 124. The metasurface 102 can be designed so the focus is not directly on the surface of the metasurface 102 but can be further away (but closer than it normally would be for a local metasurface 102 or regular lens of the same numerical aperture). In this implementation, the position adjuster 132 can modify the distance, $d_y$, from the spot 104 to the sensor 124. For example, the position adjuster 132 may be a motor, an electrically actuated diaphragm, a linear actuator, piezoelectric actuator, phase changing material, hydraulic actuator, pneumatic actuator, microelectomechanical device, solenoid actuator, or other device which physically moves/focuses the spot 104 in the same way that lenses are moved in/out to focus a camera to a certain depth. Thus, the position adjuster 132 may change the distance between the spot 104 of the metasurface 102 and the sensor 124 by increasing or decreasing the distance between them.

Figure 1J:
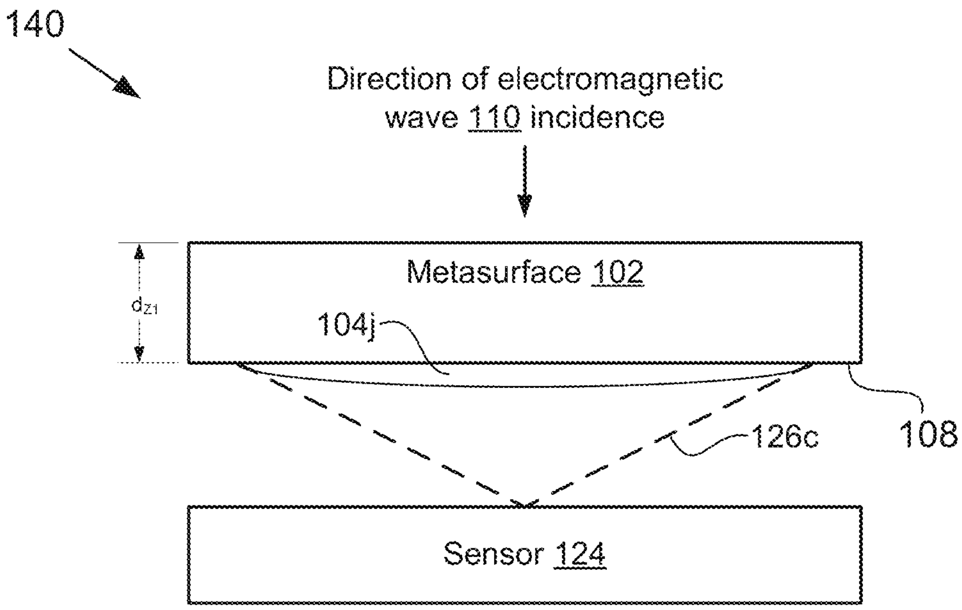
FIG. 1J shows a side view of a fourth example device having a metasurface with a spot on the bottom of the metasurface according to some implementations.
Figure 1K:
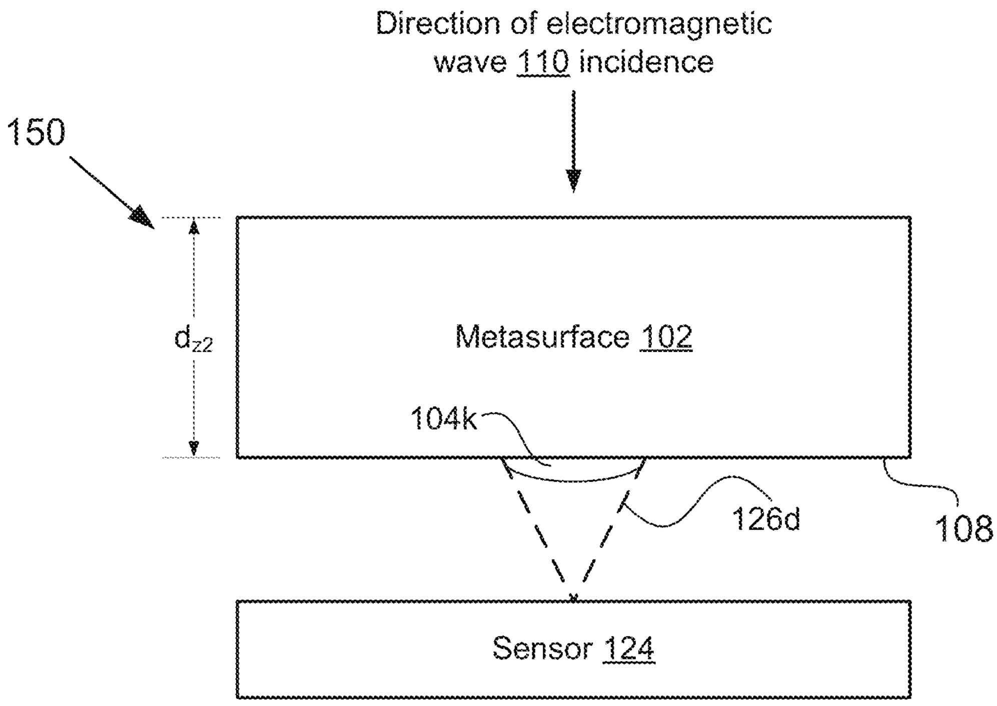
FIG. 1K shows a side view of a fifth example device having a metasurface with a spot on the bottom of the metasurface according to some implementations.

FIGS. 1J and 1K show side views of a fourth example device and a fifth example device, respectively, each having a metasurface 102 with a respective spot 104*j*, 104*k* on the bottom of the metasurface 102 according to some implementations. FIGS. 1J and 1K illustrate how the size of the spot 104*j*, 104*k* may vary significantly. FIG. 1J shows an instance where the spot 104*j* covers a substantial portion of the bottom 108 of the metasurface 102. In contrast, FIG. 1K shows a spot 104*k* that covers only a small portion of the bottom 108 of the of the metasurface. Therefore, it should be understood that the spot 104*j*, 104*k* may range from almost the entire bottom surface 108 to only a tiny fraction of the bottom surface 108 of the metasurface 102. The output of the spot 104*j* has an area of focus 126*c* or a focal length substantially larger than spot 104*k*. For example, a comparison of FIGS. 1J and 1K illustrates the difference in thicknesses that the metasurface 102 may have. The metasurface 102 of FIG. 1J has a thickness of $d_{z1}$. In contrast, the metasurface 102 of FIG. 1K has a thickness of $d_{z2}$, where $d_{z2}$ is approximately twice the value of $d_{z1}$. For example, a thinner, $d_{z1}$, simpler device (metasurface 102 of FIG. 1J) with fewer layers will make a bigger spot 104*j* because it is compressing the focal length less, while a more complicated device (metasurface 102 of FIG. 1K) with more layers (and a greater thickness, $d_{z2}$) will make a smaller spot 102*k*. The output of the spot 104*k* has an area of focus 126*d* or a focal length much smaller than that of spot 104*j*. In some implementations, the minimum spot size is approximately 10 nm and the maximum spot size is approximately 99% of the surface area of the bottom 108 of the metasurface 102.

Figure 1L:
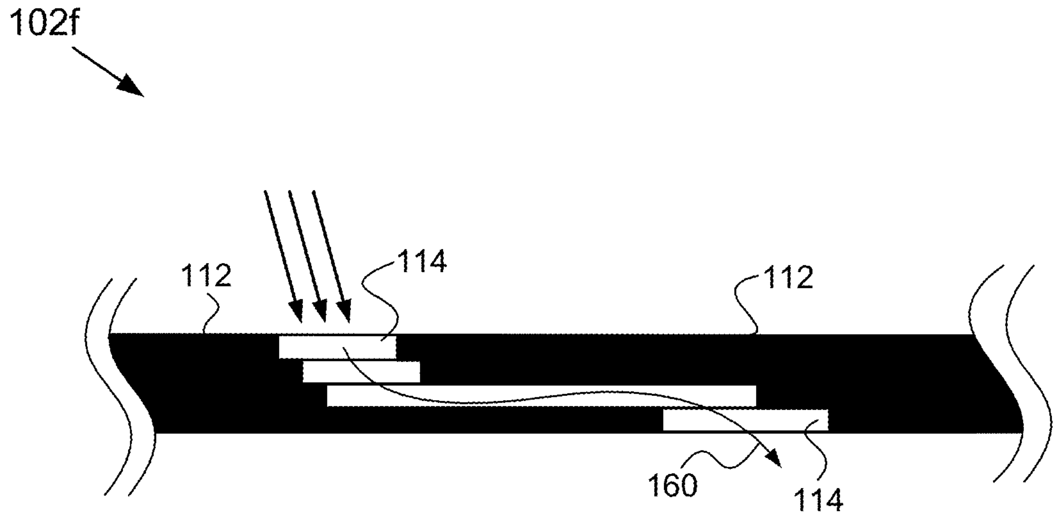
FIG. 1L-1P show shows cross-sectional views of layers of additional example metasurfaces according to some implementations.

Referring now to FIG. 1L, a cross-section view of an example metasurface 102*f* is shown. As seen in the example of FIG. 1L, there are four layers. These layers are merely one example, and the layers may but need not have the same thickness. The thickness of each layer may be varied to produce the complexes and optical features desired for a given layer. In other words, within a given layer each cylinder/piece/ring is the same height. FIG. 1L illustrates each layer is made of two materials, a first material 112 and a second material 114 as has been described above. The example metasurface 102*f* has different properties, nonlocality, resonance, complexes. The example metasurface 102*f* implements an example of a nonlocal metasurface realized through internal guidance. For example, light is incident on only a part of the metasurface 102*f*, but similar processes happen when light hits the whole metasurface 102*f*. The light is guided by the difference in refractive indices to a different output location. This is also a super-wavelength material wave interaction, where the wave reflects off the interfaces between the two materials 112, 114. In this case, the complex is the configuration of materials which together cause that internal guidance. The guidance through the metasurface 102*f* is depicted by line 160. For example, the metasurface 102*f* the thickness of each layer is, for example, around 1 micrometer, though other thicknesses are possible, and each layer need not be the same thickness, the metasurface 102*f* might be 1 mm in diameter, and the openings (material 114) to be about 3 micrometers wide with the light having a wavelength of approximately 500 nm.

Figure 1M:
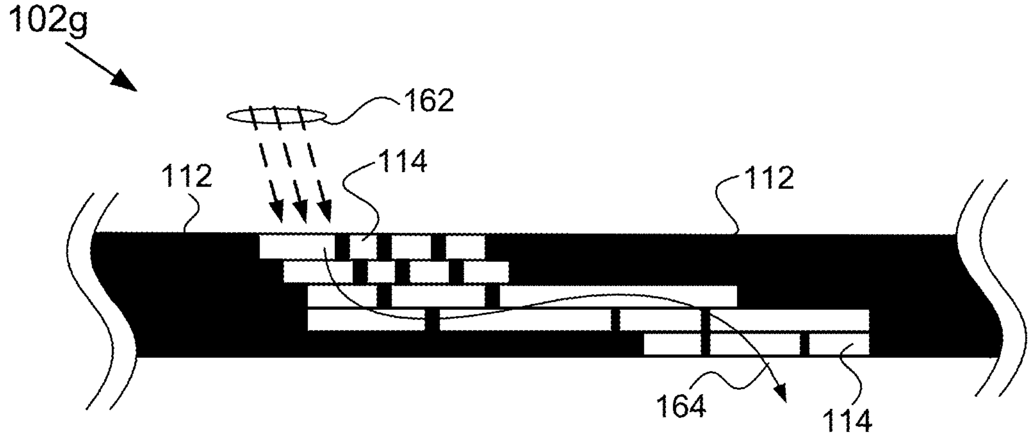
Figure 1N:
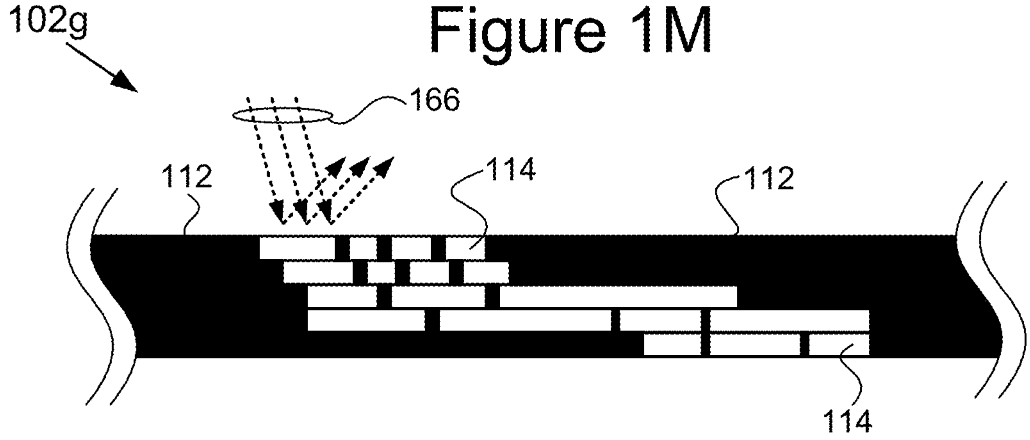

Referring now to FIGS. 1M and 1N, another example metasurface 102*g* is shown. This example metasurface 102*g* has small pieces of high refractive-index material 112 that lead to resonance and sub-wavelength material-wave interaction that makes it wavelength-selective. The complex of metasurface 102*g* involves those pieces as well. FIG. 1M illustrates red light 162 been applied to the metasurface 102*g*. Since the metasurface 102*g* is wavelength selective, it allows the red light 162 to pass along path 164 through the metasurface 102*g*. In contrast, as shown in FIG. 1N, when blue light 166 is applied to the metasurface 102*g*, it does not pass through the metasurface 102*g* but is reflected away.

Figure 1O:
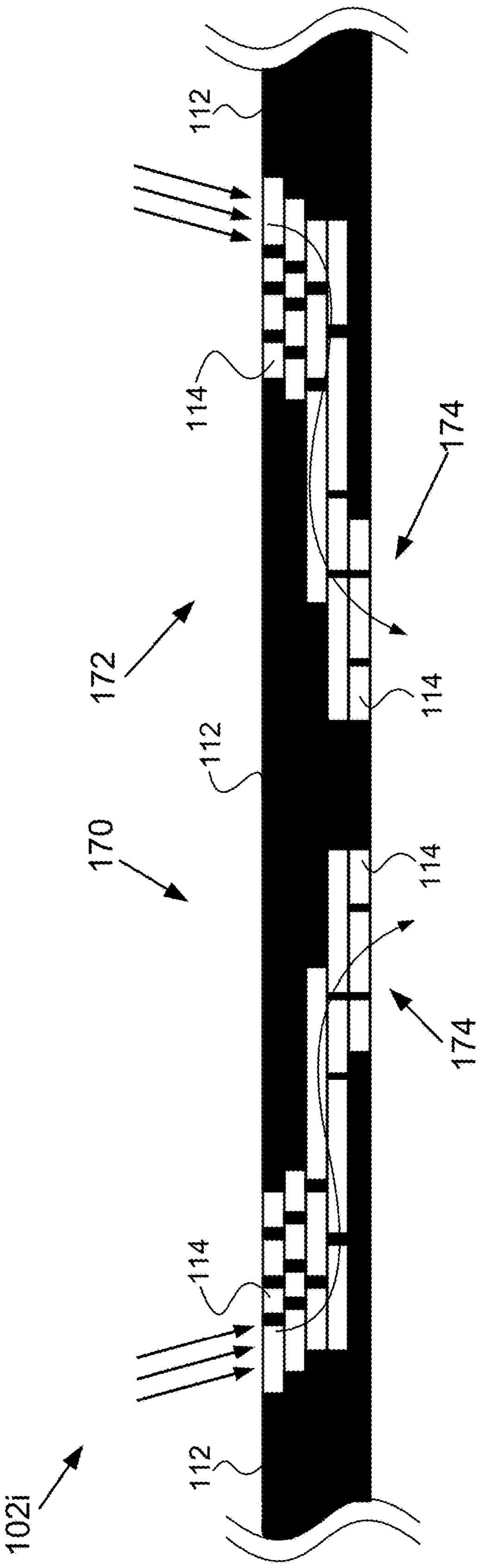
Figure 1P:
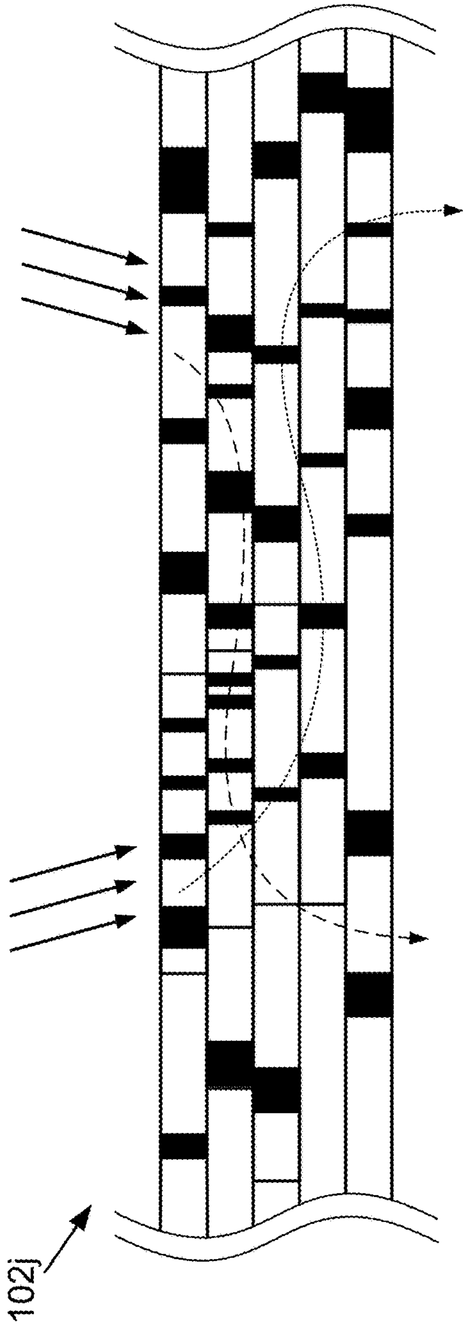

Referring now to FIGS. 1O and IP, metasurfaces 102*i*, 102*j* with a pair of complexes are shown. The metasurfaces 102*i*, 102*j* of FIGS. 1O and IP illustrate how more than one complex can be implemented in a given metasurface 102. It should be understood that while metasurfaces with only one complex or two complexes are shown herein, a metasurface 102 may be constructed with any number of complexes and these are merely examples. The metasurface 102*i*, 102*j*, each have two complexes 170, 172, where one complex 172 routes left-angled light to a spot 176 and the other complex 170 routes right-angled light to a different spot 178. As shown in FIG. 1O, the metasurface 102*i* has five layers of a first material 112 and a second material 114. Similarly, FIG. 1P as a metasurface 102*j* with five layers, again with the first material 112 and the second material 114. FIGS. 1O and IP are provided to illustrate how two different metasurfaces 102*i*, 102*j*, can have the similar complexes 170, 172 in that they map similar sets of input waves to similar sets of spots, yet have a very different physical configuration of layers and materials. FIG. 1O has a layer and material configuration similar to the other example metasurfaces described above in FIGS. 1F-1G, 1L-1Ng. In contrast, FIG. 1P has a different complex of patterned materials with the same properties of resonance, sub-wavelength material-wave interaction, and internal guidance, but there optical characteristics are less visually apparent from the configuration of materials and layers.

Figure 1Q:
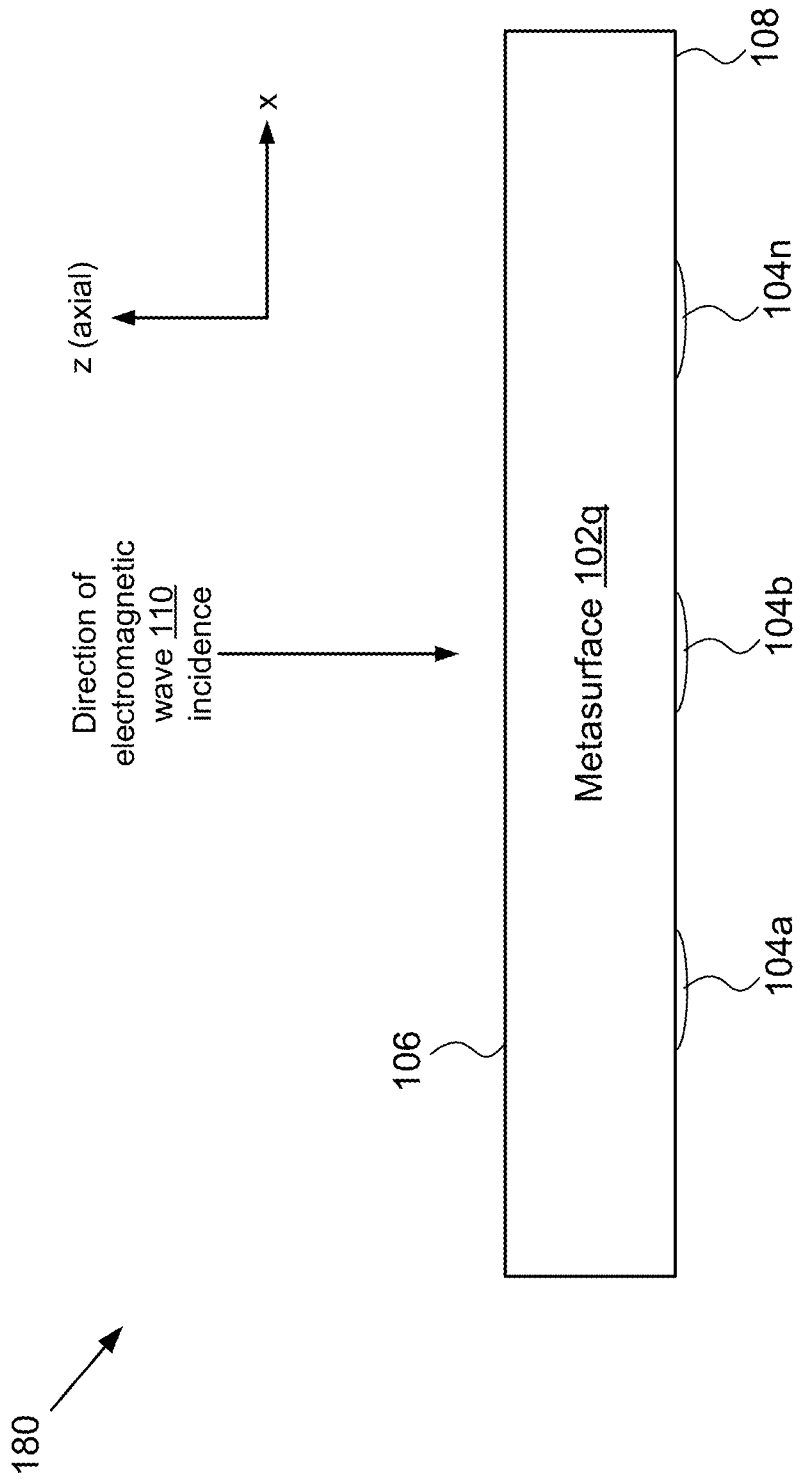
FIG. 1Q shows a side view of another example device having a metasurface with a spot on the bottom of the metasurface according to some implementations.

FIG. 1Q shows a side view of another example device 180 having a metasurface 102*q* with a plurality of spots 104*a*, 104*b*, and 104*n*, on the bottom 108 of the metasurface 102*q* according to some implementations. A comparison of the example device 180 of FIG. 1Q to the example device 100 of FIG. 1A illustrates that different metasurfaces 102, 102*q* may have different numbers of spots. For example, a metasurface 102 like that of FIG. 1A that processes a single set of waves will produce a single spot 104. However, the metasurface 102*q* that processes a plurality of distinct sets of waves will produce a corresponding set of distinct spots 104*a*, 104*b*, and 104*n*, one spot for each distinct set of waves. FIG. 1Q merely illustrates a metasurface 102*q* with three distinct spots 104*a*, 104*b*, and 104*n*; however, it should be understood that a metasurface 102 may have any number of spots from 1 to n.

Referring now to FIGS. 2-7, various examples of incident waves 110 on example metasurfaces 102 with spots 104 will be described. The set of incident waves 110, for each of which the metasurface 102 is designed to produce a corresponding spot 104 on a surface, can be selected arbitrarily, and the correspondence of each with a given spot or spots 104 can also be chosen arbitrarily. The metasurface's complex (or complexes) is organized such that, when physically realized, it produces the desired correspondence for the desired set of incident waves 110 and output spots 104. Each incident wave 110 can be distinguished by the metasurface's complex (or complexes) based on its properties, including its wavelength(s) as shown in FIGS. 2 and 7, the shape of its wavefront as shown in FIGS. 10 and 11, its angles of incidence with respect to the metasurface 102 as shown in FIG. 3, its polarization as shown in FIG. 4, its coherence, whether it is a propagating or evanescent wave as diagrammed in FIG. 5, and others. For instance, a wave with 650 nm wavelength (red), a wave with 532 nm wavelength (green), and a wave with 460 nm wavelength (blue) can each be mapped to the same spot 104 with the same properties, or to different spots 104 which each have distinct properties, as demonstrated in FIGS. 7 and 2, respectively. As another example, a spherical wave from a close source and a spherical wave from a far-away source can be mapped to the same spot 104 with the same properties, or to different spots which each have distinct properties, as demonstrated in FIGS. 11 and 10, respectively. As another example, a spherical wave from a point source at one transverse (x-y) location relative to the metasurface 102 and a spherical wave from a point source at a different transverse (x-y) location relative to the metasurface 102 can be mapped to the same spot 104 with the same properties, or to different spots 104 which each have distinct properties. As another example, a plane wave at a given angle and a plane wave at a different angle can be mapped to the same spot with the same properties, or to different spots which each have distinct properties, as demonstrated in FIG. 3.

Figure 2B:
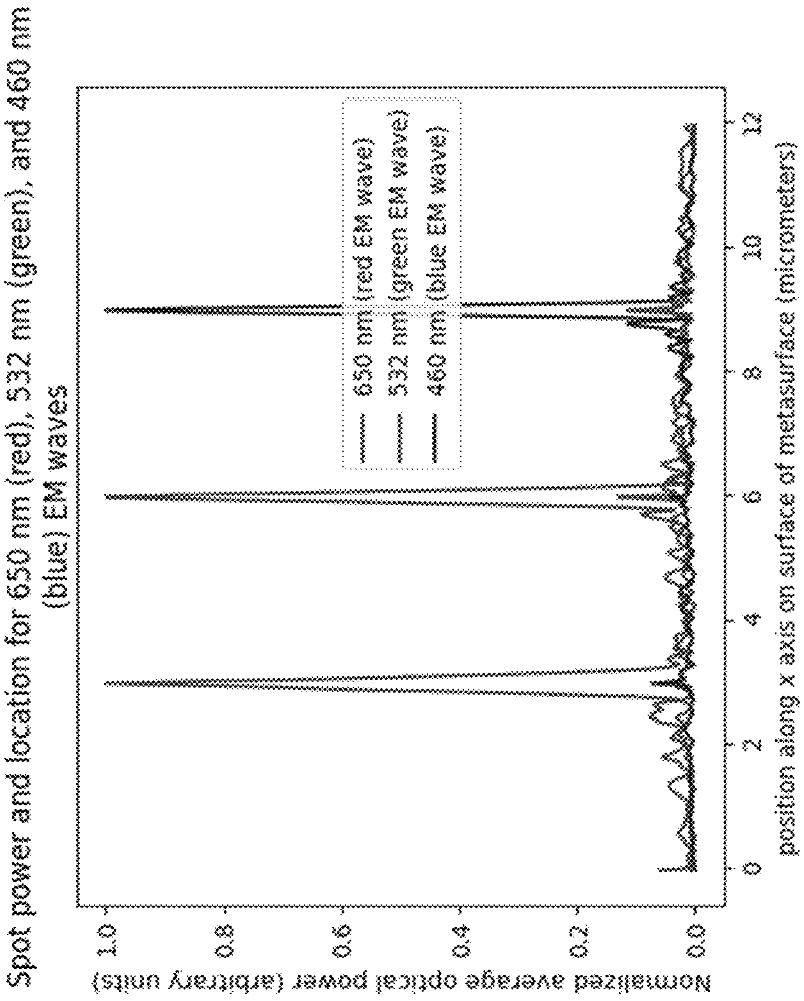
FIG. 2B shows a graph of the spot power and location for different wavelengths of electromagnetic waves applied to the metasurface.
Figure 2A:
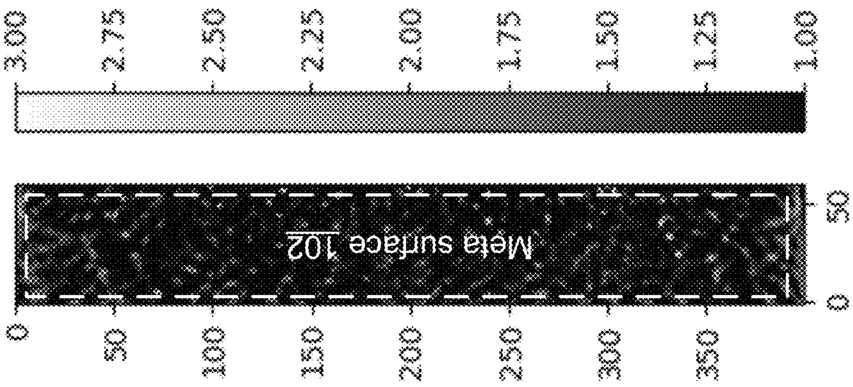
FIG. 2A shows a first example of a metasurface when illuminated with a plane wave of either red, green, or blue incident light according to some implementations.

FIG. 2A shows a first example of a metasurface 102 when illuminated with a plane wave of either red, green, or blue incident light according to some implementations. More specifically, FIG. 2A shows a nonlocal, volumetric metasurface 102 when illuminated from its left side with a plane wave of either red, green, or blue incident light, produce distinct spots 104 on its right side based on the color.

FIG. 2B shows a graph of the spot power and location for different wavelengths of electromagnetic waves applied to the metasurface 102. FIG. 2B shows the spots produced on the right side for each color.

Figure 2C:
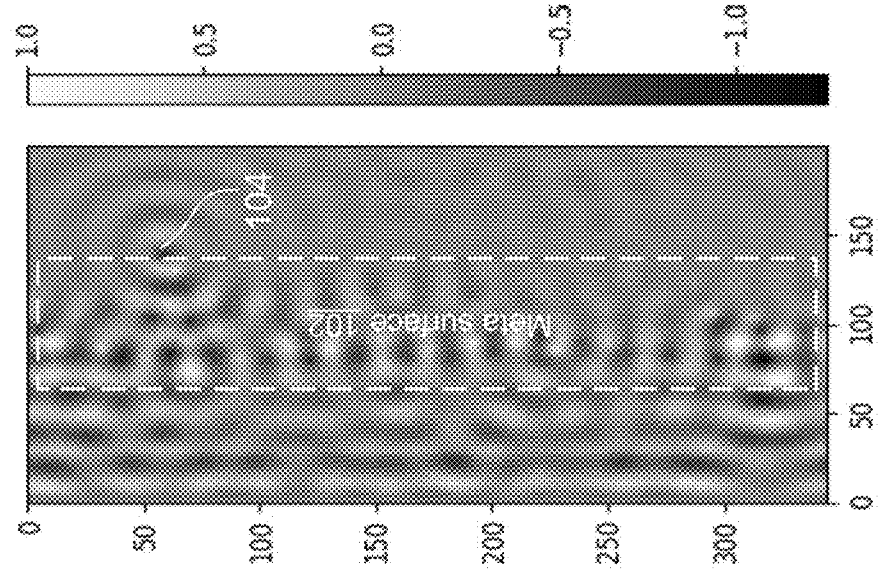
FIGS. 2C-2E show diagrams of the electric fields produced when the metasurface is illuminated by red, green, and blue light, respectively.
Figure 2D:
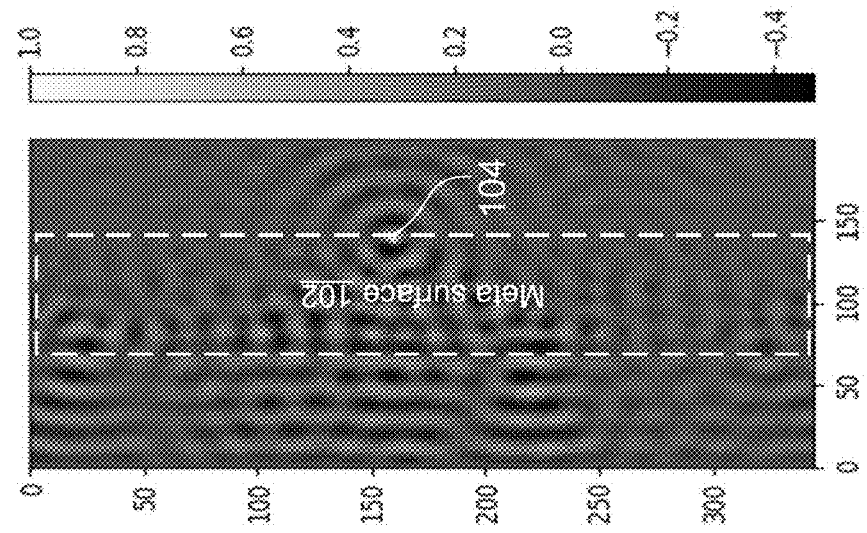
Figure 2E:
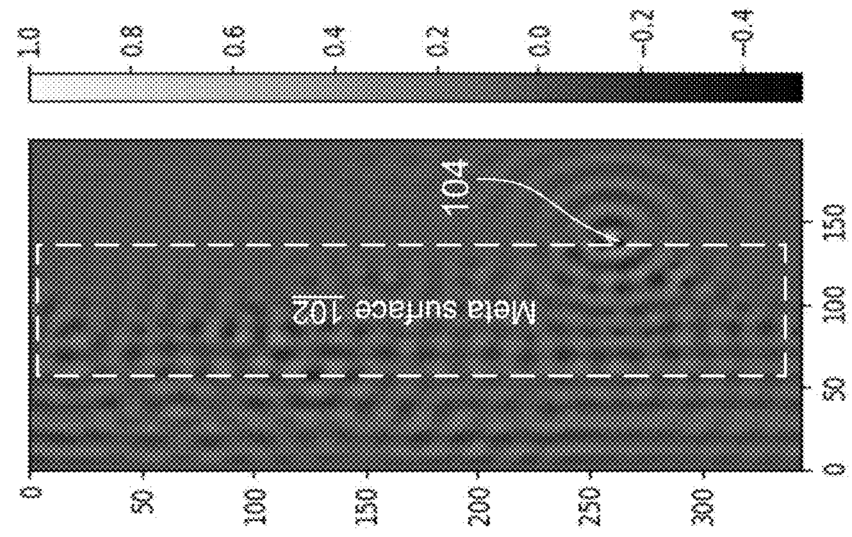

FIGS. 2C-2E show diagrams of the electric fields produced when the metasurface 102 is illuminated by red, green, and blue light, respectively. FIGS. 2C-2E also show the spots 104 and how the spot positions vary according the light color.

Figure 2H:
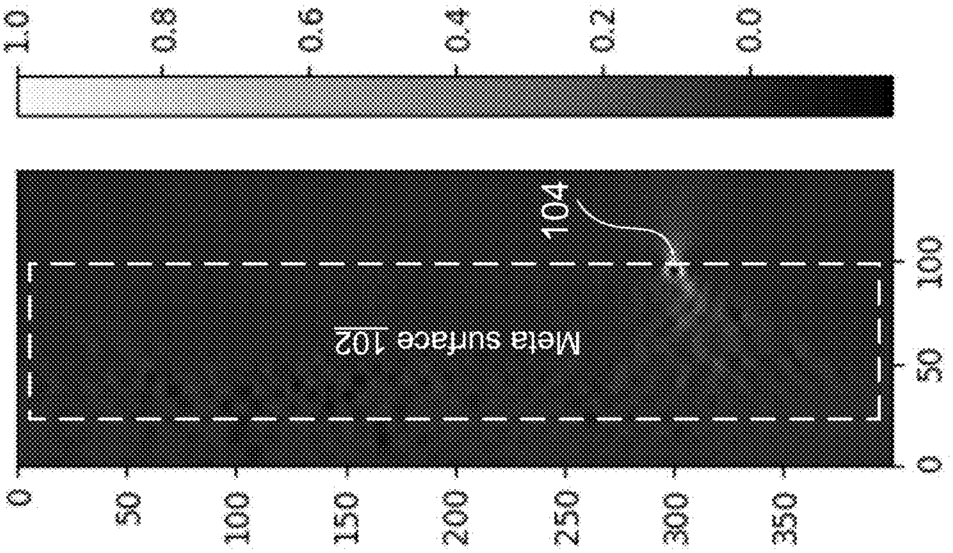
FIGS. 2F-2H show diagrams of the average optical power produced when the metasurface is illuminated by red, green, and blue light, respectively.
Figure 2G:
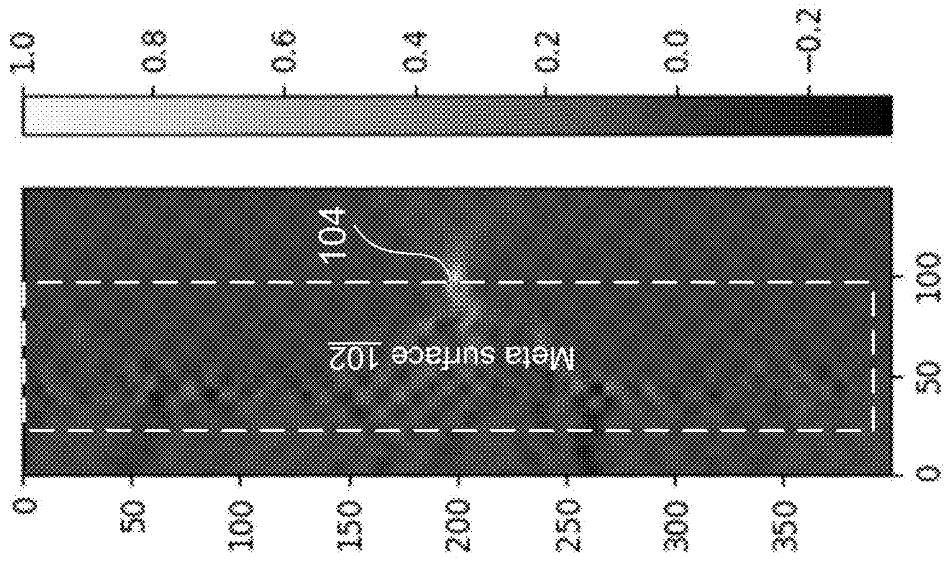
Figure 2F:
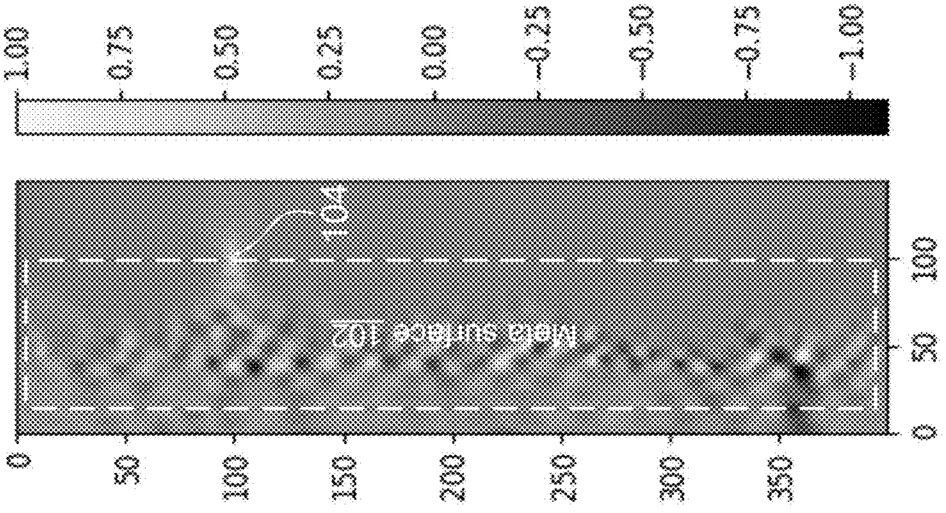

FIGS. 2F-2H show diagrams of the average optical power produced when the metasurface 102 is illuminated by red, green, and blue light, respectively. The variance in spot 104 position is also shown.

Figure 3A:
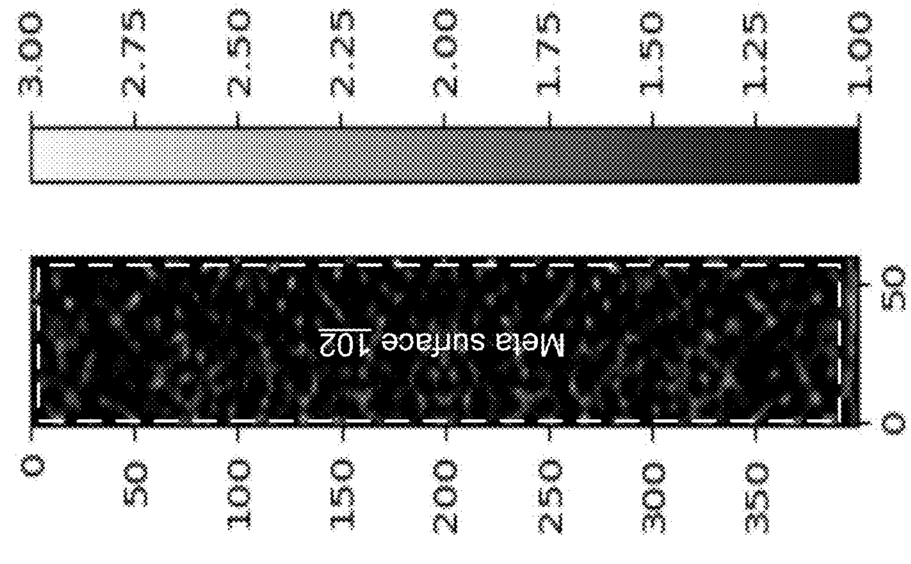
FIG. 3A shows an example of the metasurface when illuminated with a plane wave of different angled light according to some implementations.

FIG. 3A shows an example of the metasurface 102 when illuminated with a plane wave of different angled light according to some implementations. More specifically, FIG. 3A shows a nonlocal, volumetric metasurface 102 when illuminated from its left side with a green plane wave of −45 degrees, 0 degrees, or 45 degrees angled light to produce distinct spots on its right side based on the angle. In some implementations, the metasurface 102 may also be used to process a continuous range of light angled from −45 degrees to 45 degrees, or other degree range. In such an implementation, the spot 104 continuously, smoothly translates horizontally across the second surface of the metasurface 102. In still other implementations, the metasurface 102 may also be similarly configured for other ranges of angles of light on other axis, or a combinations of both axes.

Figure 3B:
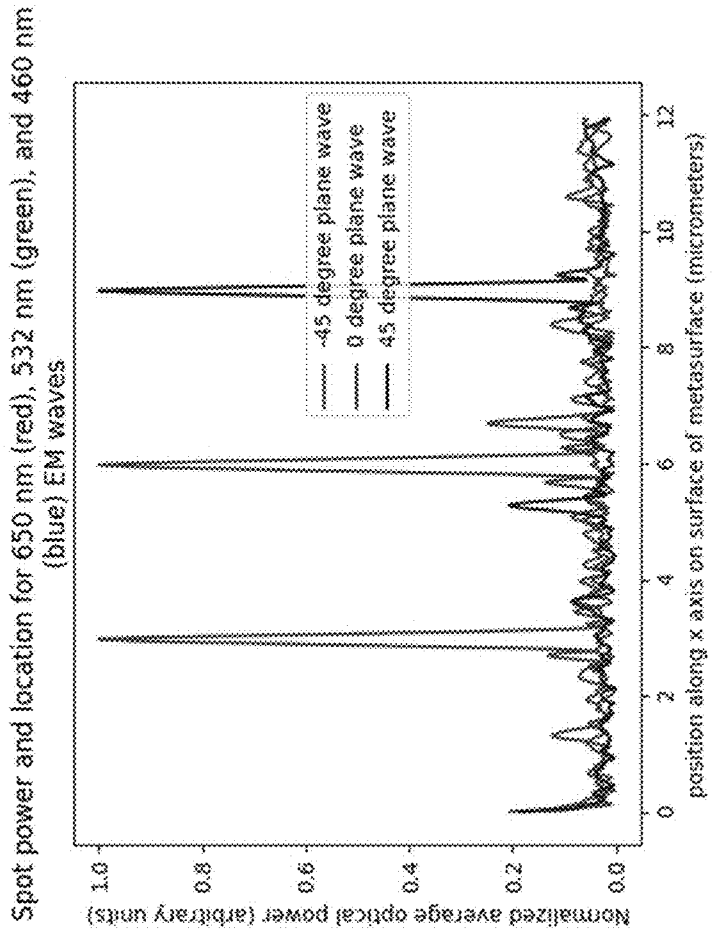
FIG. 3B shows a graph of the spot power and location for different angles of electromagnetic waves applied to the metasurface.

FIG. 3B shows a graph of the spot power and location for different angles of electromagnetic waves applied to the metasurface 102.

Figure 3E:
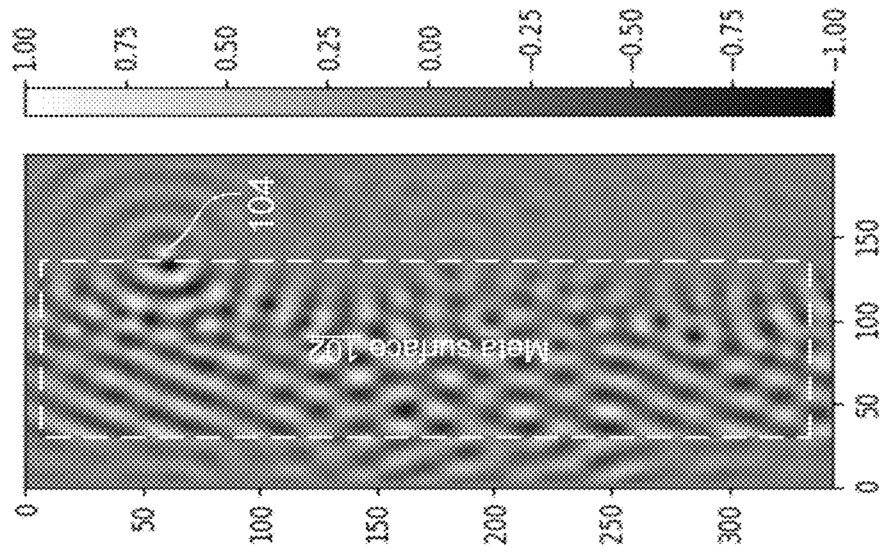
FIGS. 3C-3E show diagrams of the electric fields produced when the metasurface is illuminated by −45 degrees, 0 degrees, and 45 degrees angled light, respectively.
Figure 3D:
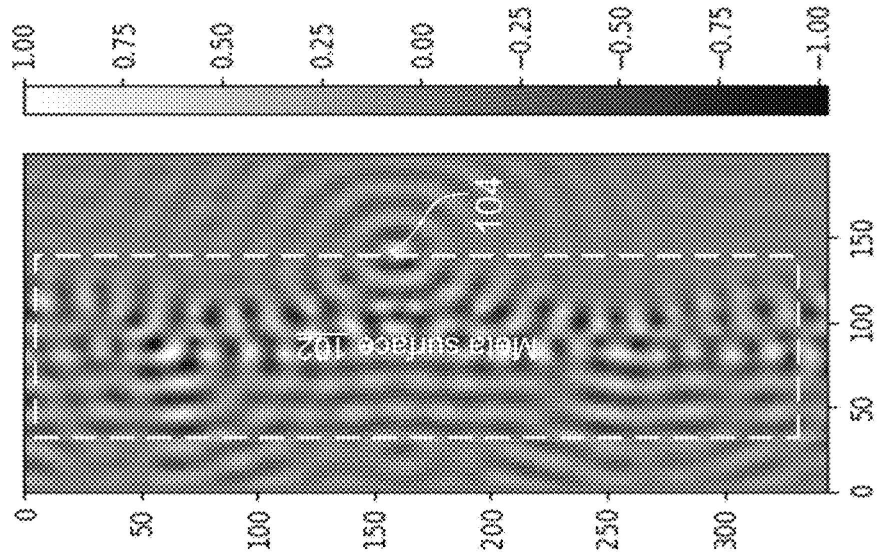
Figure 3C:
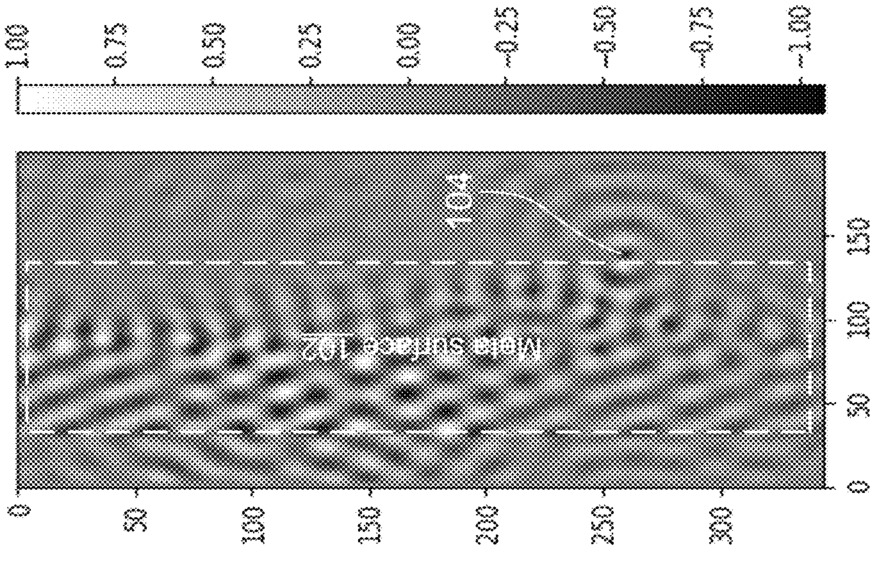

FIGS. 3C-3E show diagrams of the electric fields produced when the metasurface 102 is illuminated by −45 degrees, 0 degrees, and 45 degrees angled light, respectively. These figures also show the change in spot 104 position based on the different degrees of angled light.

Figure 3H:
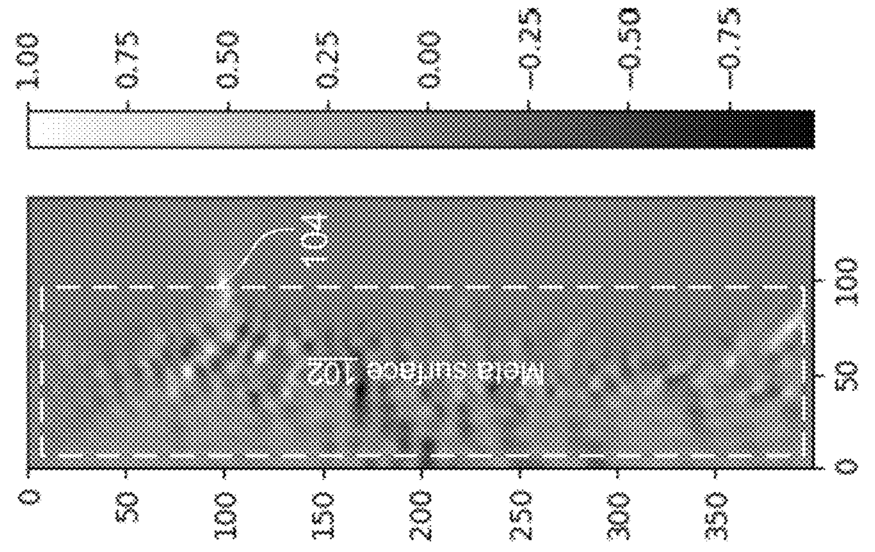
FIGS. 3F-3H show diagrams of the average optical power produced when the metasurface is illuminated by −45 degrees, 0 degrees, and 45 degrees angled light, respectively.
Figure 3G:
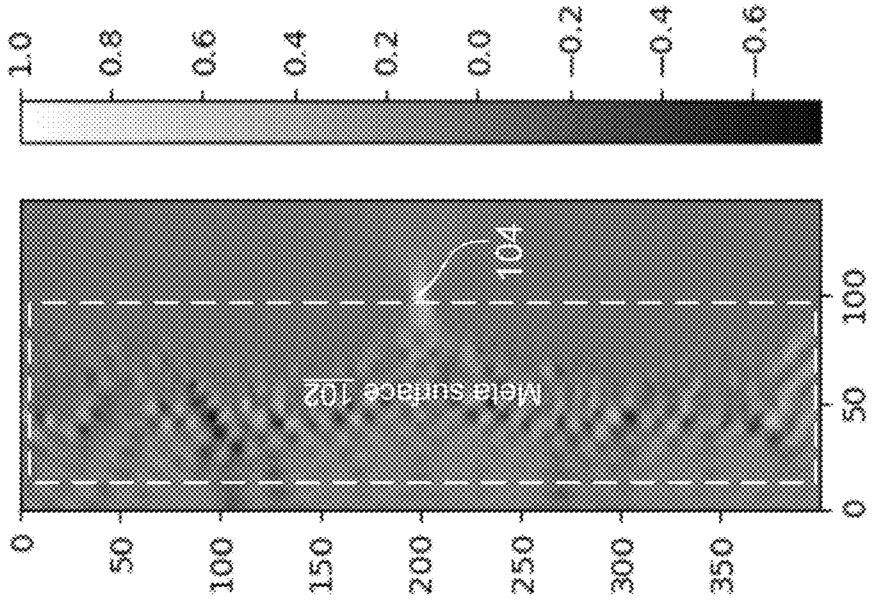
Figure 3F:
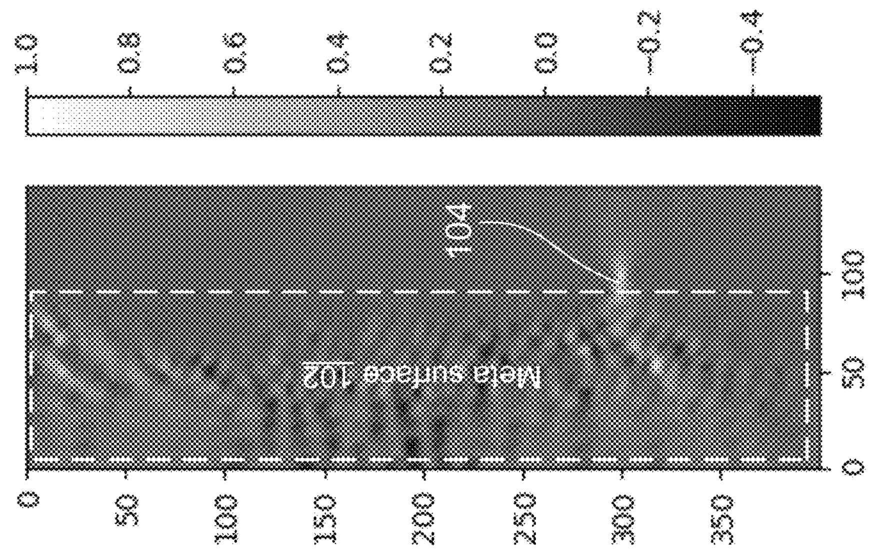

FIGS. 3F-3H show diagrams of the average optical power produced when the metasurface 102 is illuminated by −45 degrees, 0 degrees, and 45 degrees angled light, respectively.

Figure 3I:
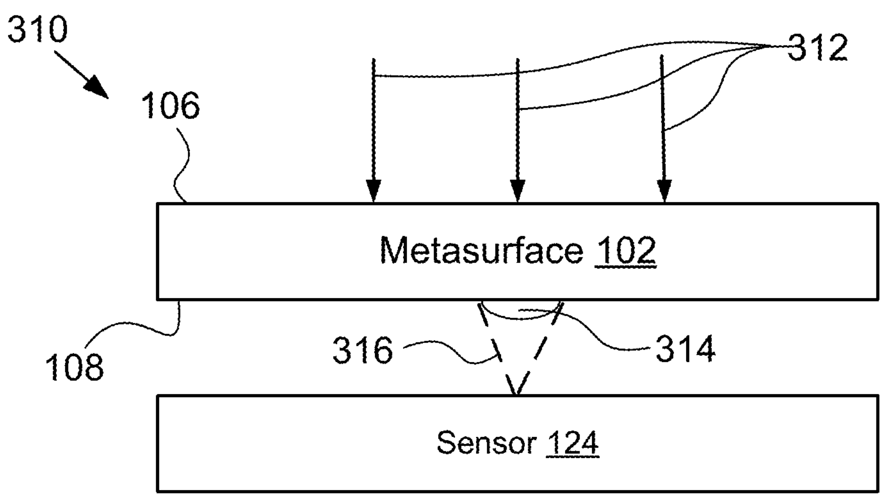
FIGS. 3I-3K show side views of example devices having a metasurface illuminated by −45 degrees, 0 degrees, and 45 degrees angled light.
Figure 3J:
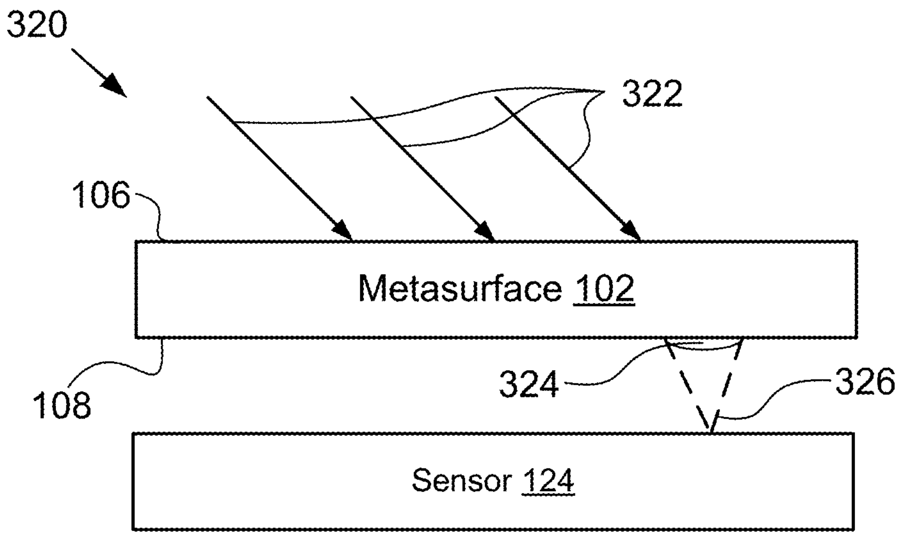
Figure 3K:
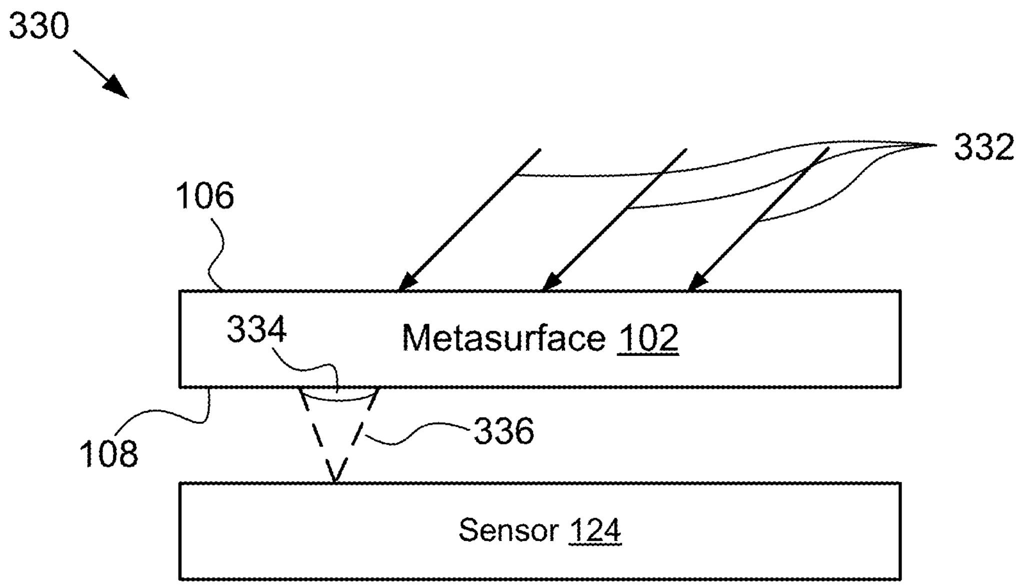

FIGS. 3I-3K show side views of example devices 310, 320, 330 having a metasurface 102 illuminated by 0 degrees, −45 degrees, and 45 degrees angled light, respectively. It should be noted that these metasurfaces 102 map not just one electromagnetic wave to one spot 104, but rather a single metasurface 102 maps wave A to spot A, wave B to spot B, wave C to spot spots C, etc. For instance, to use one of these for imaging, they need to, in some implementations, map normally incident light to a spot in the center, light that's a little angled to a spot a little off center, light that's very angled to a spot far off center, like here, for a single metasurface being illuminated by a succession of angled electromagnetic waves. For example, see the spots 104*a*, 104*b*, 104*c* depicted by metasurface 102*q* of FIG. 1Q. FIGS. 3I-3K are drawn in 2D, and the metasurface 102 acts the same way along the other axis, so every angled plane wave gets its own spot at a different x-y location.

FIG. 3I shows a side view of the example device 310 and how it processes light 312 illuminated by 0 degrees. The metasurface 102 maps the light 312 to a spot 314 with an area of focus 316 for sensor 124. It should be noted that the location of the spot 314 is at the bottom center of the metasurface 102.

FIG. 3J shows a side view of the example device 320 and how it processes light 322 illuminated by −45 degrees. The metasurface 102 maps the light 322 to a spot 324 with an area of focus 326 for sensor 124. It should be noted that the focal area 326 is approximately the same size as focal area 316 for light 312. However, the spot 324 is on the bottom of the metasurface 102 toward the left side of the metasurface 102 because of the angle of the illuminated light 322.

FIG. 3K shows a side view of the example device 330 and how it processes light 332 illuminated by 45 degrees. The metasurface 102 maps the light 332 to a spot 334 with an area of focus 336 for sensor 124. It should be noted that the focal area 336 is approximately the same size as focal area 316 for light 312 and the focal area 326 four light 322. However, the spot 334 is on the bottom of the metasurface 102 toward the right side of the metasurface 102 because of the angle of the illuminated light 332. It should be noted that all three spots 314, 324, 334 have a different location on the bottom of the metasurface 102 because they are produced by light waves with different incident angles.

Figure 4B:
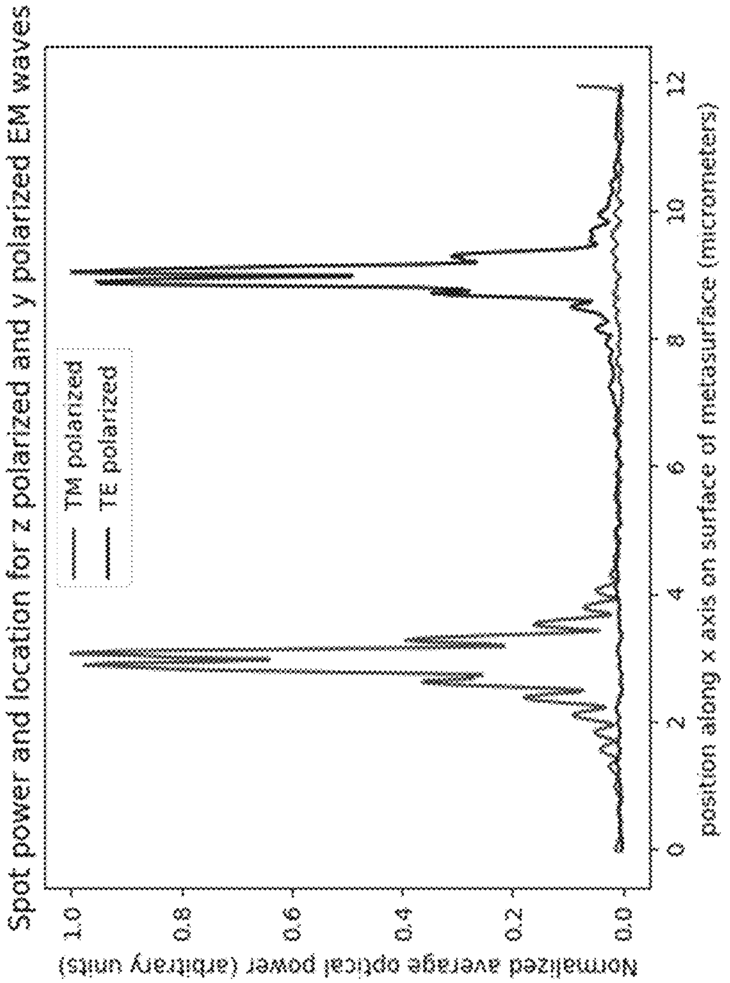
FIG. 4B shows a graph of the spot power and location for each polarization of electromagnetic waves applied to the metasurface.
Figure 4A:
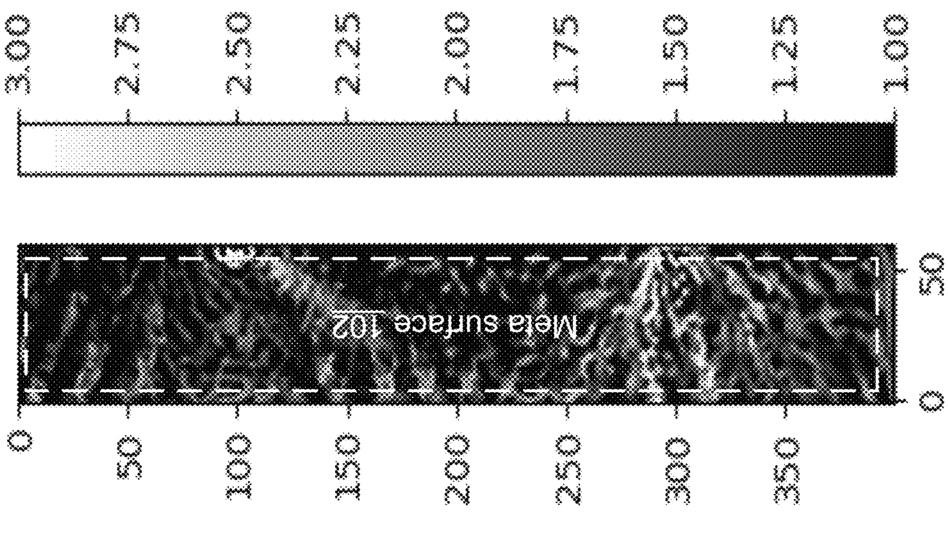
FIG. 4A shows an example of the metasurface when illuminated with a green plane wave of either Transverse Magnetic (TM) or Transverse Electric (TE) polarized incident light according to some implementations.

FIG. 4A shows an example of the metasurface 102 when illuminated with a green plane wave of either Transverse Magnetic (TM) or Transverse Electric (TE) polarized incident light according to some implementations. More specifically, FIG. 4A shows a nonlocal, volumetric metasurface 102, when illuminated from its left side with a green plane wave of either TM or TE polarized incident light, to produce distinct spots on its right side based on the polarization.

FIG. 4B shows a graph of the spot power and location for each polarization of electromagnetic waves applied to the metasurface 102.

Figure 4C:
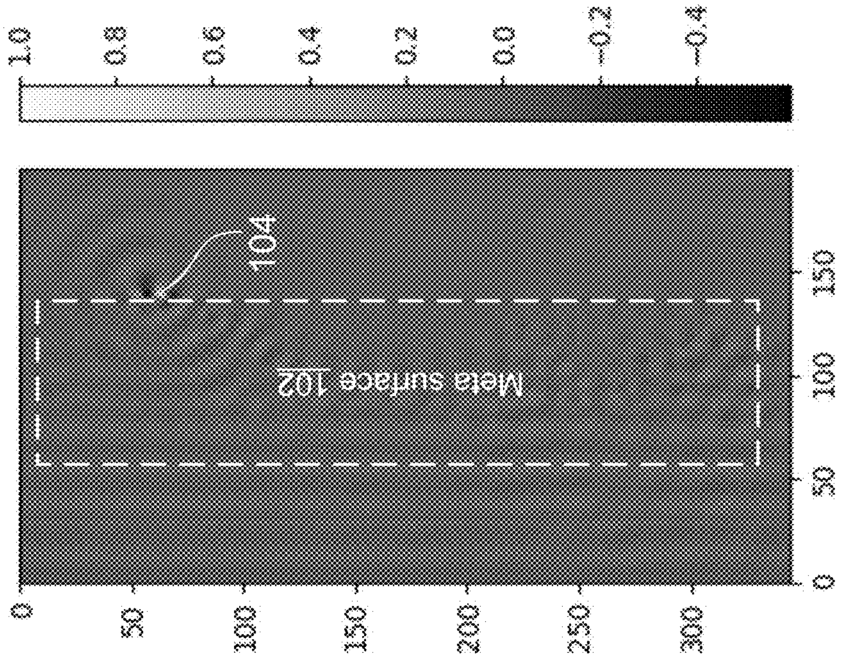
FIGS. 4C-4D shows diagrams of the electric fields produced when the metasurface is illuminated by TM and TE polarized light, respectively.
Figure 4D:
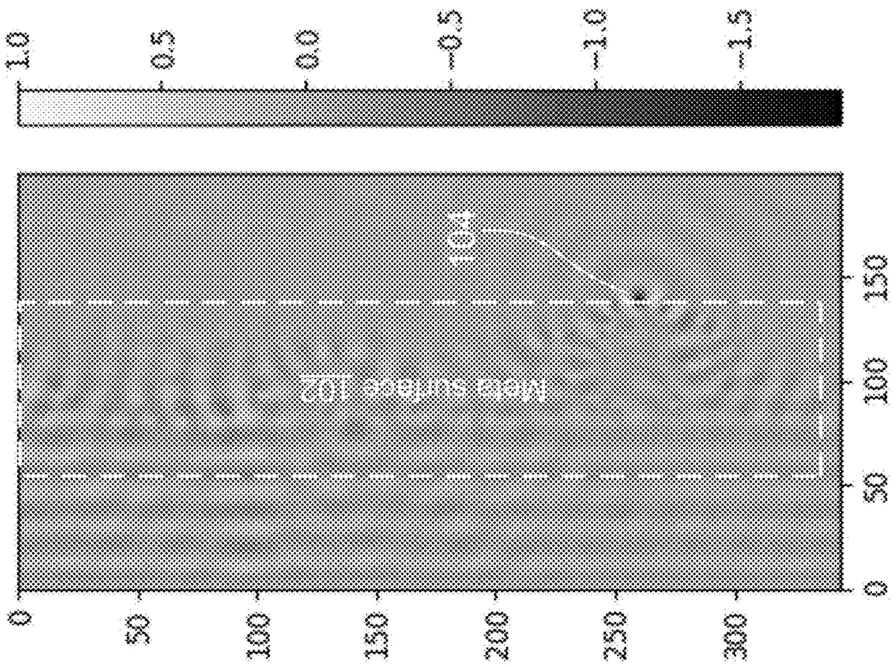

FIGS. 4C-4D shows diagrams of the electric fields produced when the metasurface 102 is illuminated by TM and TE polarized light, respectively. FIGS. 4C-4D also show the difference in spot 104 position based upon the different polarizations of light.

Figure 4F:
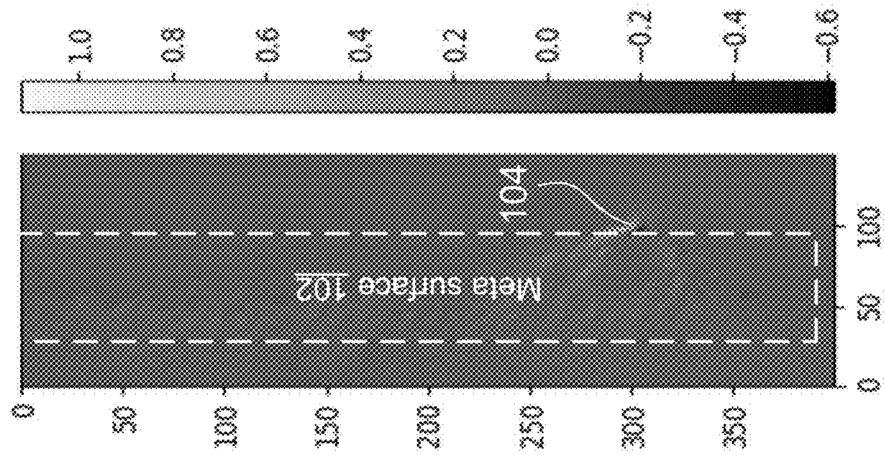
FIGS. 4E-4F show diagrams of the average optical power produced when the metasurface is illuminated by TM and TE polarized light, respectively.
Figure 4E:
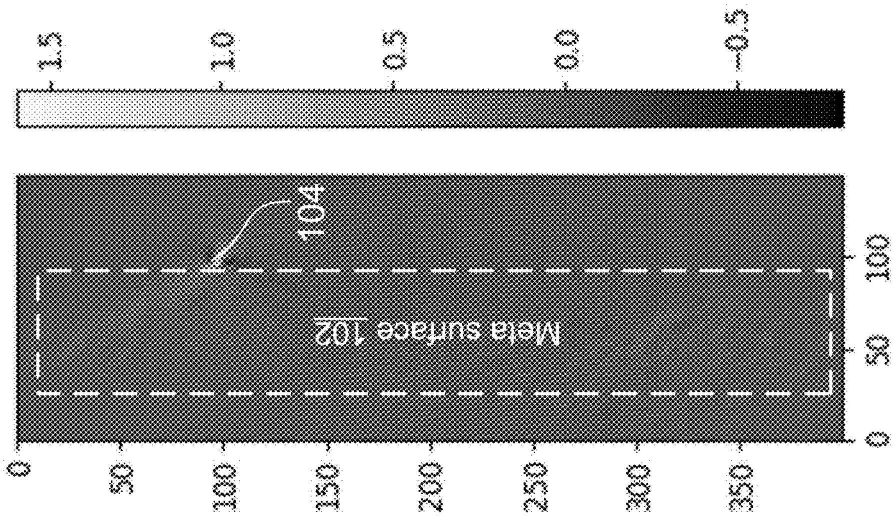

FIGS. 4E-4F show diagrams of the average optical power produced when the metasurface 102 is illuminated by TM and TE polarized light, respectively. Again, FIGS. 4E and 4F also show the difference in spot 104 position based upon the different polarizations of light.

Figure 5A:
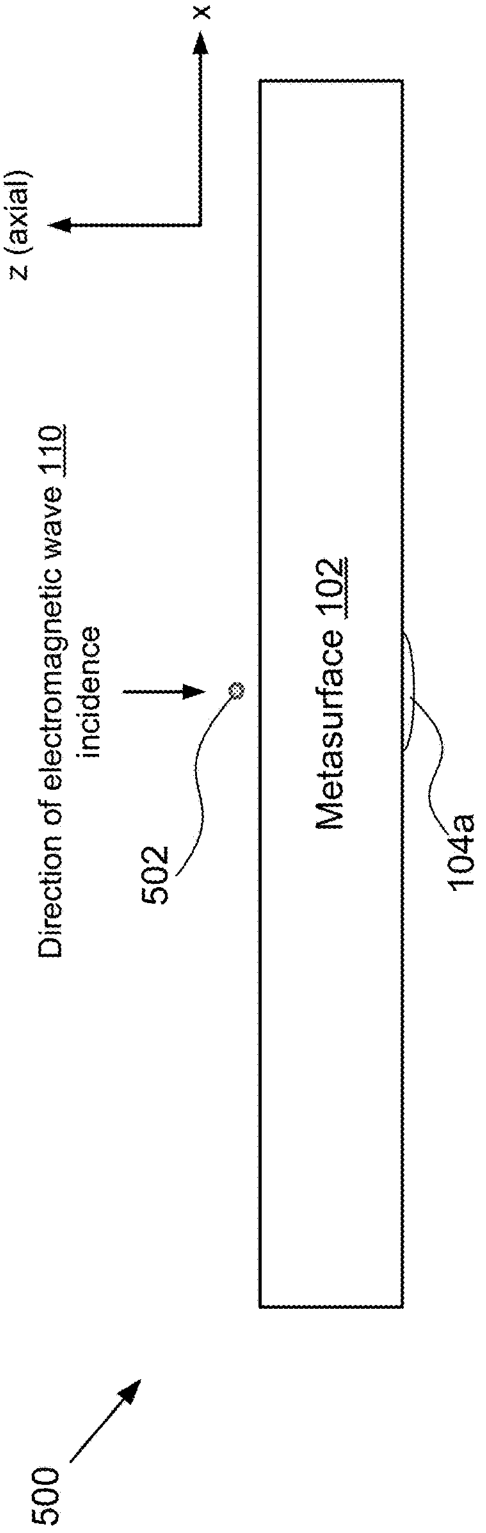
FIGS. 5A and 5B show block diagrams of a device with a metasurface utilizing evanescent waves from a scatterer smaller than half the wavelength of the incident light.
Figure 5B:
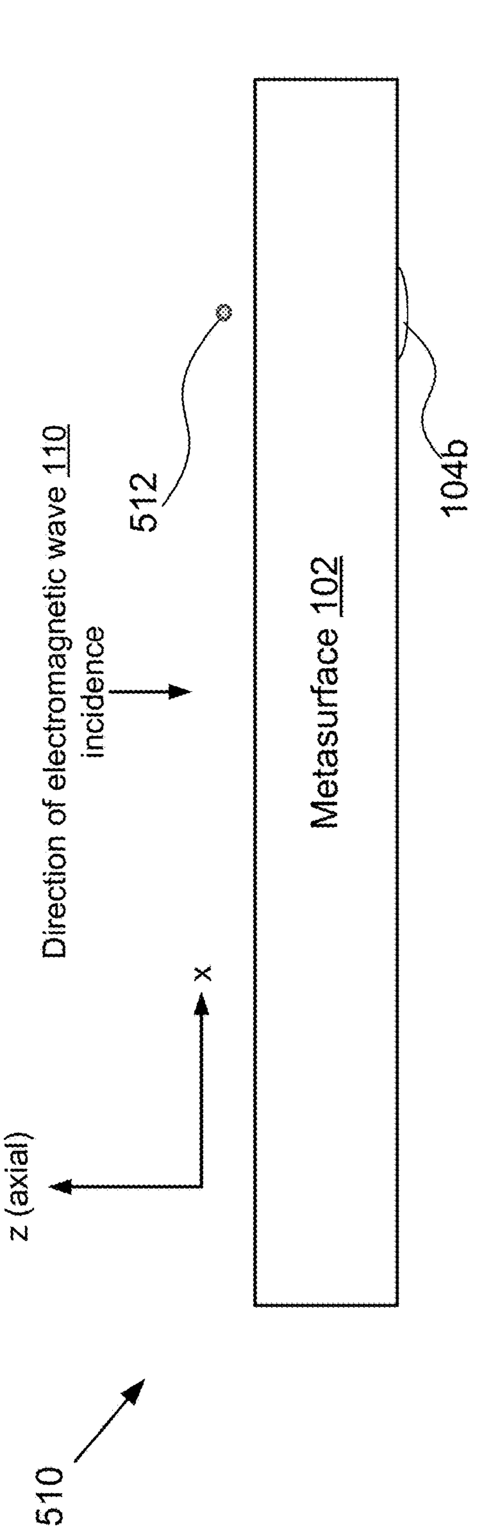

Referring now to FIGS. 5A and 5B, other implementations of devices 500, 510 including the metasurface 102 of the present disclosure are shown. The devices 500, 510 of FIGS. 5A and 5B comprise a metasurface 102 having a spot 104*a*, 104*b* as well as a scatterer 502, 512. In some implementations, the scatterer 502, 512 has a diameter smaller than the wavelength divided by 2. In particular, a comparison of FIG. 5A to FIG. 5B illustrates how evanescent waves from a scatterer 502, 512 may affect the position of the spot 104*a*, 104*b*. In fact, the spot 104 location is dependent on the location of the scatterer 502, 512. FIG. 5A shows a nonlocal, volumetric metasurface 102 that utilizes the evanescent waves from scatterer 502. For example, the scatterer 502 is smaller than half the wavelength of the incident light, which would otherwise be invisible or impossible to localize precisely. As depicted in FIG. 5A, the scatterer 502 is positioned above the metasurface 102 near its center. The result is that the spot 104*a* is on the bottom side of the metasurface 102 with approximately the same lateral position as the scatterer 502. For the second device 510 depicted in FIG. 5B, the scatterer 512 is positioned closer to the right side of the metasurface 102. The result is that the spot 104*b* is on the bottom side of the metasurface 102 with approximately the same lateral position as the scatterer 512.

Figure 6A:
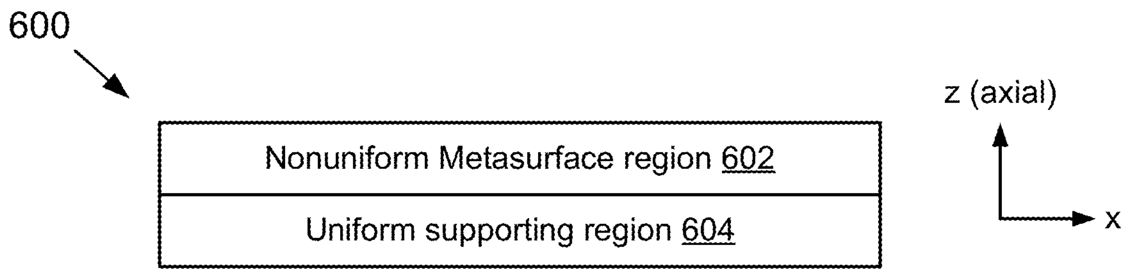
FIGS. 6A-6F show block diagrams of three example configurations of a device with the metasurface and a uniform supporting region.
Figure 6B:
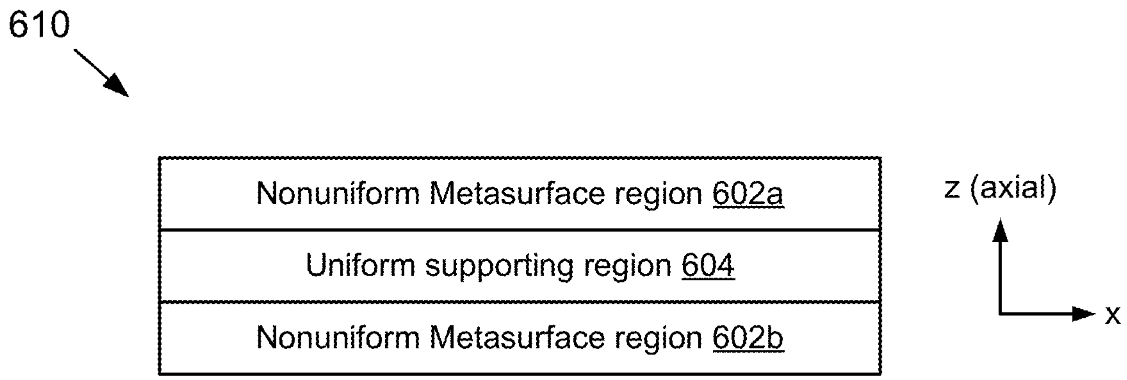
Figure 6C:
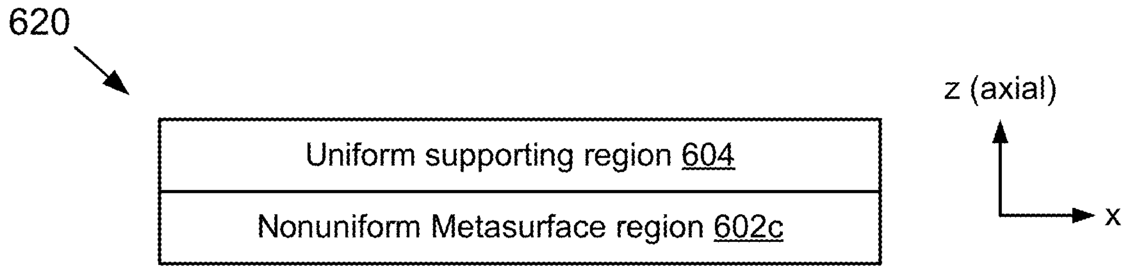

Referring now to FIGS. 6A-6C, three example configurations of devices 600, 610, 620 with one or more metasurfaces 602 and a uniform supporting region 604 are shown. The materials of the metasurface 102 are nonuniform and may be in a supporting material 604, such as a hydrogel, may be on or below a substrate, such as a glass slide, or might be self-supporting. Similarly, the refractive indices or other properties of the metasurface 102 may have a number of discrete levels, or they might vary continuously. The metasurface 102 might be in a surrounding medium, such as air or oil, or might be independent of such a medium. FIG. 6A shows a device 600 having two layers, a nonuniform metasurface region 602 positioned above a uniform supporting region 604. FIG. 6B shows a device 610 having three layers, a first nonuniform metasurface region 602*a*, positioned over a uniform supporting region 604 that is positioned over a second nonuniform metasurface region 602*b*. FIG. 6C shows a device 620 having two layers a first uniform supporting region 604 positioned over a nonuniform metasurface region 602C. A comparison of FIG. 6A to FIG. 6C illustrates how the layers may have an inverted form.

Figure 6D:
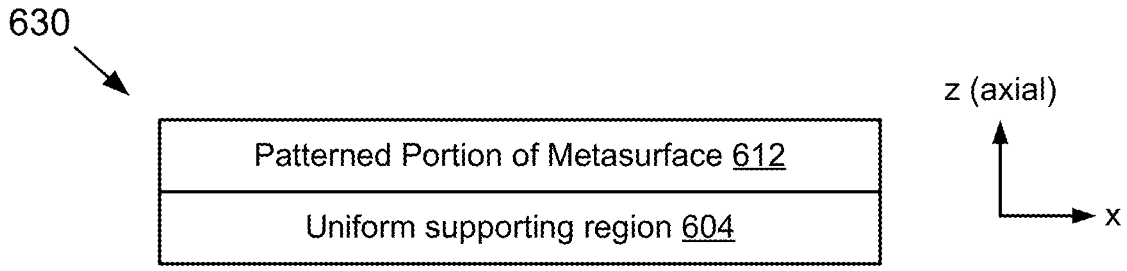
Figure 6E:
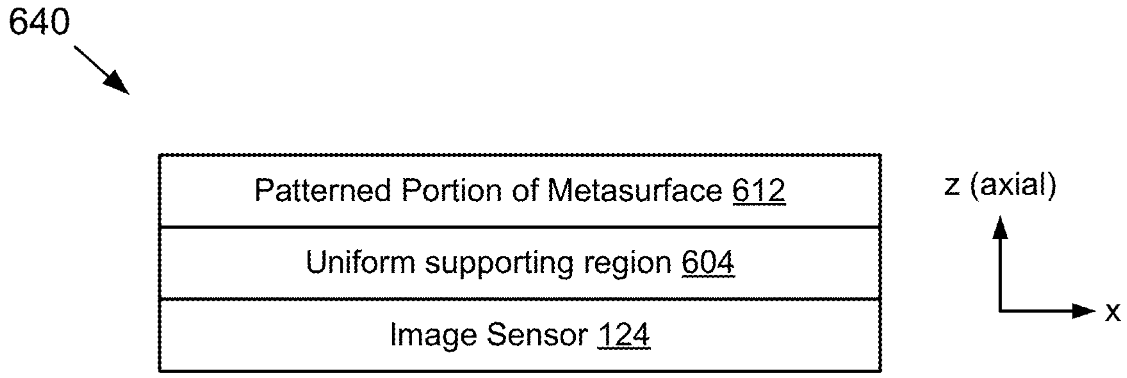
Figure 6F:
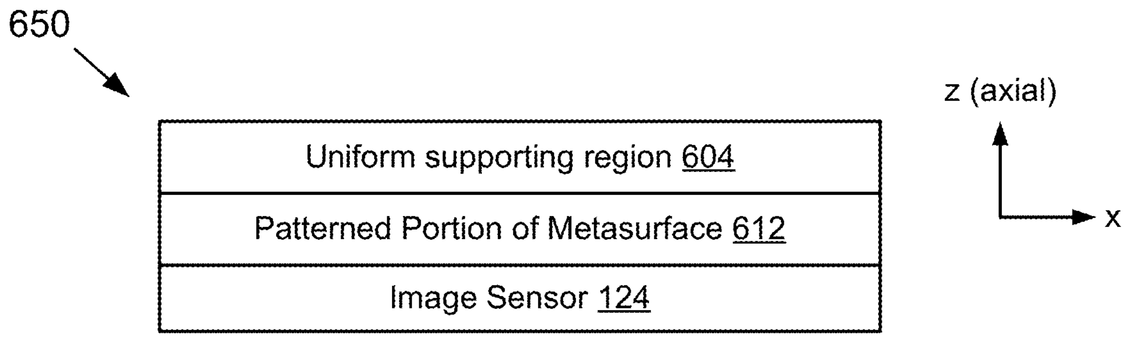

Referring now to FIGS. 6D-6F, three additional example configurations of devices 630, 640, 650 with a metasurface 612, a uniform supporting region 604 and optionally an image sensor 124 are shown.

FIG. 6D shows one example of the device 630 having a metasurface 612 and a uniform supporting region 604. In this example, the metasurface 612 is positioned over the uniform supporting region 604. For example, the metasurface 612 may be the pattern portion of the metasurface. The uniform supporting region 604 may be a substrate constructed from one of the substrate material that have been described above.

FIG. 6E shows another example of the device 640 having a metasurface 612, a uniform supporting region 604, and an image sensor 124. In this configuration, the device 640 is similar to that of FIG. 6D but with an additional image sensor 124. The device 640 of FIG. 6E is an example of a design that may be used where the devices 630 is mounted to a camera as the image sensor 124. The device 630 could be glued in a proximate position or otherwise affixed to the camera sensor.

FIG. 6F shows another example device 650 having the uniform supporting region 604, the metasurface 612, and the image sensor 124. In this example, the patterned portion of the metasurface 612 is positioned between the uniform supporting region 604 and the image sensor 124. This device 650 is an example of using the design of FIG. 6D and inverting it before mounting it to the image sensor 124. The image sensor 124 can be a camera similar to the description above with reference to FIG. 6E.

Figure 7B:
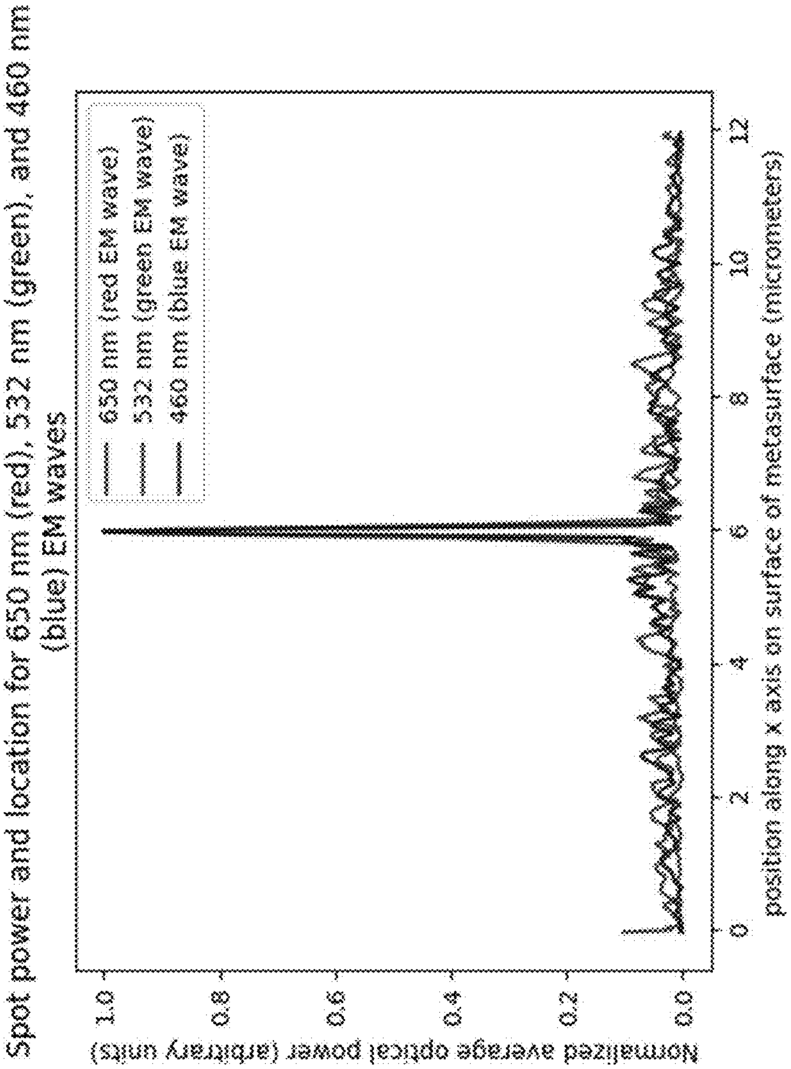
FIG. 7B shows a graph of the spot power and location regardless of light color.
Figure 7A:
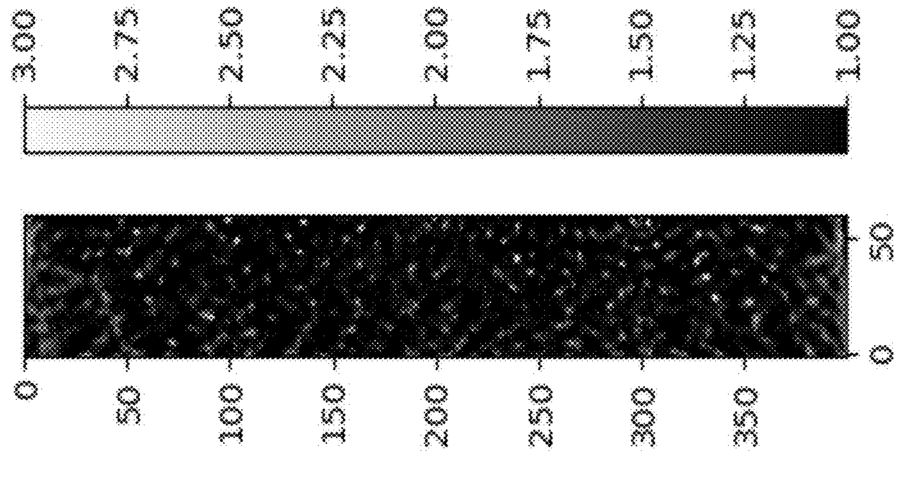
FIG. 7A shows an example of a metasurface when illuminated from its left side with a plane wave of either red, green, or blue incident light, produce the same spot on its right side regardless of the color.

FIG. 7A shows an example of the metasurface 102 when illuminated from its left side with a plane wave of either red, green, or blue incident light, to produce the same spot 104 on its right side regardless of the color.

FIG. 7B shows a graph of the spot power and location regardless of light color.

Figure 7C:
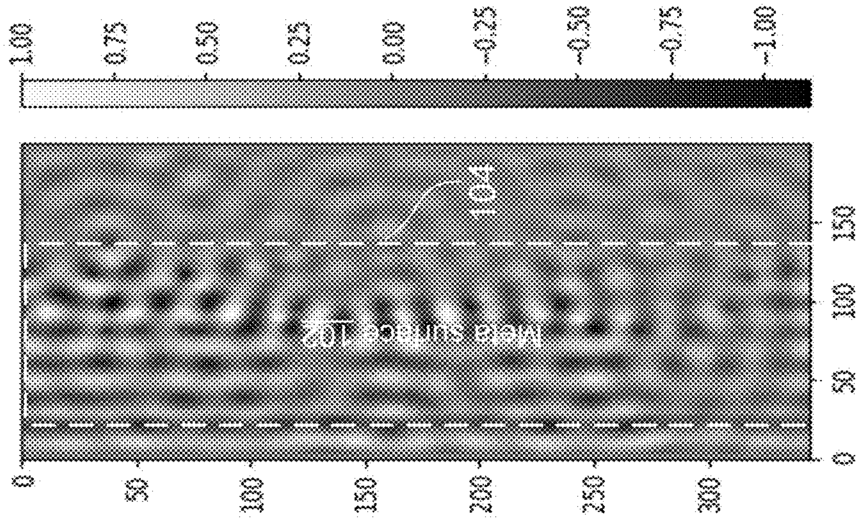
FIGS. 7C-7D show a diagram of the electric fields produced when the metasurface is illuminated by red, green, and blue light, respectively.
Figure 7D:
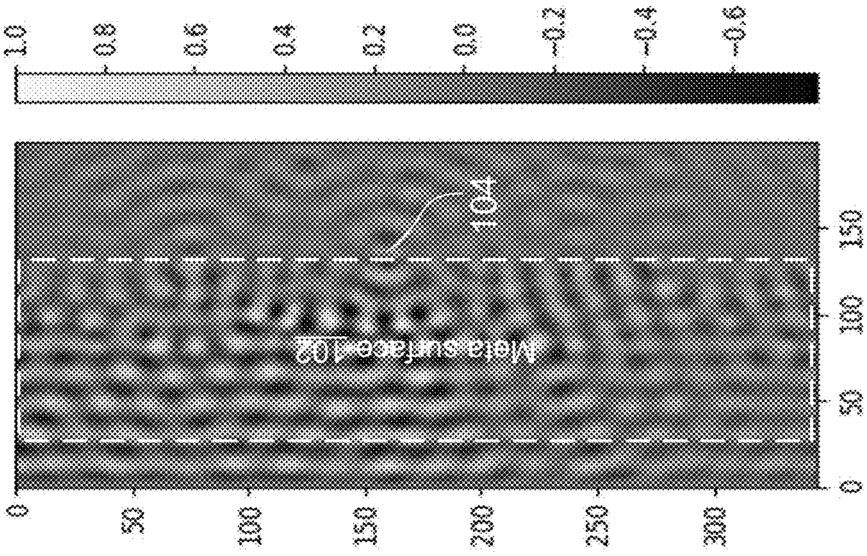

FIGS. 7C-7D show a diagram of the electric fields produced when the metasurface 102 is illuminated by red, green, and blue light, respectively. It should be noted that the spot 104 as the relative same position regardless of the color.

Figure 7E:
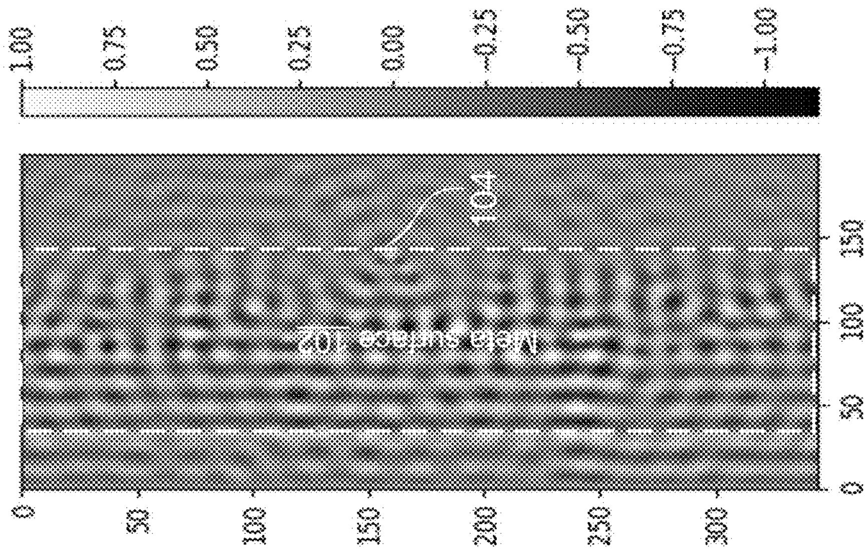
FIGS. 7E-7F show a diagram of the average optical power produced when the metasurface is illuminated by red, green, and blue light, respectively.
Figure 7F:
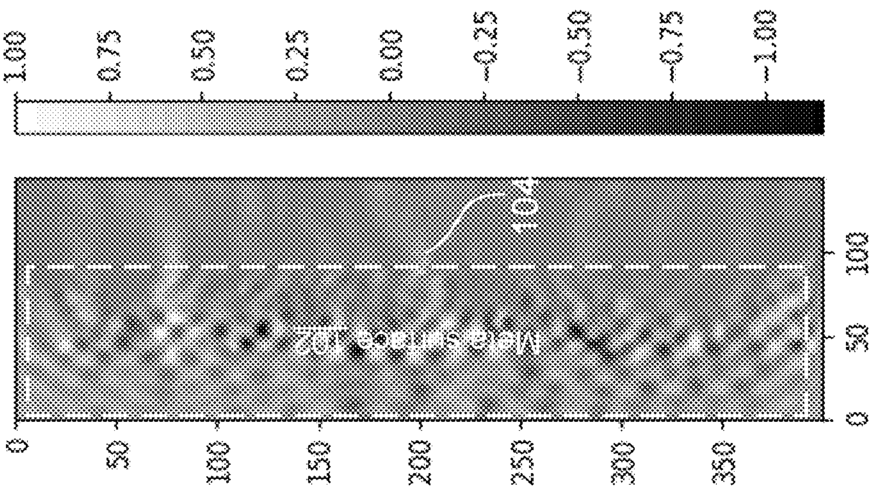

FIGS. 7E-7F show a diagram of the average optical power produced when the metasurface 102 is illuminated by red, green, and blue light, respectively.

Referring now to FIGS. 8-21, several metasurfaces 102 may be used in different optical systems. Also described are several applications of such metasurfaces 102.

Figure 8:
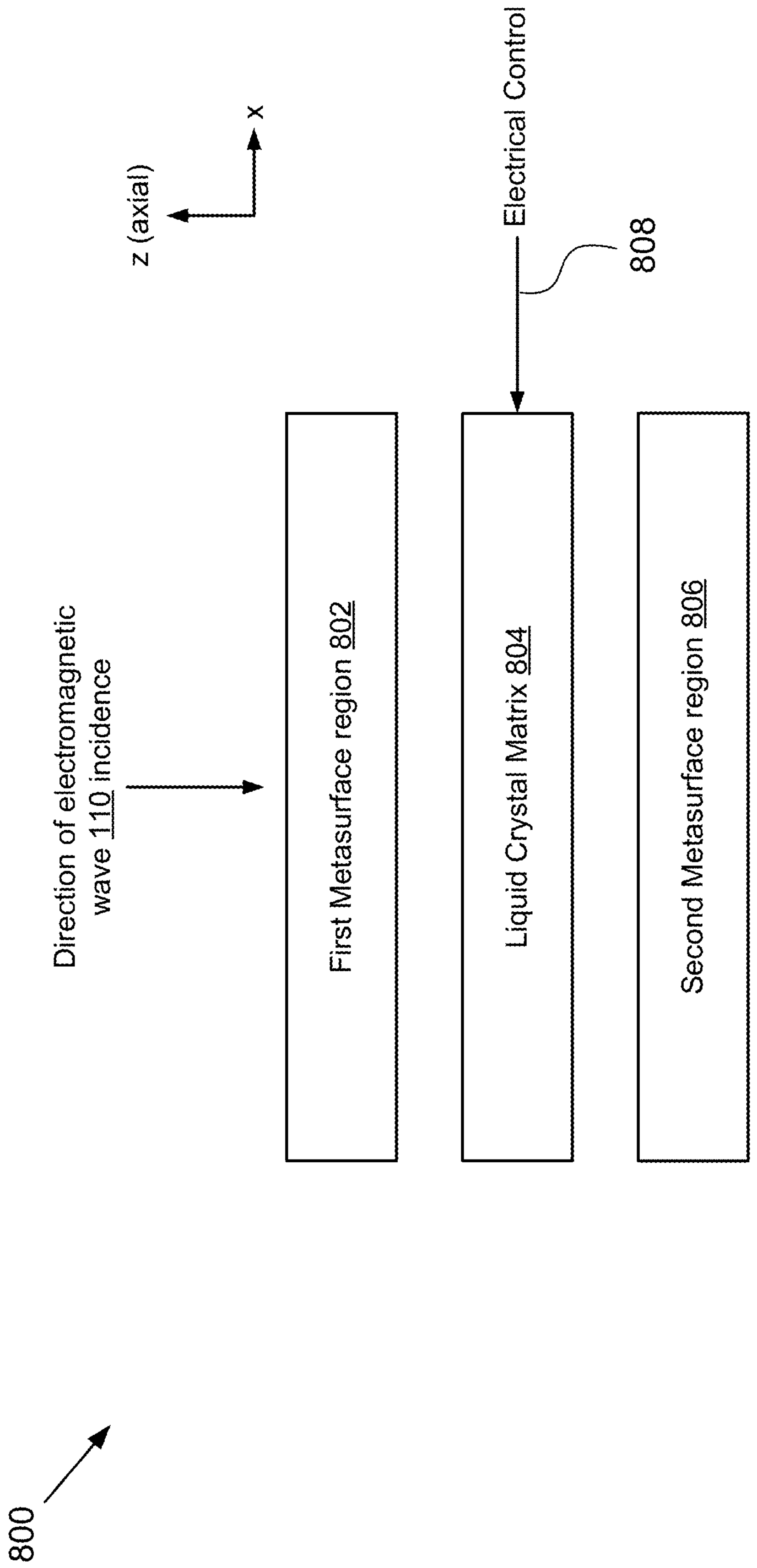
FIG. 8 shows a diagram of an example device having a metasurface used in conjunction with a liquid crystal matrix.

FIG. 8 shows nonlocal volumetric metasurfaces 102 used in conjunction with an electrically controlled liquid crystal matrix. The device 800 comprises a first metasurface region 802, an actively controlled device, e.g., a liquid crystal matrix 804, and a second metasurface region 806 is shown. The first metasurface region 802 is positioned above the liquid crystal matrix 804 while the second metasurface region 806 is positioned below the liquid crystal matrix 804. In some implementations, the first and second metasurface regions 802, 806 are metasurfaces 102 as have been described above. The electromagnetic waves 110 are directed towards the top of the first metasurface region 802 and propagate through the liquid crystal matrix 804 and the second metasurface region 806. The liquid crystal matrix 804 is coupled via signal line 808 to receive electrical control signals. The addition of the liquid crystal matrix 804 to the device 800 allows for active control of the properties of the device 800. For example, the first and second metasurface regions 802, 806 can emulate focus at one depth when the liquid crystal matrix 804 is activated and emulate focus at a second depth when the liquid crystal matrix 804 is deactivated.

Figure 9:
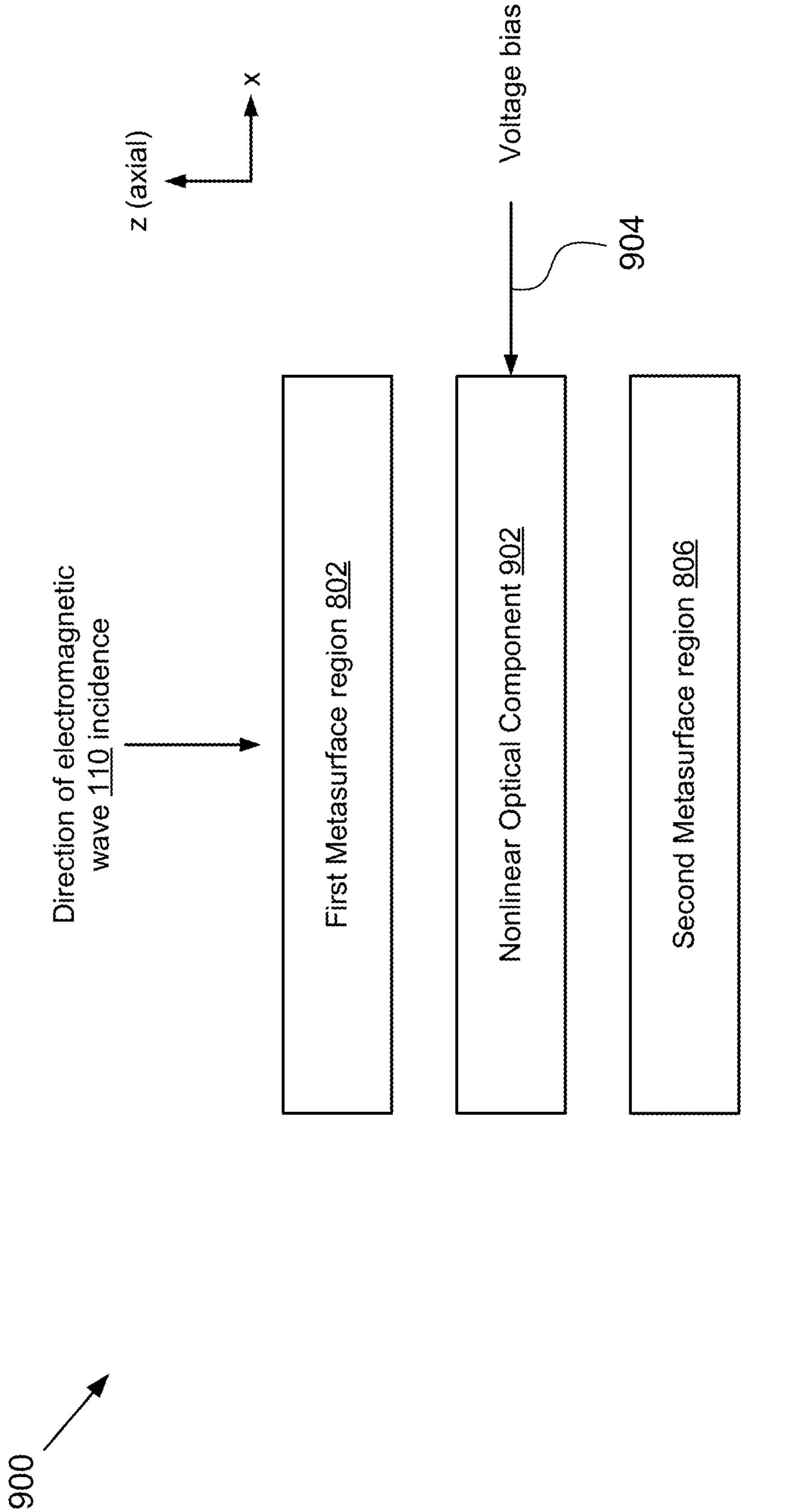
FIG. 9 shows a diagram of an example device having a metasurface used in conjunction with a nonlinear crystal.

FIG. 9 illustrates another example device 900 having a metasurface 102 used in conjunction with a nonlinear optical component 902. The device 900 comprises the first metasurface region 802, a nonlinear optical component 902, and the second metasurface region 806. In some implementations, the nonlinear optical component 902 is a nonlinear optical or optical electrical components such as nonlinear crystals or image intensifier tubes. The first metasurface region 802 is positioned above the nonlinear optical component 902 while the second metasurface region 806 is positioned below the nonlinear optical component 902. In some implementations, the first and second metasurface regions 802, 806 are metasurfaces 102 as have been described above. The electromagnetic waves 110 are directed towards the top of the first metasurface region 802 and promulgate downward through the nonlinear optical component 902 and the second metasurface region 806. The nonlinear optical component 902 is coupled via signal line 904 to receive a voltage bias signal. The device 900 nonlinear and linear components can be used to perform optical computing and preprocessing. The nonlinear optical component 902 is responsive to the voltage bias applied to signal line 904 to selectively activate and deactivate the nonlinear optical component 902. Algorithms such as machine learning inference can thus be realized with the device 900. For instance, the algorithms may include: a machine learning model which has already been trained using a conventional method, a machine learning model which is an alternating series of linear, then nonlinear functions or the like. To implement the functions using the metasurfaces 102, the layers of the device can be designed such that the metasurface implements the linear operation of one stage of the machine learning model on the incident light. The nonlinear component then implements the nonlinear function for one stage of the machine learning model, which may then be followed by a second metasurface 102. This can be repeated for additional stages of the machine learning model with any number of metasurfaces 102.

Figure 10B:
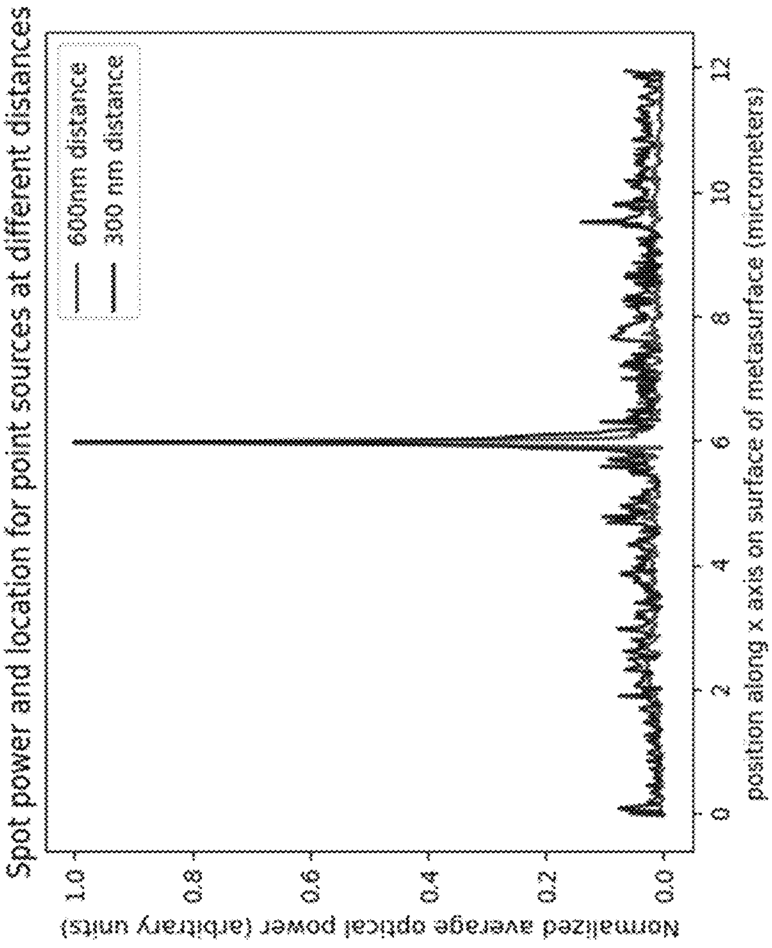
FIG. 10B shows a graph of the spot power and location for each distance from the surface of the point source applied to the metasurface.
Figure 10A:
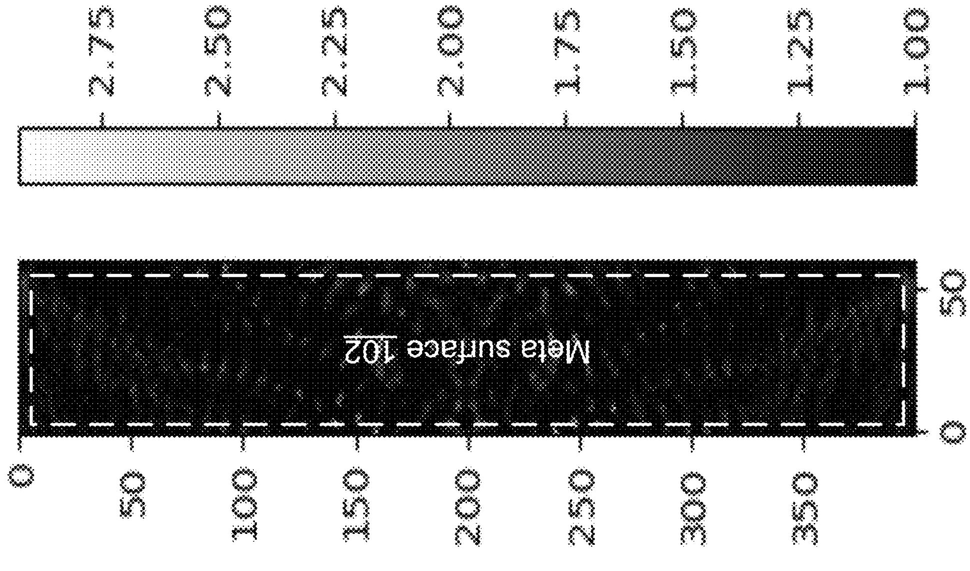
FIG. 10A shows an example of a metasurface when illuminated from its left side with a point source which is either 600 nm or 300 nm from the surface of the metasurface, produces spots on its right side which are of different size, emulating depth of field.

FIG. 10A shows an example of a metasurface 102 when illuminated from its left side with a point source which is either 600 nm or 300 nm from the surface of the metasurface 102 and produces spots on its right side which are of different size, emulating the depth of field.

FIG. 10B shows a graph of the spot power and location for each distance from the surface of the point source applied to the metasurface.

Figure 10D:
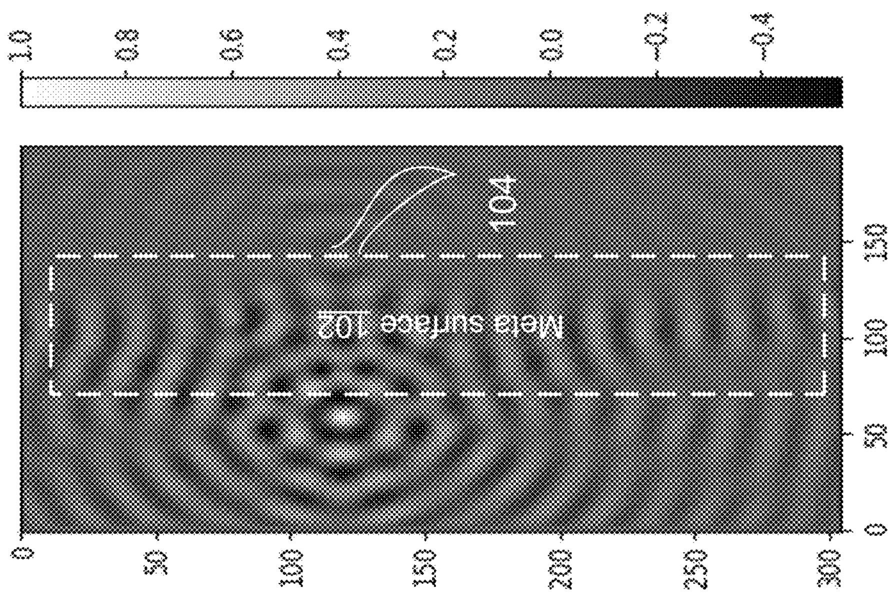
FIGS. 10C-10D show diagrams of the electric fields produced when the metasurface is illuminated by the 600 nm distant and the 300 nm distant source, respectively.
Figure 10C:
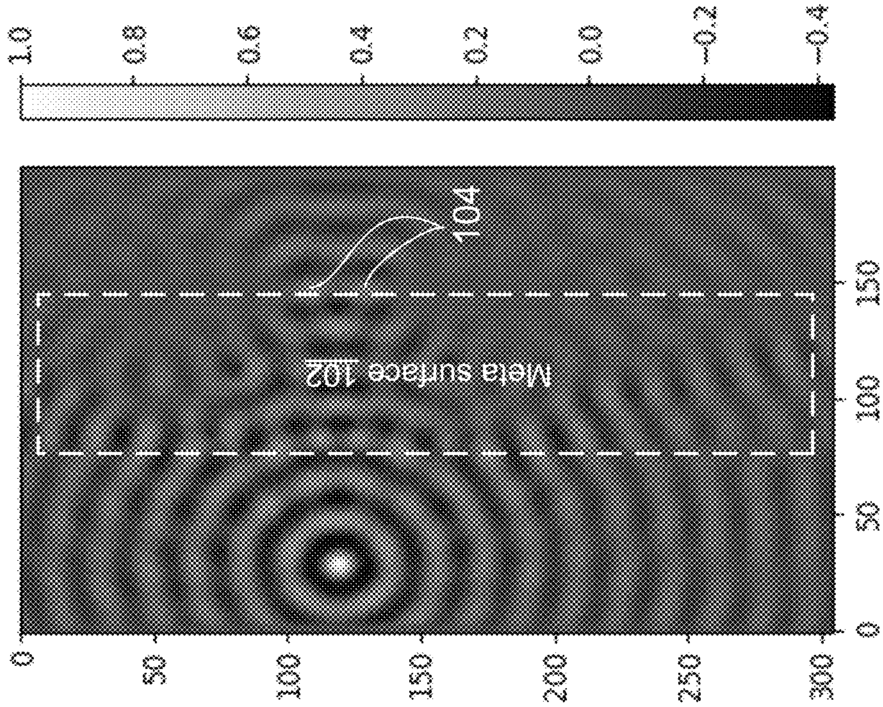

FIGS. 10C-10D show diagrams of the electric fields produced when the metasurface 102 is illuminated by the 600 nm distant and the 300 nm distant source, respectively.

Figure 10F:
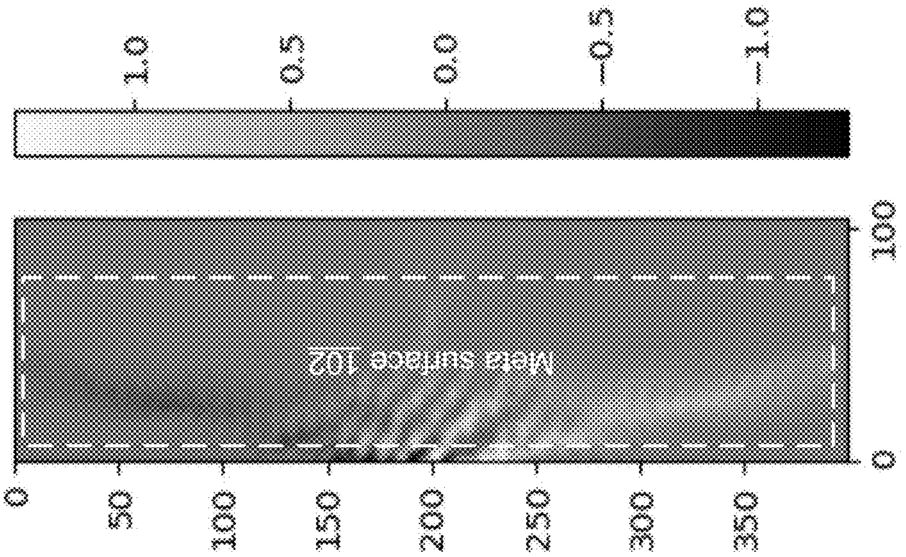
FIGS. 10E-10F show diagrams of the average optical power produced when the metasurface is illuminated by the 600 nm distant and the 300 nm distant source, respectively.
Figure 10E:
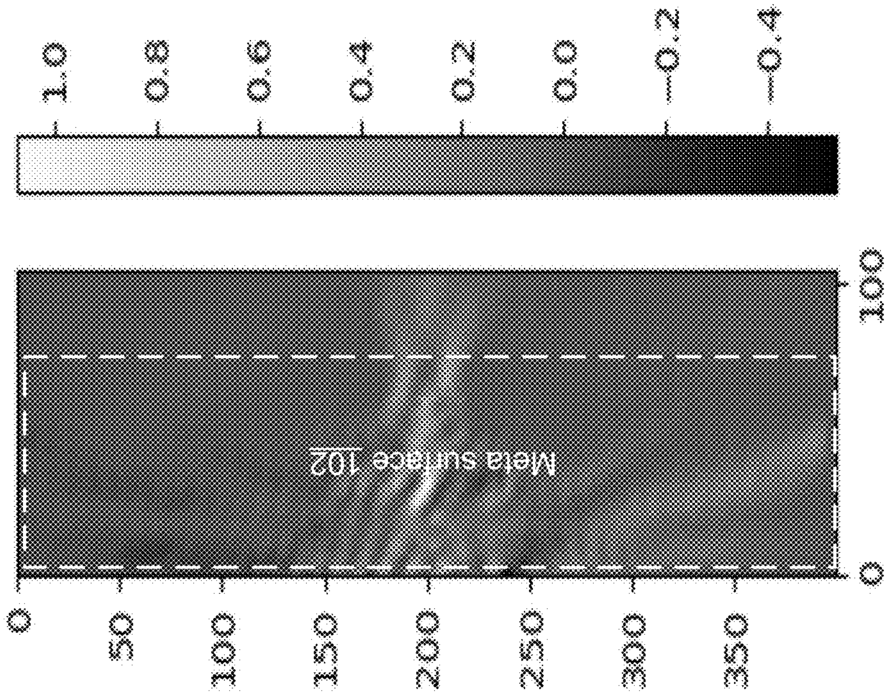

FIGS. 10E-10F show diagrams of the average optical power produced when the metasurface is illuminated by the 600 nm distant and the 300 nm distant source, respectively.

Figure 11B:
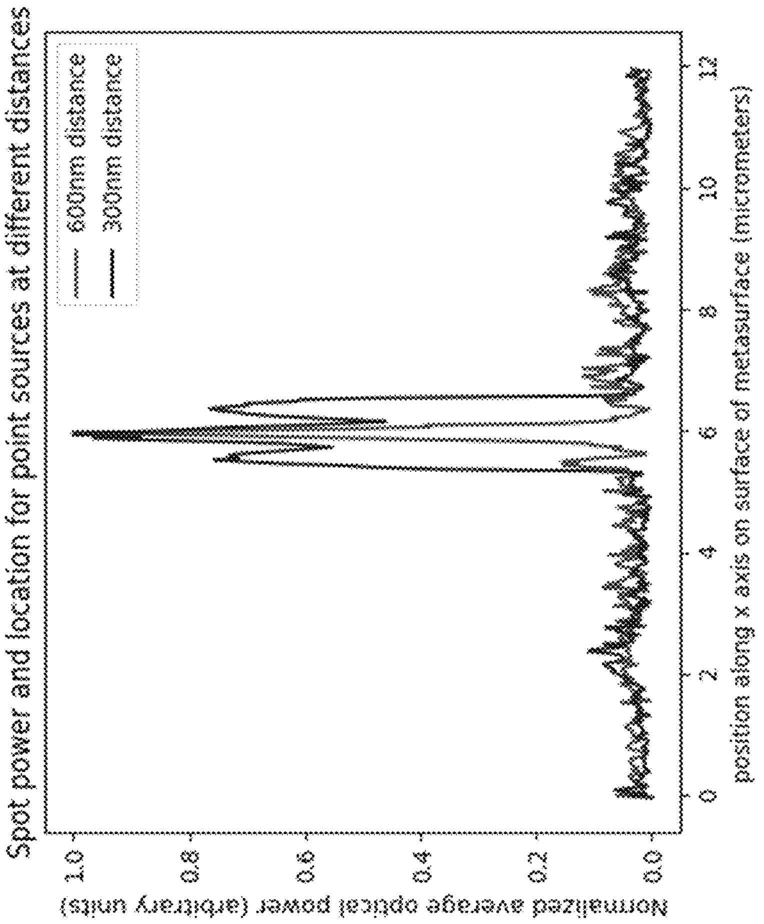
FIG. 11B shows a graph of the spot power and location for each polarization of electromagnetic waves applied to the metasurface.
Figure 11A:
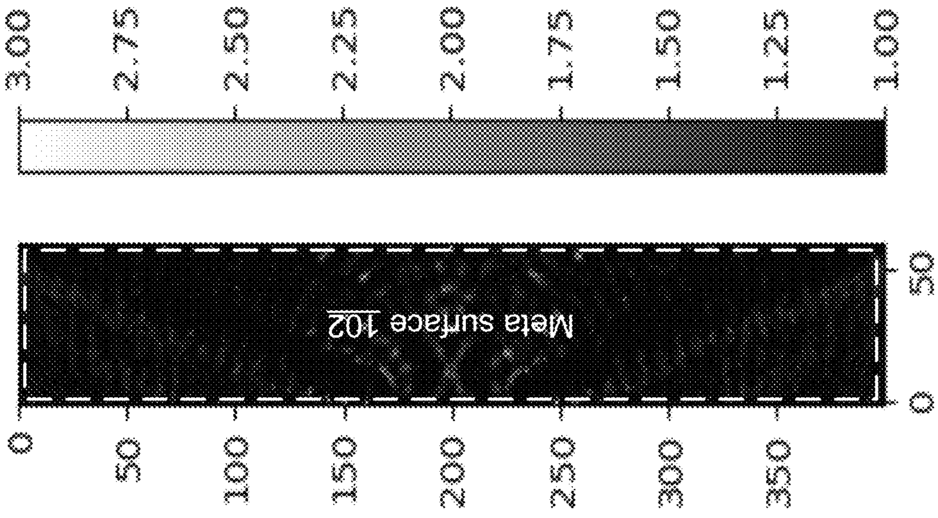
FIG. 11A shows an example of a metasurface when illuminated from its left side with a point source which is either 600 nm or 300 nm from the surface of the metasurface, produces a spot on its right side which emulating a lack of depth of field.

FIG. 11A shows an example metasurface 102 when illuminated from its left side with a point source which is either 600 nm or 300 nm from a surface of the metasurface 102, produces a spot on its right side which emulating a lack of depth of field.

FIG. 11B shows a graph of the spot power and location for each polarization of electromagnetic waves applied to the metasurface.

Figure 11D:
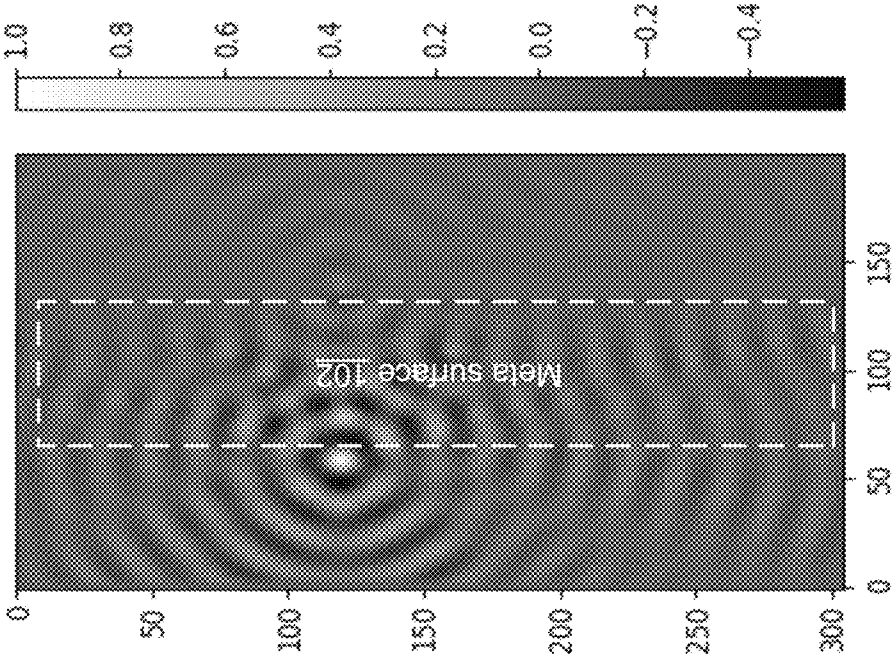
FIGS. 11C-11D show diagrams of the electric fields produced when the metasurface is illuminated by the 600 nm distant and the 300 nm distant source, respectively.
Figure 11C:
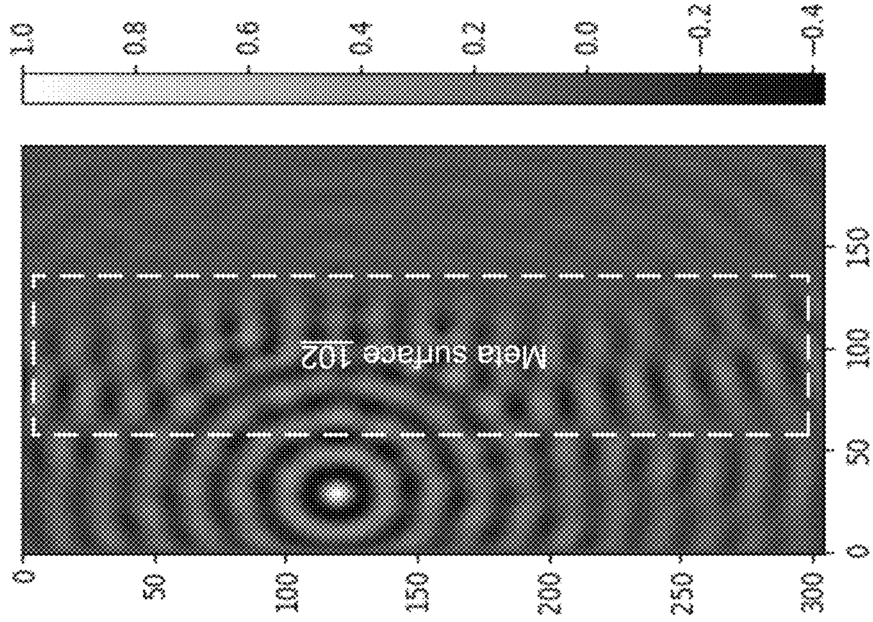

FIGS. 11C-11D show diagrams of the electric fields produced when the metasurface 102 is illuminated by the 600 nm distant and the 300 nm distant source, respectively.

Figure 11F:
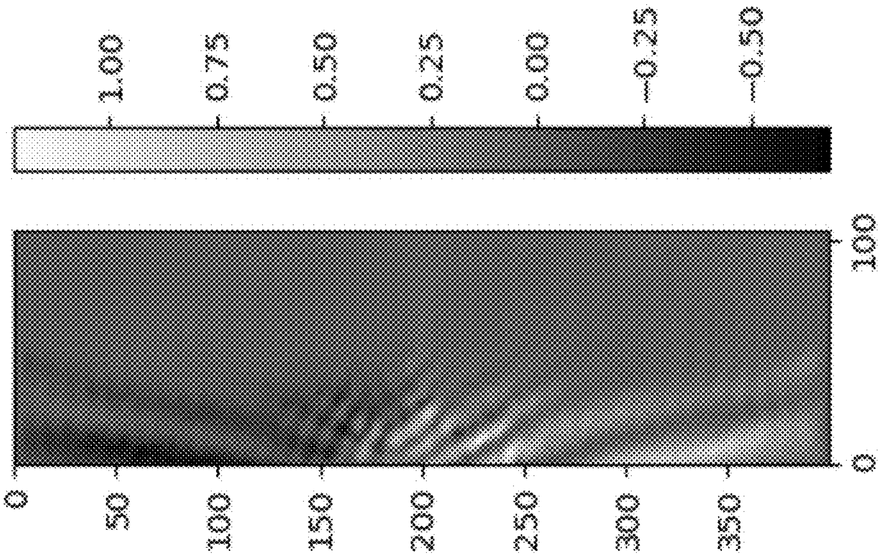
FIGS. 11E-11F show diagrams of the average optical power produced when the metasurface is illuminated by the 600 nm distant and the 300 nm distant source, respectively.
Figure 11E:
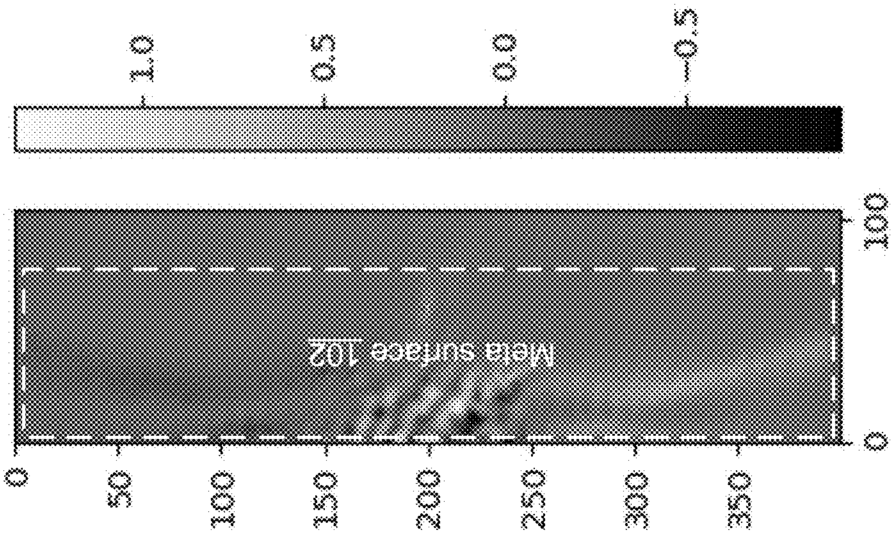

FIGS. 11E-11F show diagrams of the average optical power produced when the metasurface is illuminated by the 600 nm distant and the 300 nm distant source, respectively.

Figure 12A:
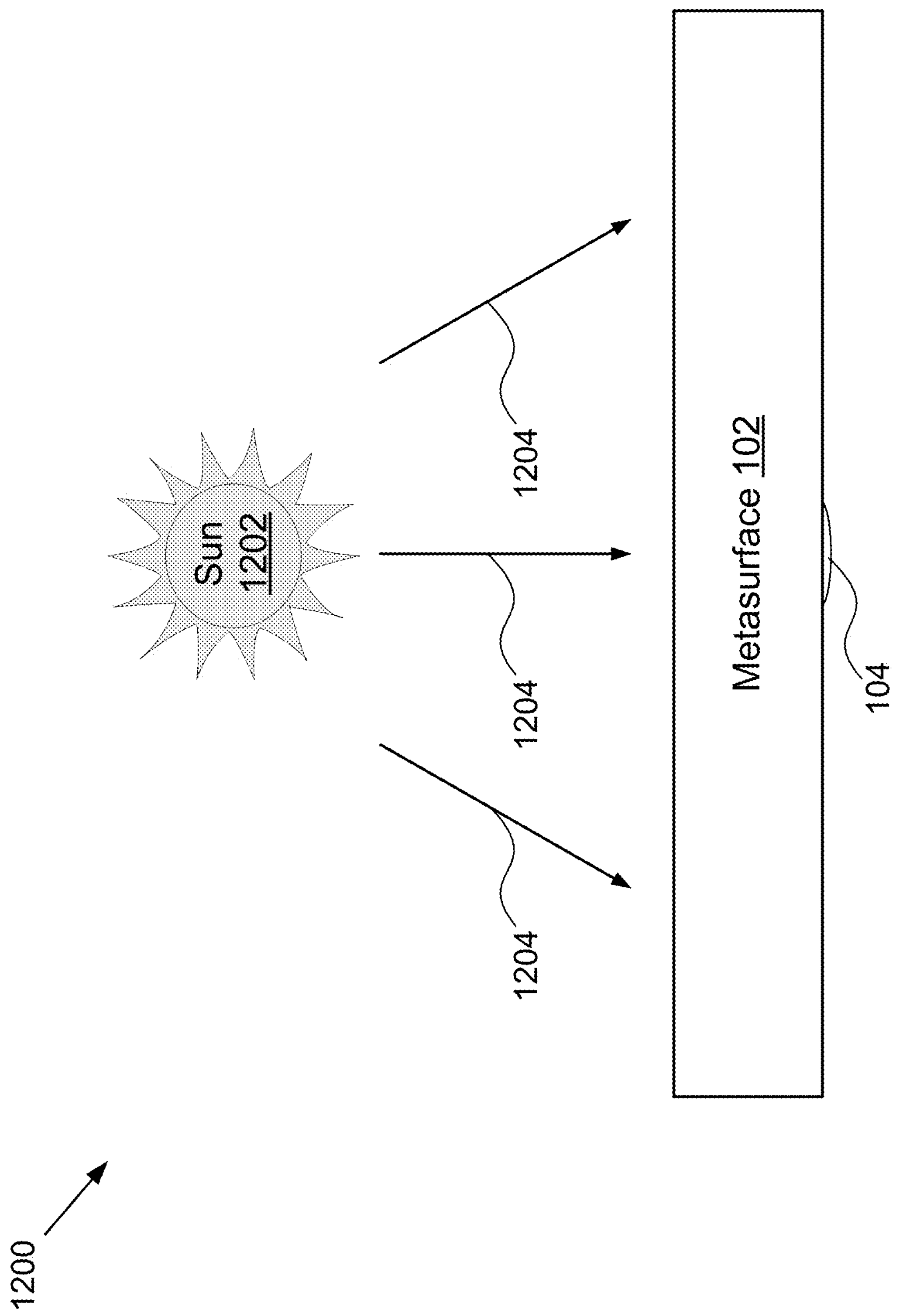
FIGS. 12A and 12B are block diagrams of the metasurface to concentrate multi-wavelength solar electromagnetic waves to a spot or multiple spots.
Figure 12B:
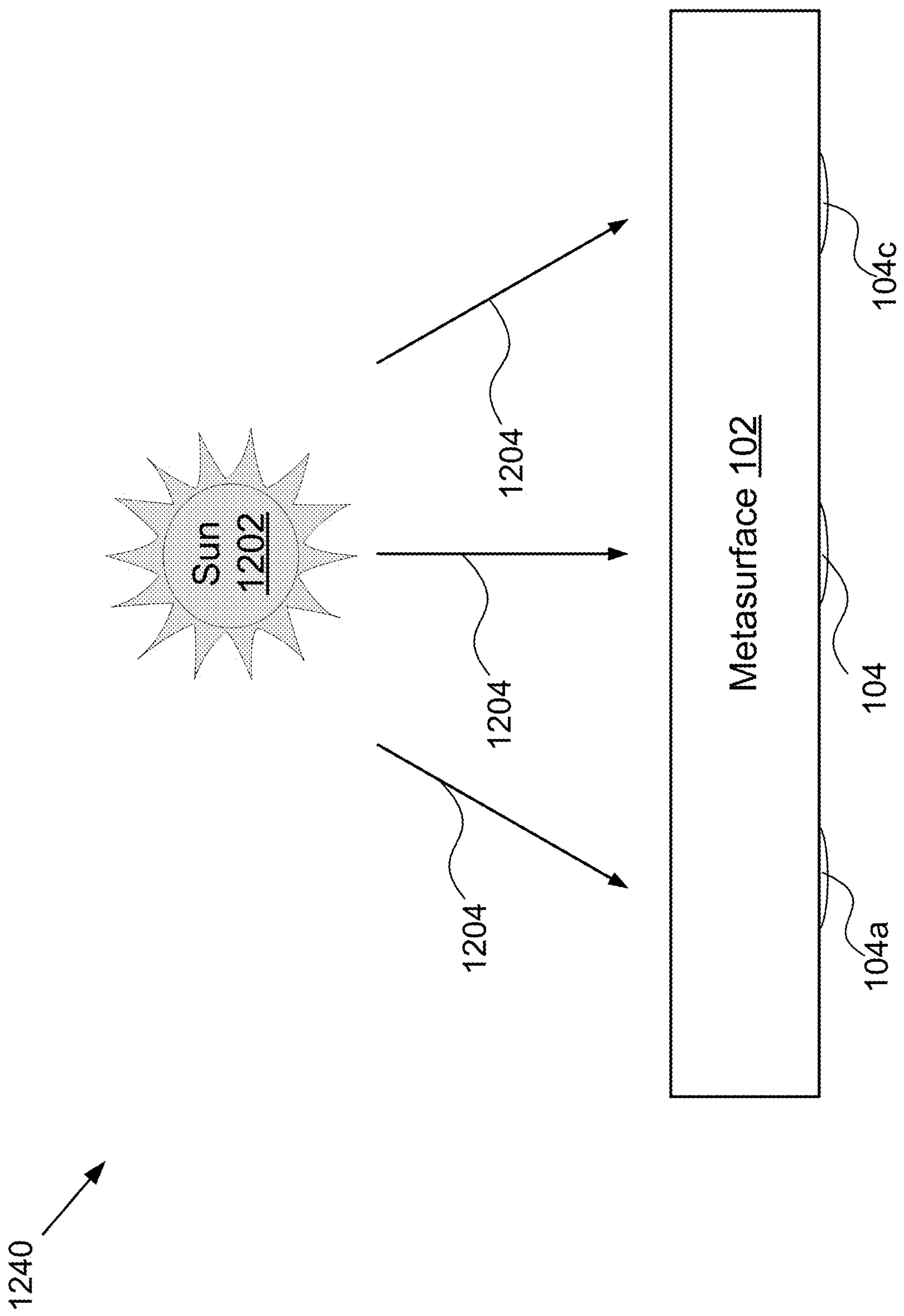

FIGS. 12A and 12B are block diagrams of devices 1200, 1240 using the metasurface 102 to concentrate multi-wavelength solar electromagnetic waves 1204 to a spot 104 or multiple spots 104*a*, 104*b*, 104*c*.

Figure 12C:
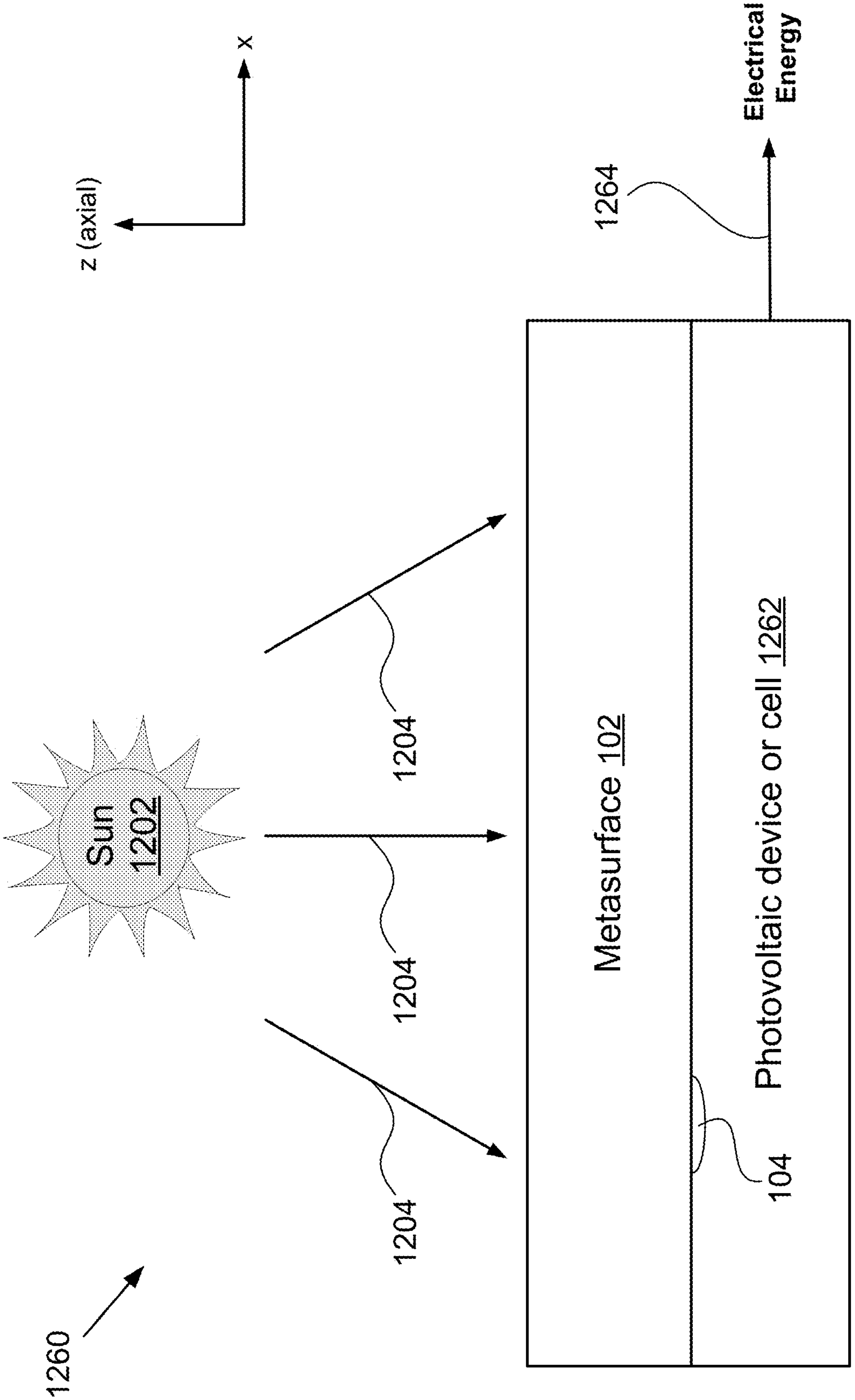
FIG. 12C is a block diagrams of an example electrical energy generation device including a metasurface and a photovoltaic cell according to some implementations.

FIG. 12A shows a device 1200 that uses nonlocal, volumetric metasurface 102 to concentrate multi-wavelength solar electromagnetic waves 1204 to a spot 104. In some implementations, the metasurface 102 is used to form several types of solar concentrators. For one type, shown in FIG. 12A, the metasurface's complex (or complexes) are designed such that, when placed under the sun 1202 or direct sunlight and/or when placed under diffuse sunlight as might be created by clouds, some or all of the wavelengths constituting the solar radiation are directed to a single spot 104. At this spot 104, a photovoltaic device such as a silicon solar panel may be placed, from which electricity can be derived. Alternatively, a waveguide, such as an optical fiber, may be placed at the spot, such that the electromagnetic waves are coupled into the waveguide. As shown in FIG. 12C, the metasurface 102 may be fabricated directly on a photovoltaic device 1262 from which electricity can be derived or connected to a waveguide, fabricated on a surface covering a photovoltaic device 1262 or waveguide, or can be a separate element.

FIG. 12B shows a device 1240 that uses a nonlocal, volumetric metasurface 102 to split multi-wavelength solar electromagnetic waves 1204 to different spots 104*a*, 104*b*, and 104*c* depending on wavelength. The device 1240 of FIG. 12B has a plurality of metasurface layers with nanopillars having a different refractive index. For a different type of solar concentrator 1240, as shown in FIG. 12B, the metasurface 102's complex (or complexes) is designed such that, when placed under direct sunlight 1202 and/or when placed under diffuse sunlight as might be created by clouds, certain sets or bands of wavelengths are directed to different spots 104*a*, 104*b*, and 104*c*. For instance, wavelengths within 50 nm of blue might be directed to one spot 104, whereas wavelengths within 50 nm of red might be directed to another spot 104. At some or all of these spots 104*a*, 104*b*, and 104*c*, photovoltaic devices 1262 may be placed beneath the spots 104*a*, 104*b*, and 104*c*, from which electricity can be derived, as shown in FIG. 12C. The photovoltaic devices 1262 at each of these spots 104*a*, 104*b*, and 104*c*, may be of the same material, such as silicon, or they may be of different materials. For instance, a spot 104*a* with predominantly blue electromagnetic waves might be directed to fall on a germanium photovoltaic cell, whereas a spot 104*b* with predominantly red electromagnetic waves might be directed to fall on a silicon photovoltaic cell 1262. Alternatively, waveguides, such as an optical fiber, may be placed at each of the spots 104*a*, 104*b*, and 104*c*, such that the electromagnetic waves at each spot 104*a*, 104*b*, and 104*c*, are coupled into separate waveguides. The metasurface 102 may be fabricated directly on the photovoltaic device(s) 1262 or waveguide(s), fabricated on a surface covering a photovoltaic device(s) 1262 or waveguide(s), or can be a separate element. While FIG. 12B shows the metasurface 102 as having three spots 104*a*, 104*b*, and 104*c*, it should be understood that the metasurface 102 may have any number of spots greater than two.

FIG. 12C shows an electrical energy generation device 1260 comprising a nonlocal, volumetric metasurface 102 used in conjunction with a photovoltaic device or cell 1262. When illuminated by direct or indirect sunlight, the device 1260 produces electrical power on output signal line 1264.

Figure 13:
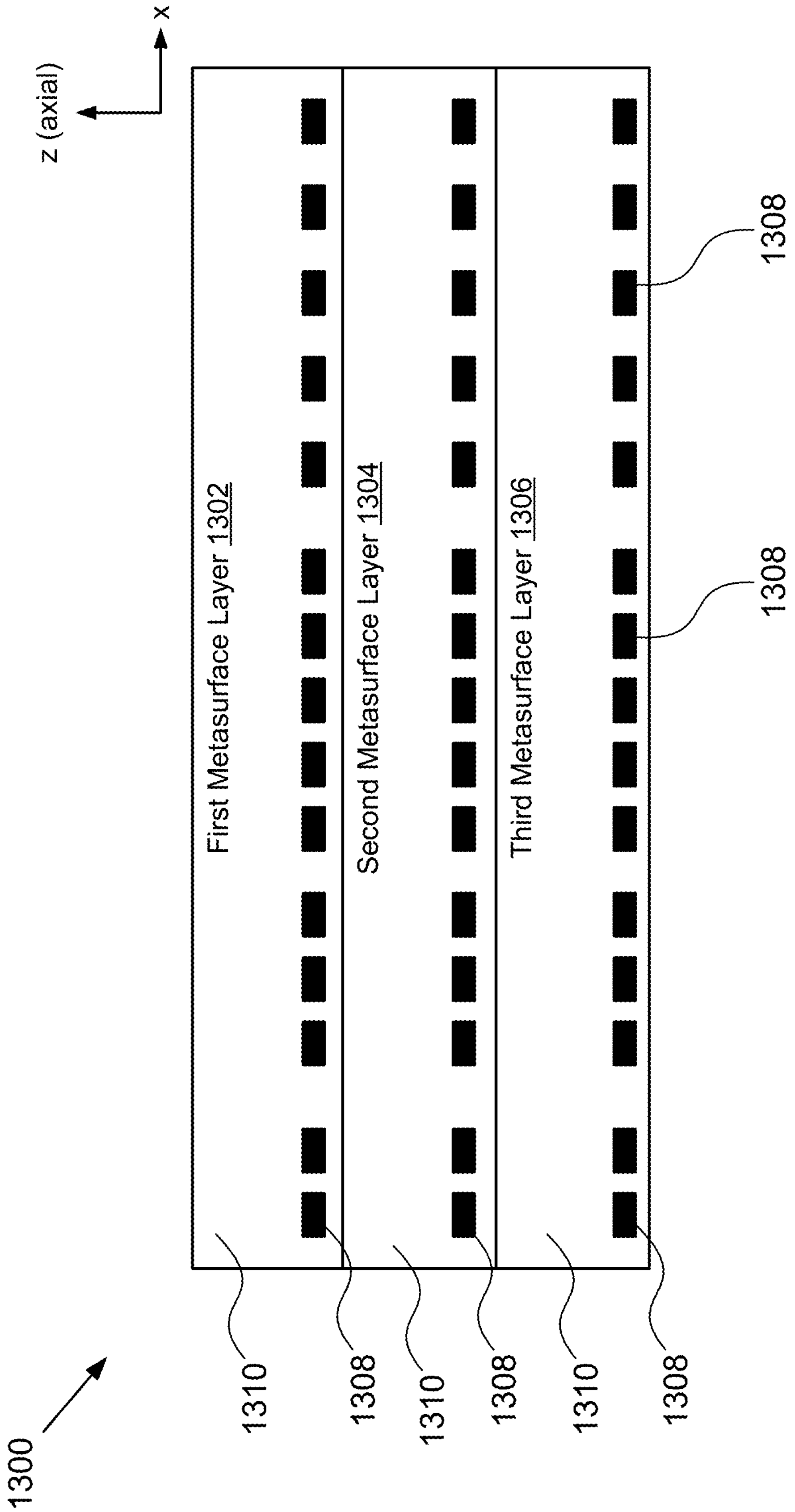
FIG. 13 is a block diagram of a device having a plurality of metasurface layers with nanopillars having a different refractive index.

In some implementations, the metasurface 1300 could be a multi-layer structure as shown in FIG. 13. This is similar to the multilayer metasurfaces 102*d* and 102*e* described above with reference to FIGS. 1F and 1G, respectively. The multi-layered metasurface 1300 comprises a first metasurface layer 1302, a second metasurface layer 1304 and a third metasurface layer 1306. The three discrete layers 1302, 1304 and 1306 are configured such that when the layers 1302, 1304 and 1306 are stacked on top of each other in a given order, a desired mapping of waves to spots 104 is achieved. Each of the metasurface layers 1302, 1304 and 1306 are stacked on top of each other with the first metasurface layer 1302 positioned on the top, the third metasurface layer 1306 positioned on the bottom, and the second metasurface layer 1304 positioned between the first metasurface layer 1302 and the third metasurface layer 1306. In the example shown in FIG. 13, each of the layers 1302, 1304, and 1306 has two materials, material one 1308 with the first refractive index and material two 1310 with the second different refractive index. For example, the material one 1308 may be cylinders with a nanopillar refractive index. In some implementations, each layer 1302, 1304 and 3006 is created using a process such as electron beam lithography. An example process for creating the multi-layer metasurface 1300 of FIG. 13 includes: 1) applying a photoresist to a set of discrete substrates in a pre-defined pattern, each of which has a coating which might be 1-100 micrometers thick of a material such as silicon oxide ($SiO_2$); 2) curing the photoresist using a corresponding photomask exposed by ultraviolet light for each discrete surface; 3) using electron beam lithography to etch each discrete surface to produce a pre-defined pattern; 4) removing the remaining photoresist; and 5) stacking each of the layers 1302, 1304 and 1306 on top of each other in the predefined order. Each of the etched surfaces forms a layer 1302, 1304 and 1306 of the multilayered metasurface 102. It should be understood that while only three metasurface layers 1302, 1304 and 1306 are depicted in FIG. 13, other implementations may include any number of metasurface layers greater than two. Furthermore, each of the layers 1302, 1304, 1306 are described as being of the same two materials, however, in other implementations each layer may have different materials with different refractive index.

Figure 14A:
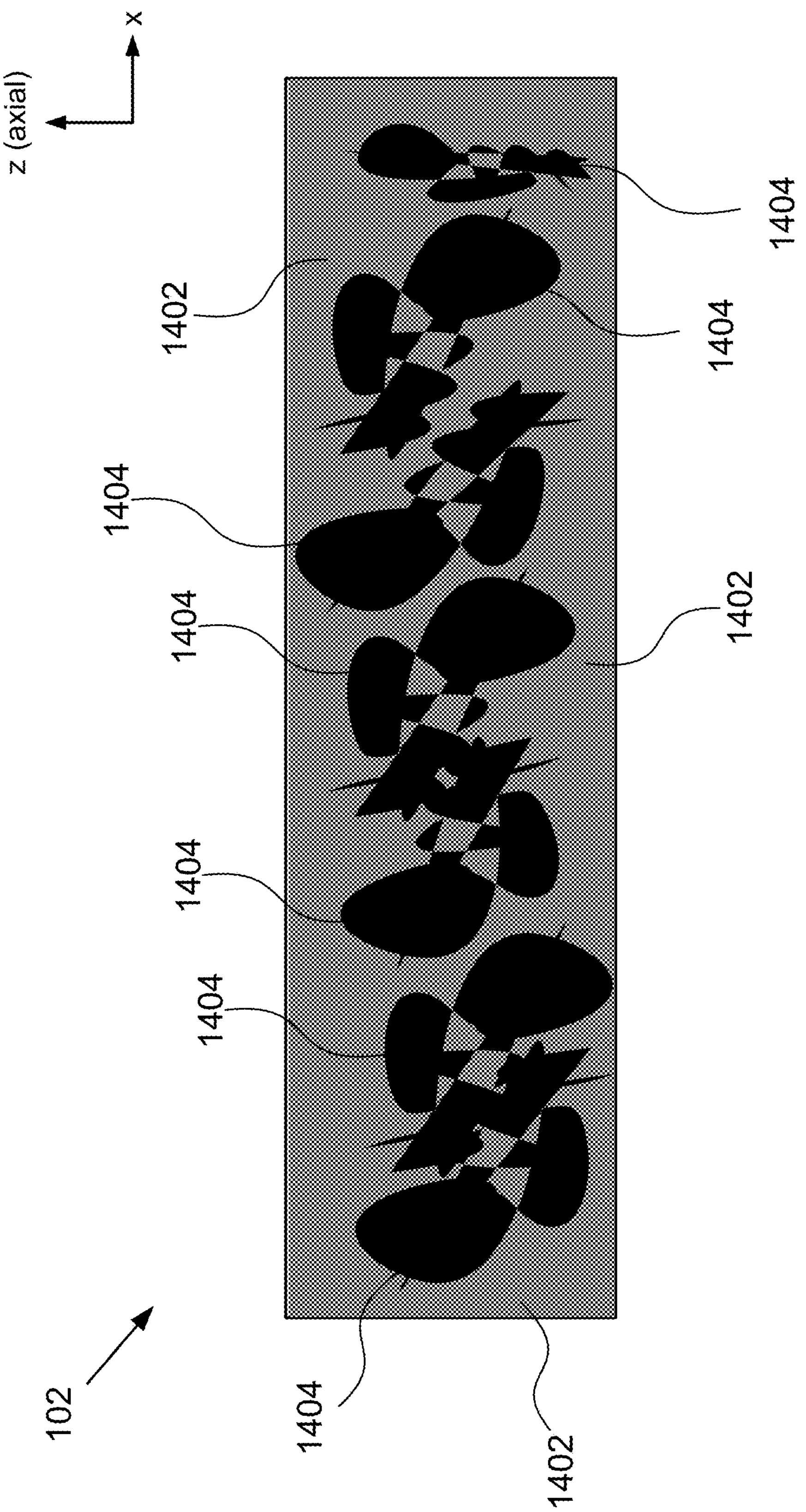
FIGS. 14A and 14B are block diagrams of metasurfaces 102 of continuous constituent materials with distinct refractive indices.

In some implementations, the metasurface 102 may be continuous structure not formed into discrete layers as shown in FIG. 14A. The metasurface 102 of FIG. 14A may be formed by a technique such as 1) implosion fabrication, 2) directly written into a surface using lasers or electron beams, or 3) may be formed with another process. The metasurface 102 of FIG. 14A shows an example metasurface 102 with two materials 1402, 1404 with different refractive indices. For example, the metasurface 102 might be made up of two materials, such as Si and $SiO_2$, and might discretely switch between them in its domain. Most of the continuous volumetric metasurface 102 is formed with a base material 1402 layer intermixed with the second material 1404 with a different refractive index than the base material. An example process for creating the metasurface 102 of FIG. 14A includes: 1) defining a volumetric metasurface 102 with a desired mapping of waves to spots, 2) preparing a surface of moistened polyacrylate hydrogel which might be 1-100 micrometers thick on a substrate; 3) introducing fluorescein into the hydrogel, 4) patterning the hydrogel in three dimensions (3D) using an optical beam, for example, using a two-photon process which causes the fluorescein to bond with the hydrogel, to create the features are in the same pattern as the desired final volumetric metasurface 102, but they are larger by a multiple, such as 10×, depending on the specific hydrogel used, 5) introducing a material, such as gold nanoparticles, to the hydrogel that bonds with the fluorescein molecules, 6) desiccating the hydrogel and shrinking it and the inscribed features by a multiple, such as 10×, depending on the specific hydrogel used. This forms the final metasurface 102.

Figure 14B:
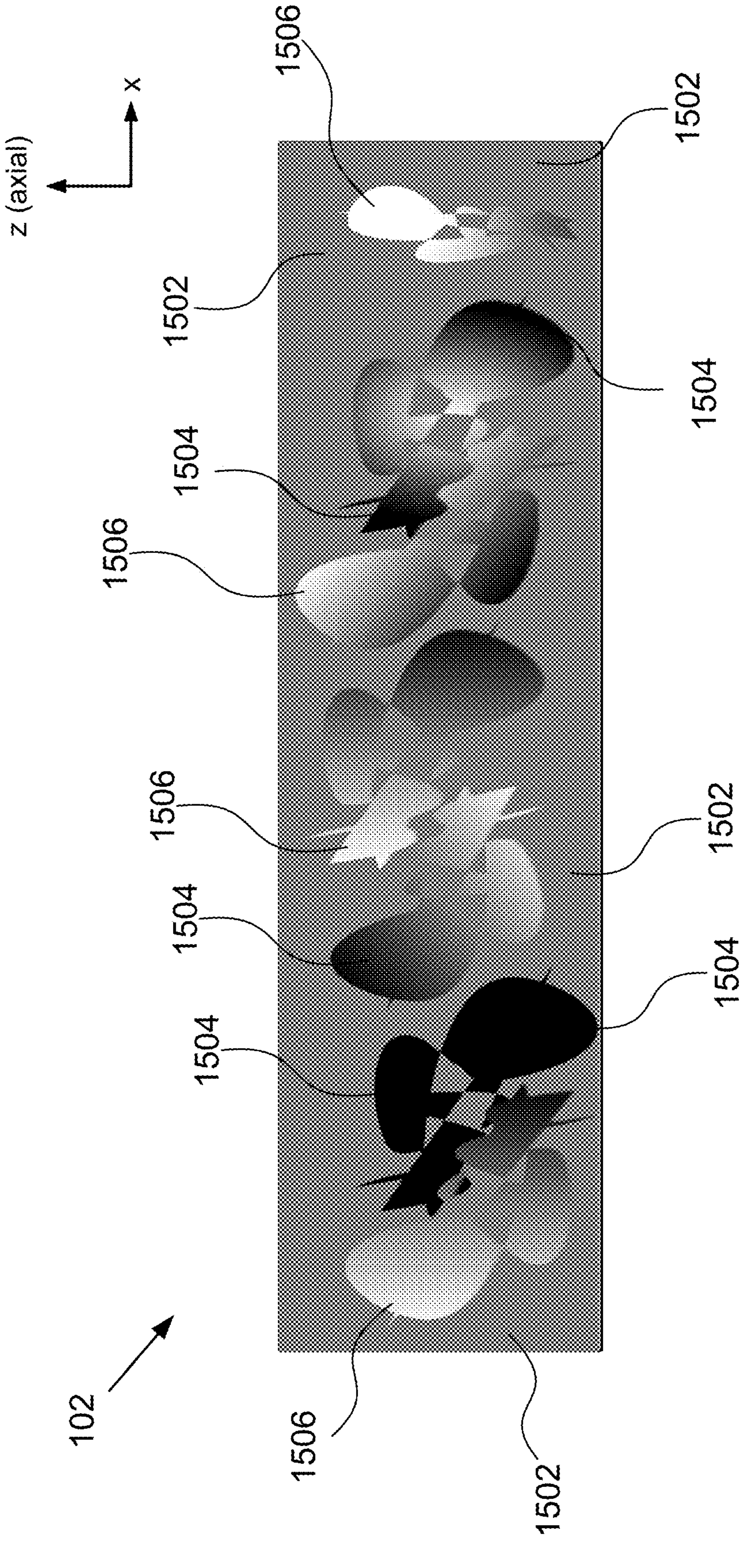

Referring now to FIG. 14B, another example of a metasurface 102 this has a continuous structure is shown. This example illustrates how the number and identity of the materials making up the metasurface 102 can vary. In the example metasurface 102 of FIG. 14B, the metasurface 102 is made up of three materials 1502, 1504 and 1506 with different refractive indices. It should be understood that the metasurface 102 might also be made up of more or fewer materials, and it might continuously mix these materials in its domain. FIG. 14B also illustrates an example of a metasurface 102 where there is a mixing between constituent materials (three materials 1502, 1504 and 1506), and thus gradients exist in the refractive indices or other optical properties. Other properties of the materials 1502, 1504 and 1506 might be varied to produce the required variation in optical properties for a given metasurface 102, such as density, orientation, or material phase. For instance, a metasurface 102 might include aluminum oxide of varying densities, suspended in a hydrogel or other material.

Figure 15:
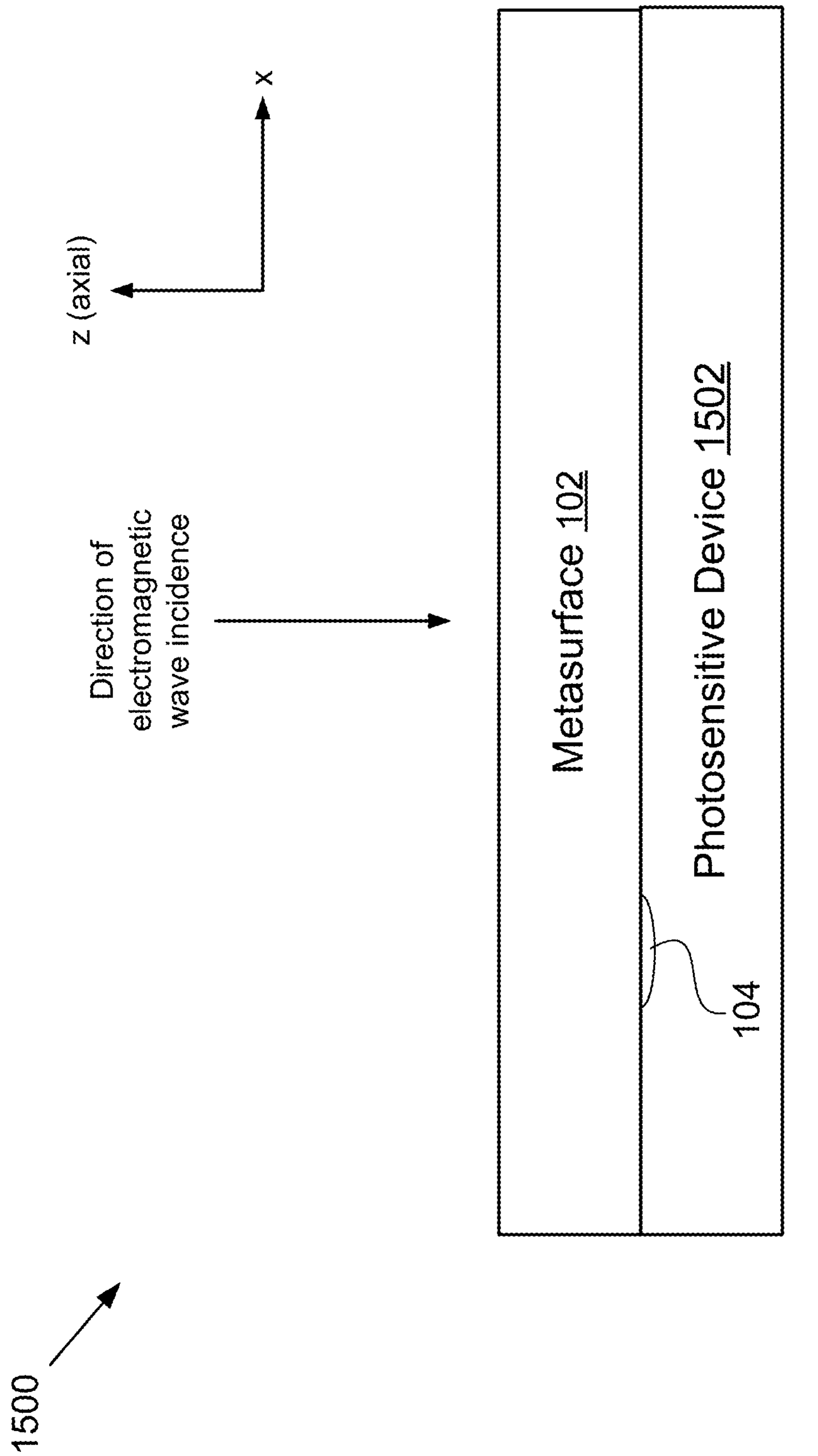
FIG. 15 is a block diagram of an example device including metasurface and photosensitive device according to some implementations.

Referring now to FIG. 15, a device 1500 including a metasurface 102 and a photosensitive device 1502 is shown. The device 1500 includes a nonlocal, volumetric metasurface 102 used in conjunction with a photosensitive device 1502. The metasurface 102 generates a spot 104 on the photosensitive device 1502 when illuminated with certain electromagnetic waves. Due to optical linearity, a natural property of many optical systems, it is generally true that, for this metasurface 102 designed such that it maps each of a set of incident waves on one of its surfaces to a respective spot 104 on a surface, the superposition of two or more of these input waves will produce a corresponding superposition of the output spots. This superposition of input waves can lead to a corresponding superposition of output spots 104 which together form some form of image. As such, one use of the metasurface 102 described herein is in conjunction with a photosensitive device 1500.

Another application of the metasurface 102 of the present disclosure is in combination with an image capture device 1606 as shown and described below with reference to FIGS. 16A-16F.

Figure 16A:
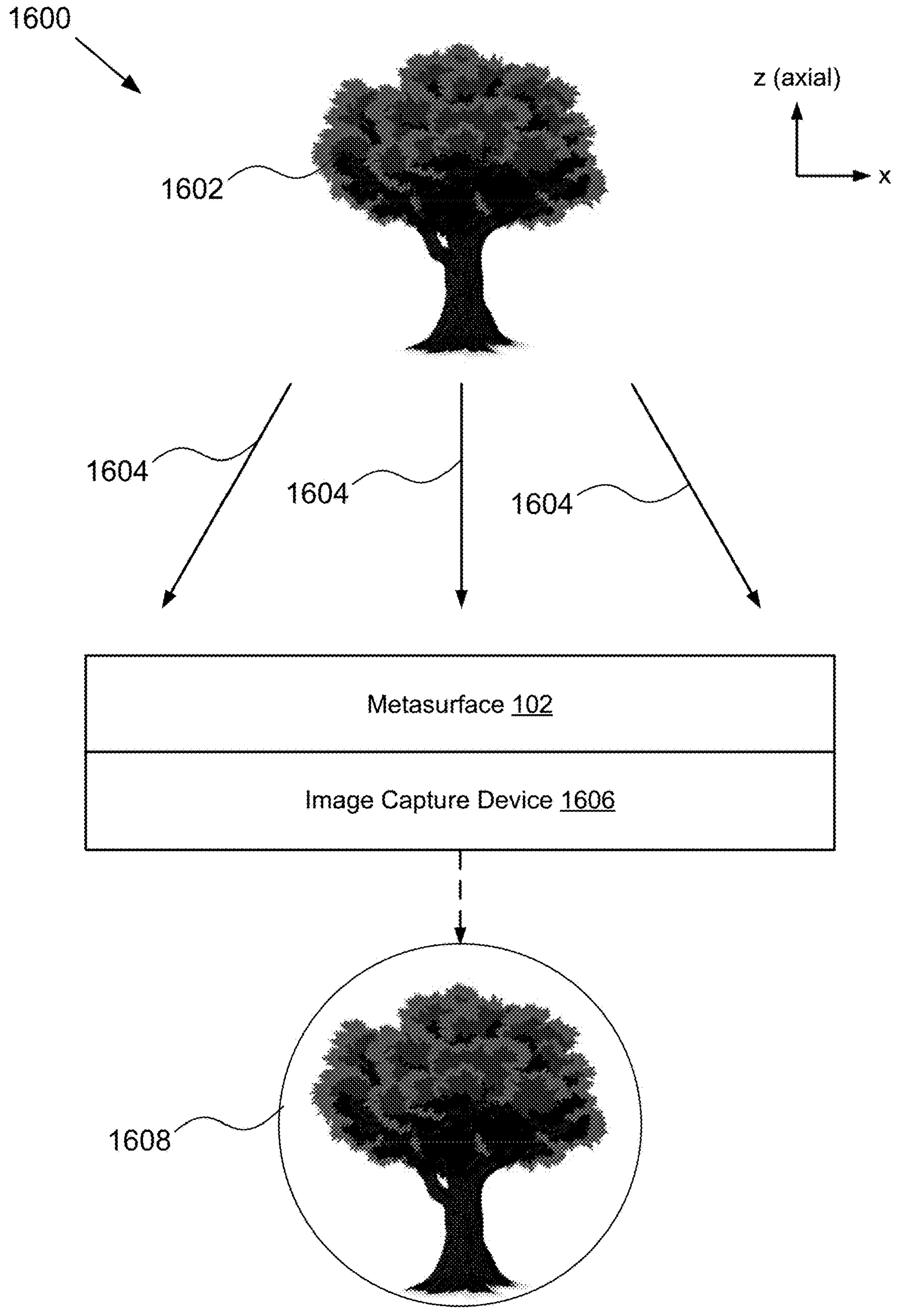
FIGS. 16A-16F are a block diagrams of an example devices including a metasurface and an image capture device according to some implementations.

FIG. 16A shows one implementation of the device 1600 having the metasurface 102 and an image capture device 1606. The device 1600 is positioned to capture electromagnetic waves 1604 representing an object 1602 in a scene. For example, the device 1600 may be a camera. More specifically, the device 1600 positions the metasurface to capture the electromagnetic wave 1604 reflected by the object 1602. FIG. 16A also illustrates the image 1608 captured an output by the image capture device 1606. In this implementation, the metasurface 102 is used as an imager where the metasurface 102 forms an image on its output plane. The image can then be captured by the image capture device 1606. For example, the image capture device 1606 may be any one of a Complementary Metal-Oxide Semiconductor (CMOS) imaging sensor, Charge Coupled Device (CCD) image sensor, or other photosensitive image capture device. The image capture device 1606 is placed directly at the output plane, or which can be separated from the output plane by a region of empty space or transparent material, fluid, or gas. In some implementations, the metasurface 102 can be fabricated directly on the image capture device 1606, fabricated on the cover glass of an imaging sensor, or can be a separate element. The device 1600 so created has the benefit of being highly compact compared with previous systems, such as imaging systems using standard lenses or local metasurfaces 102. A notable feature of the metasurface 102 is that, due to its novel configuration of nonlocal complexes, it can be formed in a way that it does not flip images, as standard lensing optics and local metasurfaces 102 generally do. Alternatively, it can also instead be formed in a way such that it does indeed flip images. Similarly, it can be formed such that it distorts, dilates, magnifies, and compresses images in arbitrary, designer-defined ways.

Figure 16B:
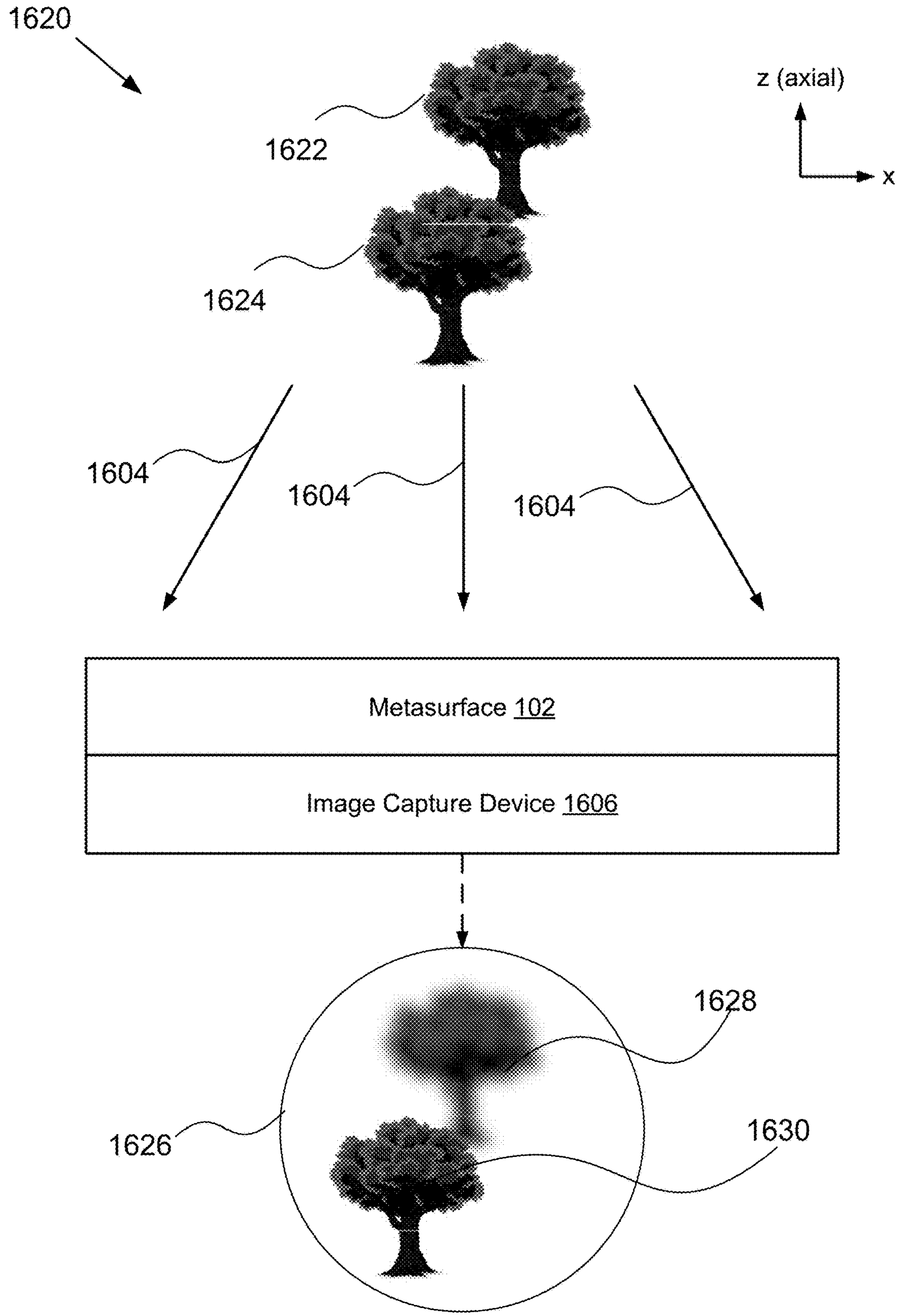
Figure 16C:
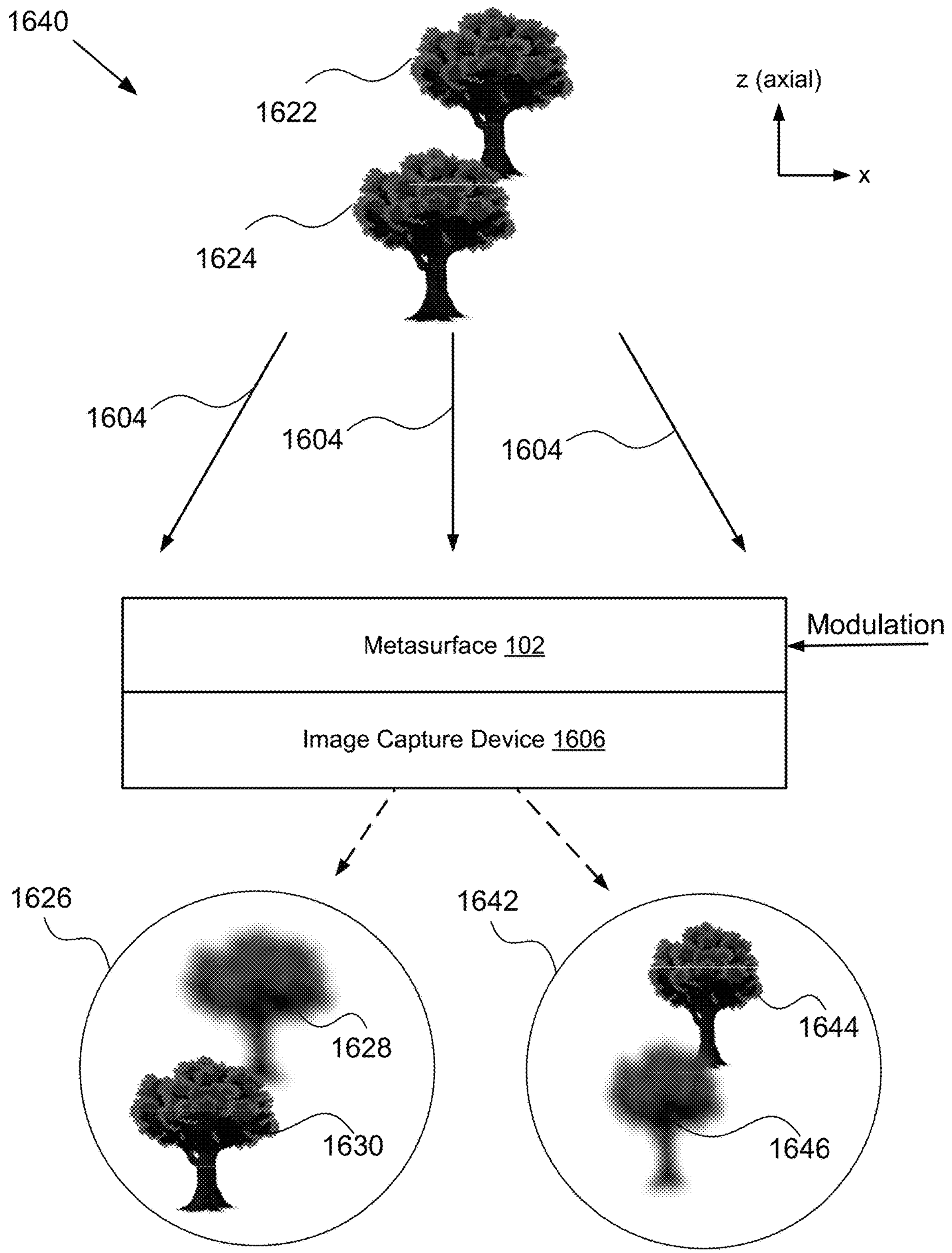

FIGS. 16B and 16C show another implementation of the device 1620 having the metasurface 102 and an image capture device 1606. In FIG. 16B, the device 1620 is a camera using a nonlocal, volumetric metasurface 102 in conjunction with the image capture device 1606. In this implementation, the metasurface 102 emulates depth of field. In FIG. 16C, the device 1640 is a camera using a nonlocal, volumetric metasurface 102 in conjunction with an image capture device, wherein the metasurface 102 emulates depth of field and is actively modulated such that it emulates refocus. The device 1620 is positioned to capture electromagnetic waves 1604 representing a first object 1622 and a second object 1624 in a scene where the first object 1622 and the second object 1624 have a different depth of field. The image 1626 captured by the image capture device 1606 shows the image 1628 of the first object 1622 blurred while the image 1630 of the second object 1624 is in focus. The device 1620 is advantageously able to emulate the phenomenon of depth of field by mapping point sources at a chosen axial (z) distance to a small spot, while mapping point sources at closer and more distant axial (z) locations to larger spots. By further integrating active modulation, in the device 1640 of FIG. 16C, the metasurface 102 when modulated, it emulates refocus and can generate image 1642 in which the image 1644 of the first object 1622 in focus while the image 1646 of the second object 1624 is blurred, opposite to the result in an image 1626. The images 1626, 1642 collected in this way do not necessarily need to be a picture, as a standard digital camera with a standard lens might produce. Instead, the image 1626, 1642 may indirectly encode information about the electromagnetic waves 1604 incident on the metasurface 102, such as their wavelengths, the shape of their wavefronts, their angles of incidence with respect to the metasurface 102, their polarization, their coherence, whether they are propagating or evanescent waves, and other electromagnetic wave properties. Additionally, the image 1626, 1642 may encode information about the scene or object it is imaging; for instance, objects may be processed by the metasurface's complex (or complexes) based on their colors, sizes, shapes, identities, or other properties. In both of these cases, digital processing may be used after image capture in order to extract desired information from captured images or otherwise post-process them. They may also be used as input to computer programs, such as machine learning models. In some examples, the machine learning model and metamaterial may be designed together, such that they are together well suited for some particular task. For instance, the design process for the metasurface here described could be followed, but with the loss function being the efficacy of a machine learning model on some task involving the scene being imaged by the metasurface, where the machine learning model is provided the sensed image produced by the metasurface. In this way, both the metasurface and machine learning model are updated to optimize the entire system's efficacy on the chosen task. In addition to macroscopic imaging, microscopic and nanoscopic imaging are also possible.

Figure 16D:
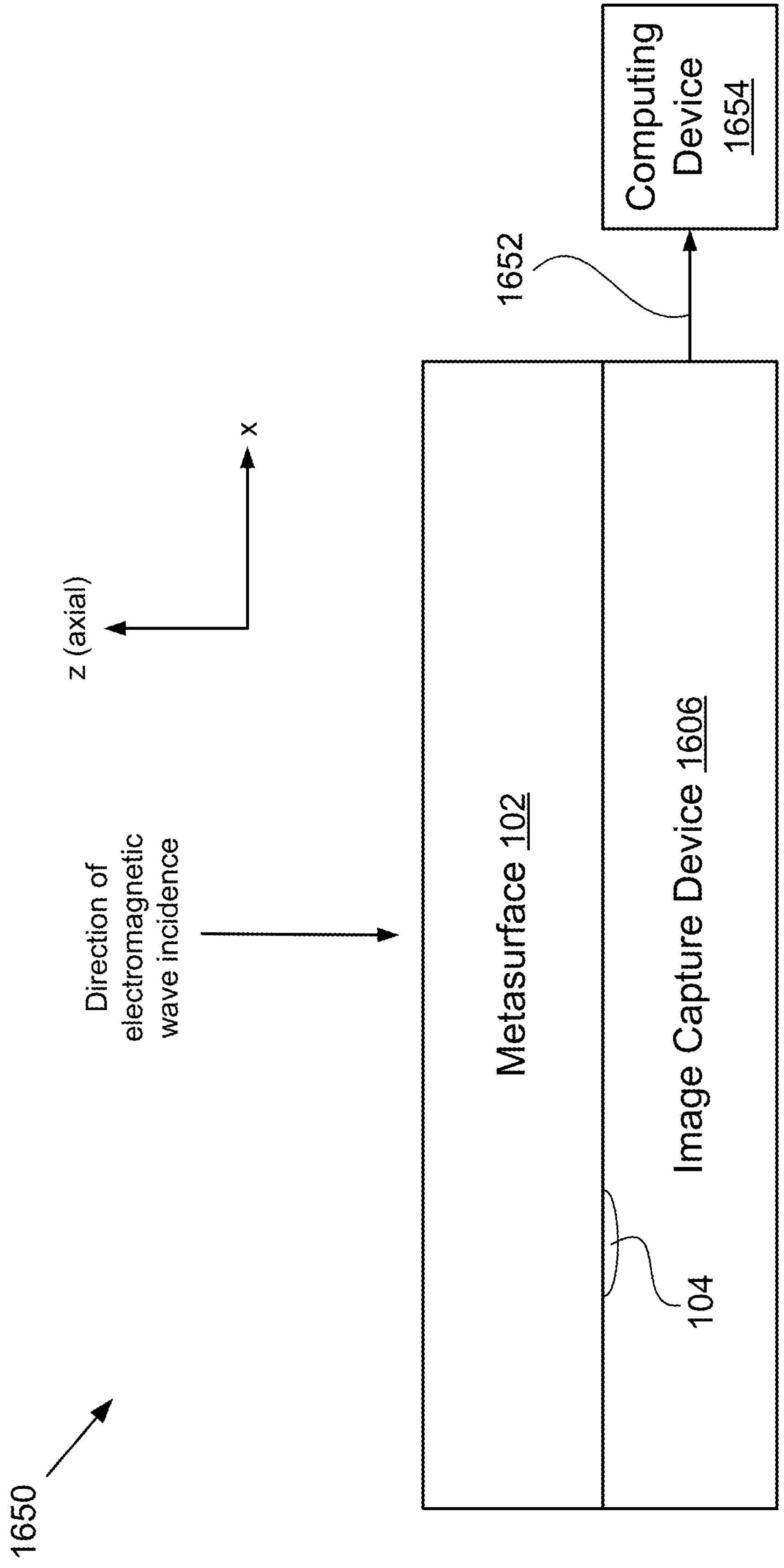

Referring now to FIG. 16D, yet another implementation of the device 1650 is shown. The device 1650 comprises a metasurface 102 having a spot 104 mounted above an image capture device 1606. As shown in FIG. 16D, the image capture device 1606 may be coupled by signal line 1652 to a computing device 1654. The computing device 1654 may be a computer, mobile phone, or other digital or analog device. The image capture device 1606 transmits the sensed image to the computing device 1654 where it can be further processed or stored. The computing device 1654 may be any device that is used to take pictures, similar in function to a standard digital camera. The metasurface 102 can be designed such that a set of input waves produced by point sources at different locations in a scene map to corresponding point-like spots on the image capture device 1606, a behavior similar to the behavior of a lens in an imaging system, though produced by the complex (or complexes) of structural optical properties instead of by local shaping of the wavefront followed by propagation through space. Point sources at the same transverse (x-y) location but at different axial (z) distances from the metasurface 102 can either be mapped to the same spots 104 or to spots 104 with distinct locations and/or other properties such as size.

Figure 16E:
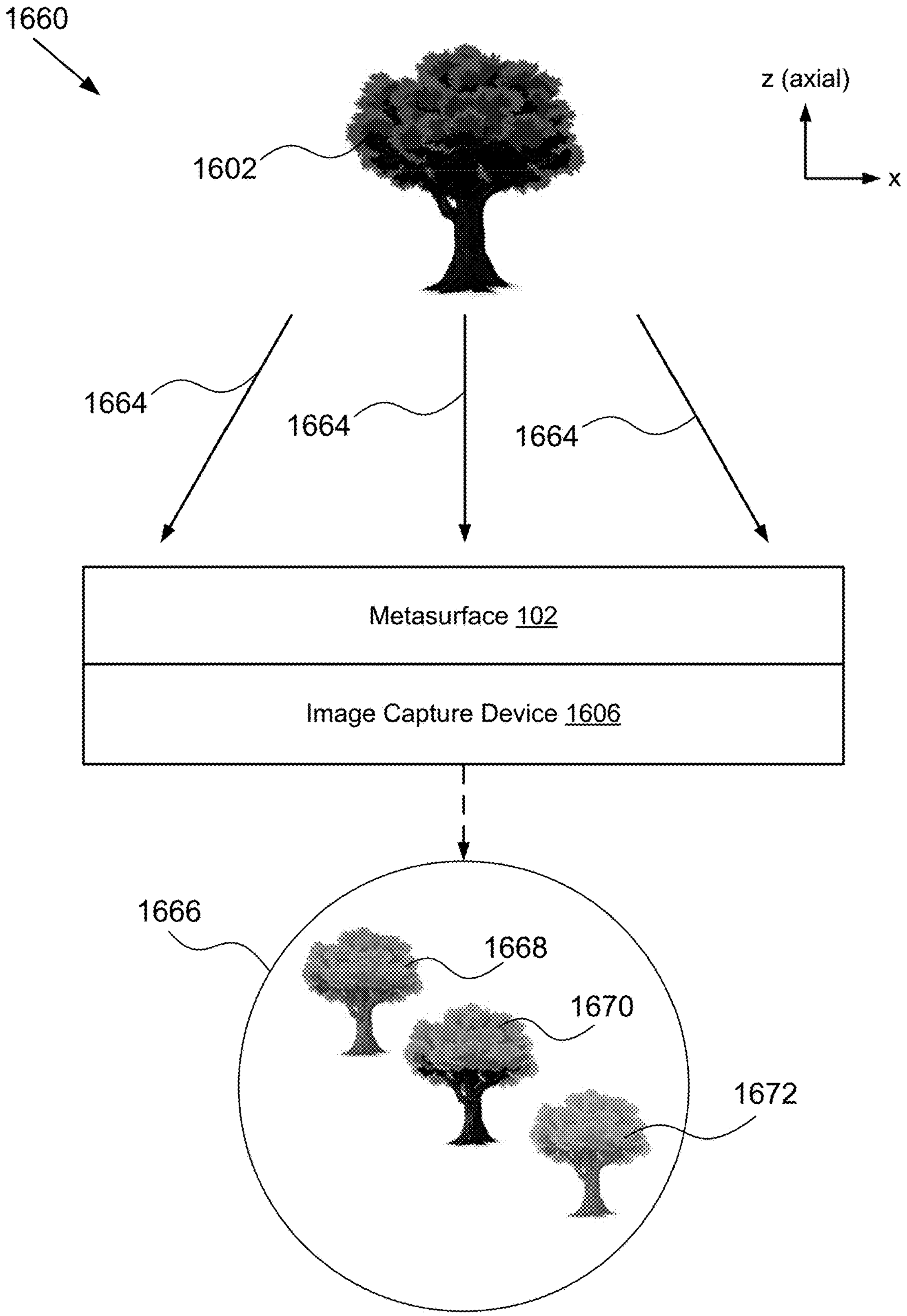

Referring now to FIG. 16E, another implementation of the device 1660 as a spectrometer is shown. The device 1660 comprises a metasurface 102 and an image capture device 1606. The metasurface 102 is used to form a spectrometer, and the image capture device 1606 is a 1-dimensional or 2-dimensional sensor array. In this context, the metasurface 102 and the image capture device 1606 are configured similar to the imaging example described above. The metasurface 102 detects light 1664 coming from a point source or scene 1602, and different wavelengths from the point source or scene 1602 are mapped to different spots 104 (not shown) by the metasurface 102, which the sensor array then senses. The intensity at each spot 104 is then interpreted as related to the intensity of the associated wavelength in the point source or scene 1602. For scenes consisting of more than a point source, separate spots 104 may be used for different locations of the same color, allowing spatial resolution along with spectral resolution. In the example shown in FIG. 16E, the metasurface 102 has three spots 104 (not shown), and each spot 104 generates a portion of the entire image 1666. For example, the entire image 1666 is comprised of a first image 1668 at a blue light wavelength, a second image 1670 at a red light wavelength, and a third image 1672 at a yellow light wavelength.

Figure 16F:
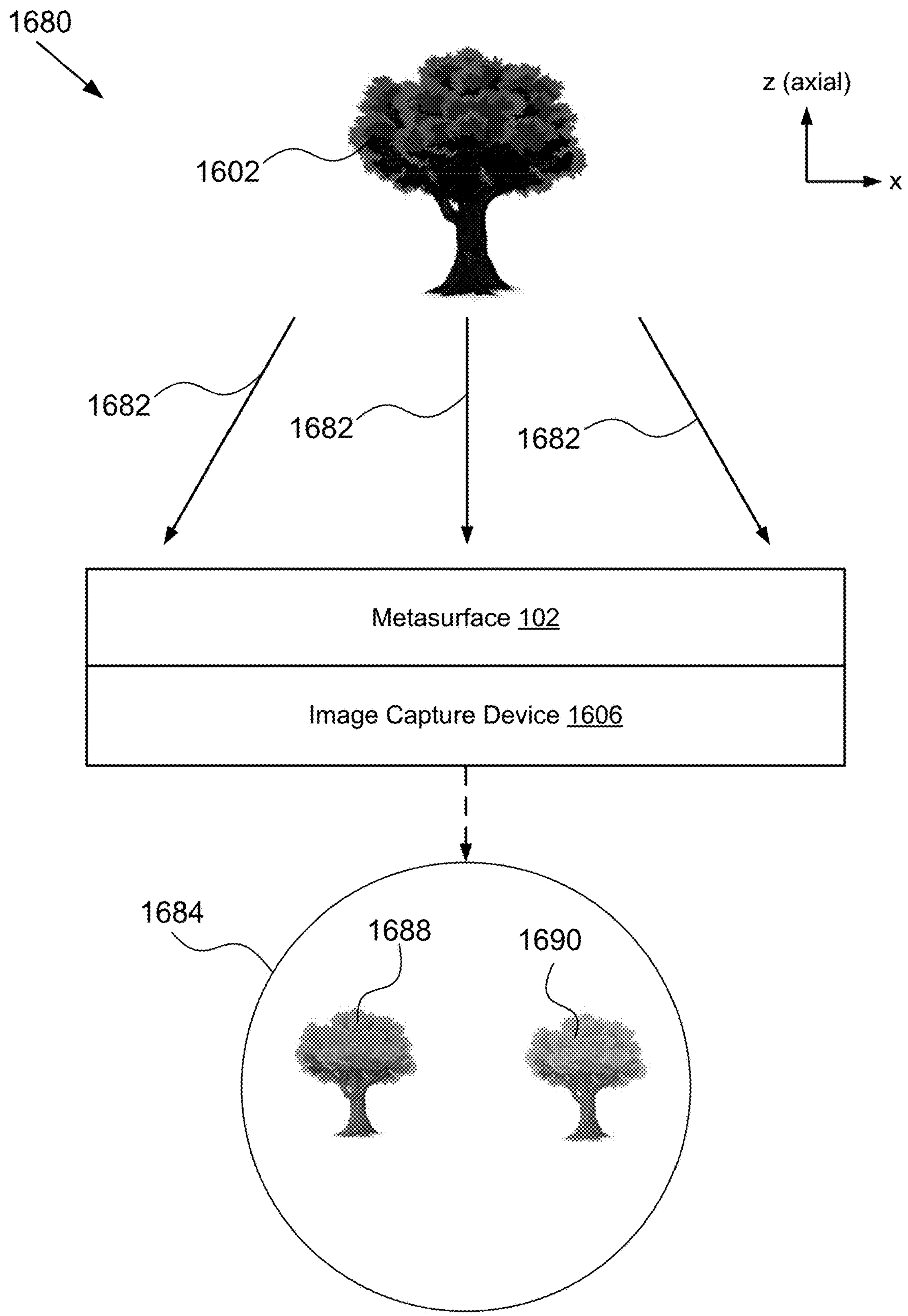

Referring now to FIG. 16F, yet another implementation of the device 1680 is shown. The device 1680 of FIG. 16F is a polarization sensor. The device 1680 comprises the metasurface 102 and an image capture device 1606. In this context, the metasurface 102 detects from light 1682 coming from a point source or scene 1602, different polarizations from the point source or scene 1602 that are mapped to different spots (not shown) by the metasurface 102. The image capture device 1606 is mounted adjacent to the metasurface 102 and is a 1-dimensional or 2-dimensional sensor array, configured similarly to the imaging example. The sensor array then senses the intensity at each spot 104 which can be interpreted as related to the intensity of the associated polarization in the point source or scene 1602. For scenes consisting of more than a point source, separate spots 104 may be used for different locations of the same polarization, allowing spatial resolution along with polarization resolution. The image capture device 1606 generates an image 1684 comprising a first portion 1688 with the point source or scene 1602 in a first polarization, and a second portion 1690 with the point source or scene 1602 in a second polarization.

Figure 17B:
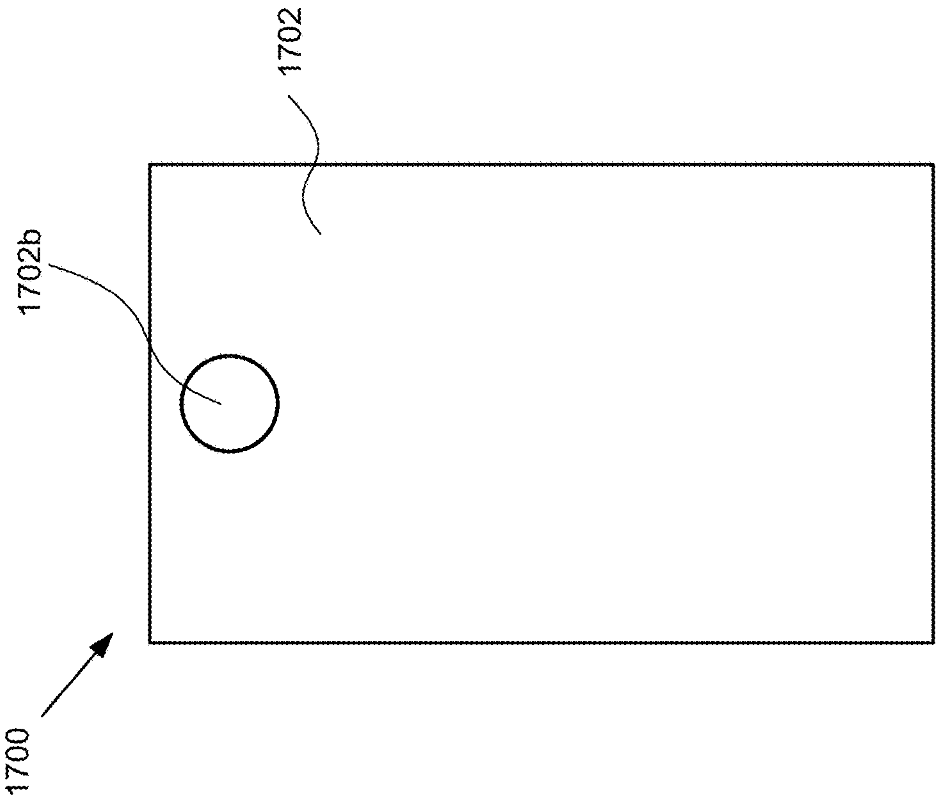
FIGS. 17A and 17B are a block diagrams of an example phone using a metasurface in conjunction with an image capture device.
Figure 17A:
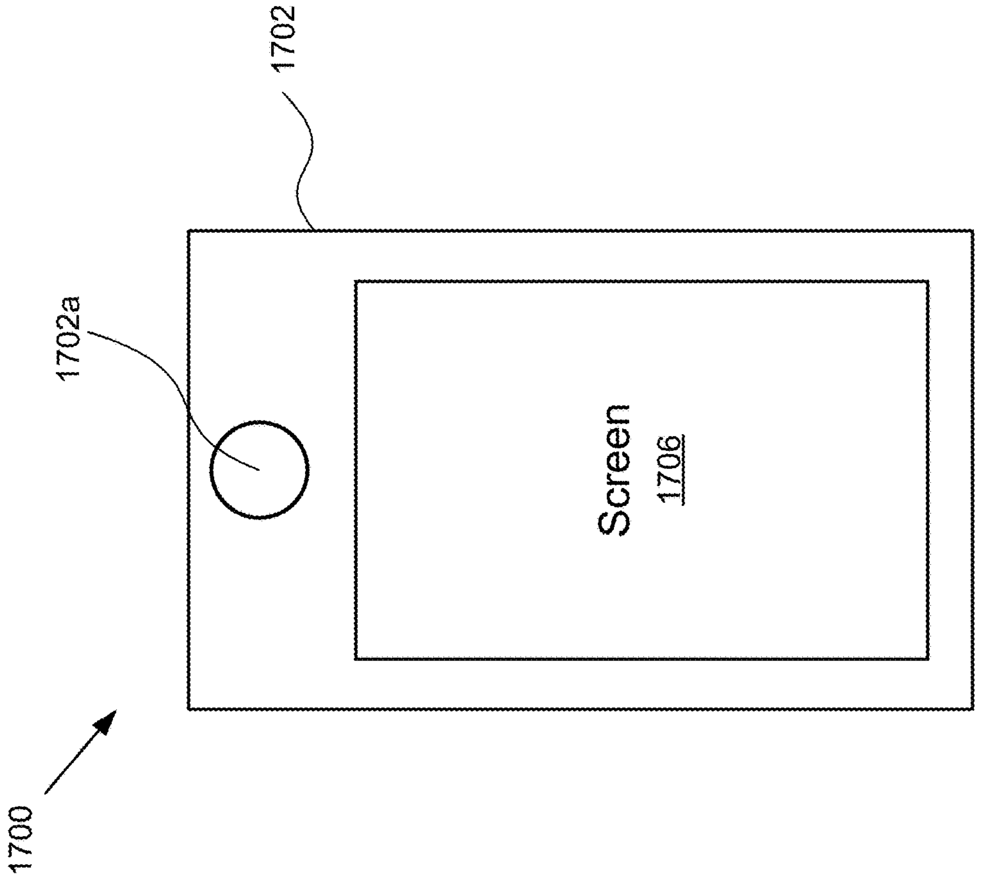

Referring now to FIGS. 17A and 17B, one or more image capture devices 1702*a*, 1702*b* which is/are integrated with and electrically connected to a mobile phone 1700 is shown. The nonlocal, volumetric metasurface 102 of the present disclosure can be used as the image capture device (camera) 1702*a* or the image capture device (camera) 1702*b* of the mobile phone 1700. FIG. 17A shows a front facing view of the phone 1700. FIG. 17B shows a back facing view of the phone 1700. The image capture device 1702*a*, 1702*b* here formed from the metasurface 102 is used in place of both the front and/or rear-facing cameras in a standard cell phone. The replacement of the standard camera by the metasurface 102 and an image capture device significantly reduces the axial thickness of these cameras. This also, in some implementations, allows wider-area, higher-resolution sensing to take place. Because the axial thickness of conventional optics and local metasurfaces generally scales with sensor area, making high-quality large-area imagers or sensors is often not possible in integrated applications, due to the required thickness. The nonlocal internal guidance properties of the metasurface 102, however, make it capable of scaling to larger sensor areas, and thus higher angular resolutions, which scales with aperture diameter, without requiring the same scaling of thickness of conventional approaches.

Figure 18:
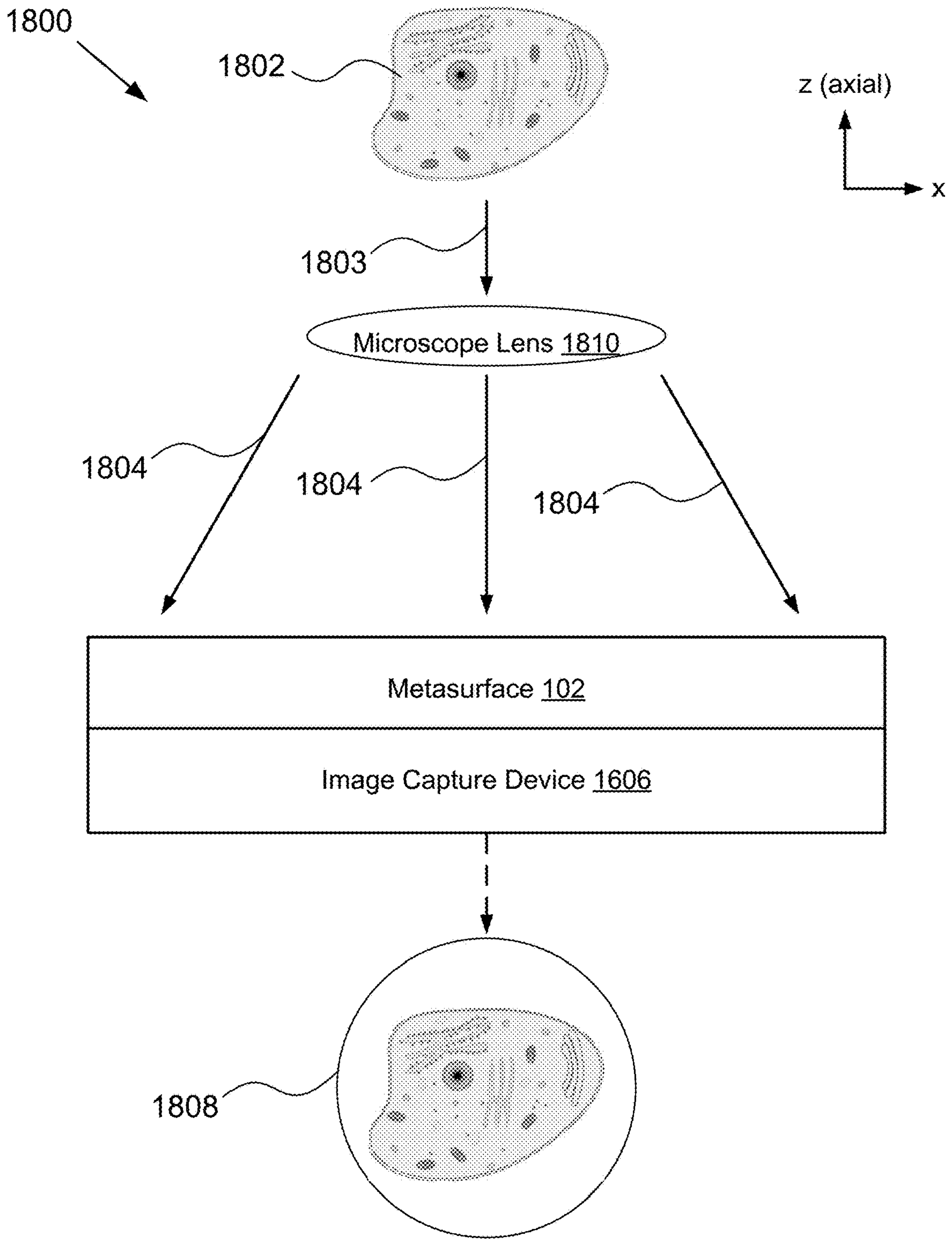
FIG. 18 is a block diagrams of an example device including a metasurface, an image capture device and a microscope lens according to some implementations.

FIG. 18 show one implementation of a device 1800 that uses the metasurface 102 as part of a microscope. The device 1800 comprises a microscope lens 1810, a metasurface 102, and an image capture device 1606. A microscopic scene 1802 generates light 1803 representing the scene that passes through the microscopic lens 1810 to generate modified light 1804 that is applied to the top of the metasurface 102. The metasurface 102 is positioned over the image capture device 1606. The image capture device 1606 generates an image 1808 of the original scene 1802. The device 1800 is merely one example where the metasurface 102 and image capture device 1606 may be combined with other optical elements. The other optical elements, such as lenses or other metasurfaces, may be placed between the microscopic scene 1802 and the image capture device 1606. The metasurface 102 can be used for imaging objects or samples which are especially close to the input plane of the metasurface 102; for instance, within 1 mm. In this context, in addition to the propagating waves which are considered in other imaging contexts, there may also be evanescent waves from the object or sample which reach the metasurface 102 as an input wave. The metasurface's complex (or complexes) can be designed while taking these evanescent waves into account, either by directing them to the desired spot or spots, or by coupling them into propagating modes, which are then directed to the desired spot or spots 104. As such, the metasurface 102 so designed, in conjunction with an image capture device 1606 in the form of a Complementary Metal-Oxide Semiconductor (CMOS) imaging sensor, Charge Coupled Device (CCD) image sensor, or other photosensitive image capture device configured as previously described for imaging, is capable of highly detailed imaging and microscopy, below the diffraction limit.

Figure 19:
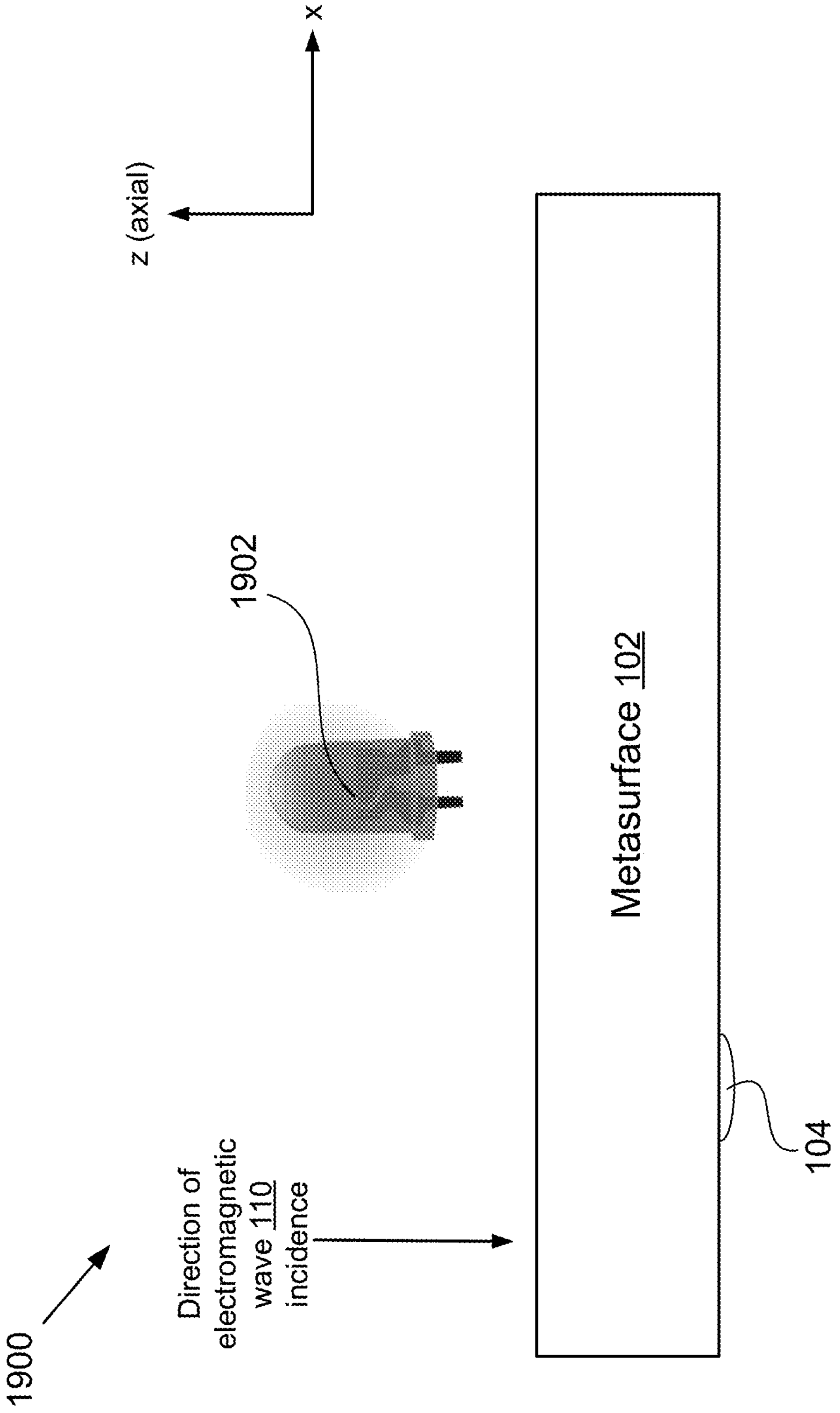
FIG. 19 is a block diagrams of the metasurface used in conjunction with a light emitting device.

FIG. 19 shows a device 1900 that uses the metasurface 102 in conjunction with a light source 1902. In particular, a nonlocal, volumetric metasurface 102 is used in conjunction with a light emitting device 2002. The metasurface 102 may be used in conjunction with at least one light source 1902 in which the at least one light source is positioned in proximity to the metasurface 102 and can be controllable. For example, a point source of light like an LED is placed near the metasurface 102, and the metasurface 102 projects that LED to a chosen output. The wavefront may be based on the LED location/color/polarization. Thus, with an array of LEDs with different positions, colors and polarizations, the device including the metasurface 102 has the ability to project a set of arbitrary wavefronts, with the ability to implement devices such as a projector. A number of further devices can be created from this configuration.

Figure 20:
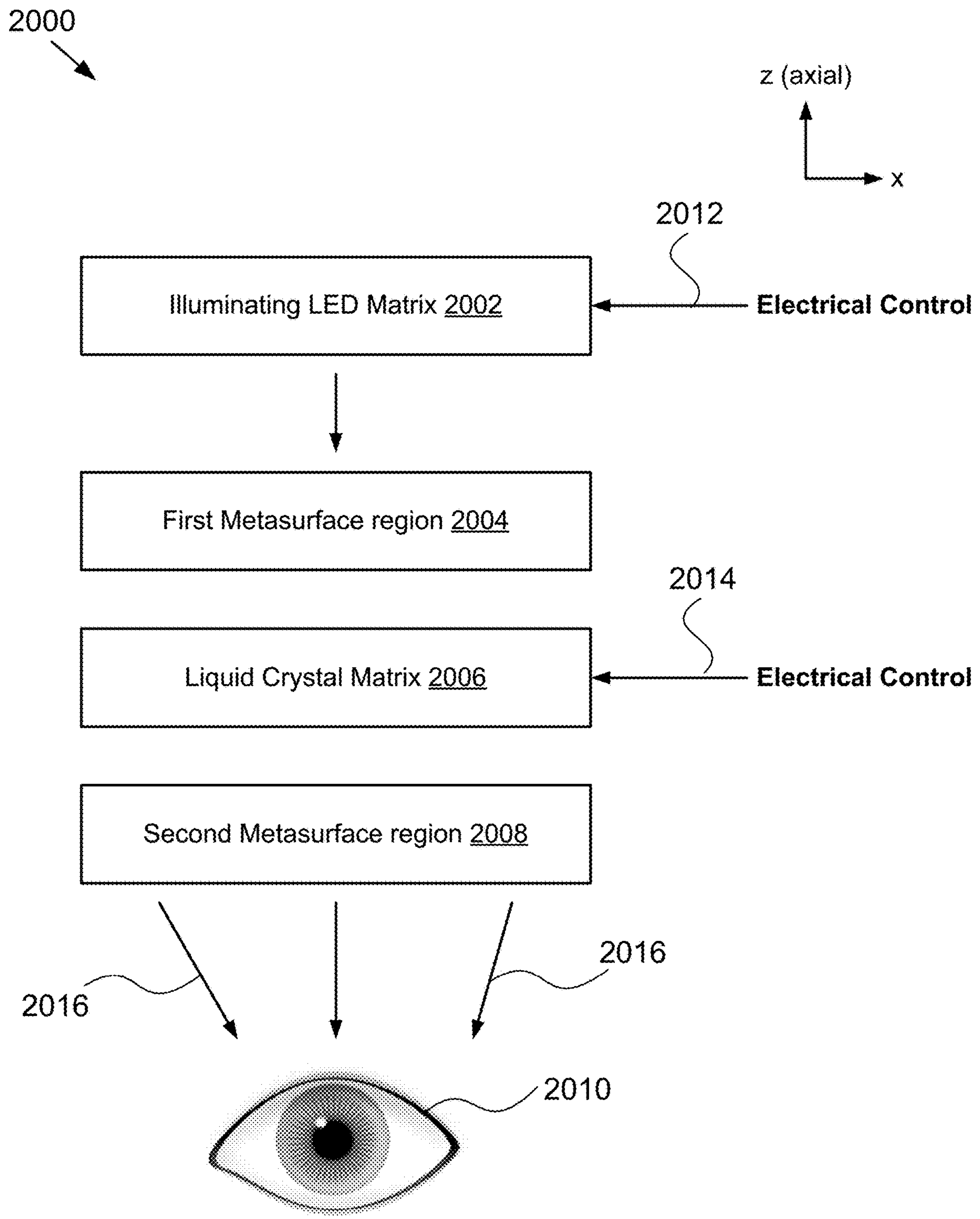
FIG. 20 is a block diagrams of a holographic display including the metasurface of the present disclosure.

Referring now to FIG. 20, a holographic display device 2000 including the metasurface 102 of the present disclosure is shown. The holographic display device 2000 comprises an illuminating light emitting diode (LED) matrix 2002, a first metasurface region 2004, a liquid crystal matrix 2006, and a second metasurface region 2008. The LED matrix 2002 is coupled to the signal line 2012 to receive electrical control signals. The electrically controlled LED matrix 2002 is a light source of active control that help was like to the top surface of the first metasurface region 2004. The first metasurface region 2004 is disposed below the LED matrix 2002 to process images that the LED matrix 2002 presents. Positioned beneath the first metasurface region 2004 is a liquid crystal matrix 2006. The liquid crystal matrix 2006 is independently controlled by signals applied to a signal line 2014 coupled to the liquid crystal matrix 2006. The liquid crystal matrix 2006 is positioned above a second metasurface region 2008. By further incorporating the electrically modulated liquid crystal matrix 2006, a holographic display can be formed, which emulates a 3D scene 2016 to the human eye 2010. The liquid crystal matrix 2006 and light sources 2002 can be modulated such that they express an image, with the liquid crystal matrix 2006 being modulated to encode depth and the source also being independently modulated to encode intensity. The first metasurface region 2004 and the second metasurface region 2008 based on the local polarization imparted by the actively controlled liquid crystal matrix 2006, map the corresponding light from the light sources 2002, which can be a matrix of organic light emitting diodes, to spots with wavefronts emulating those which would be produced by a point source at a chosen distance.

Figure 21A:
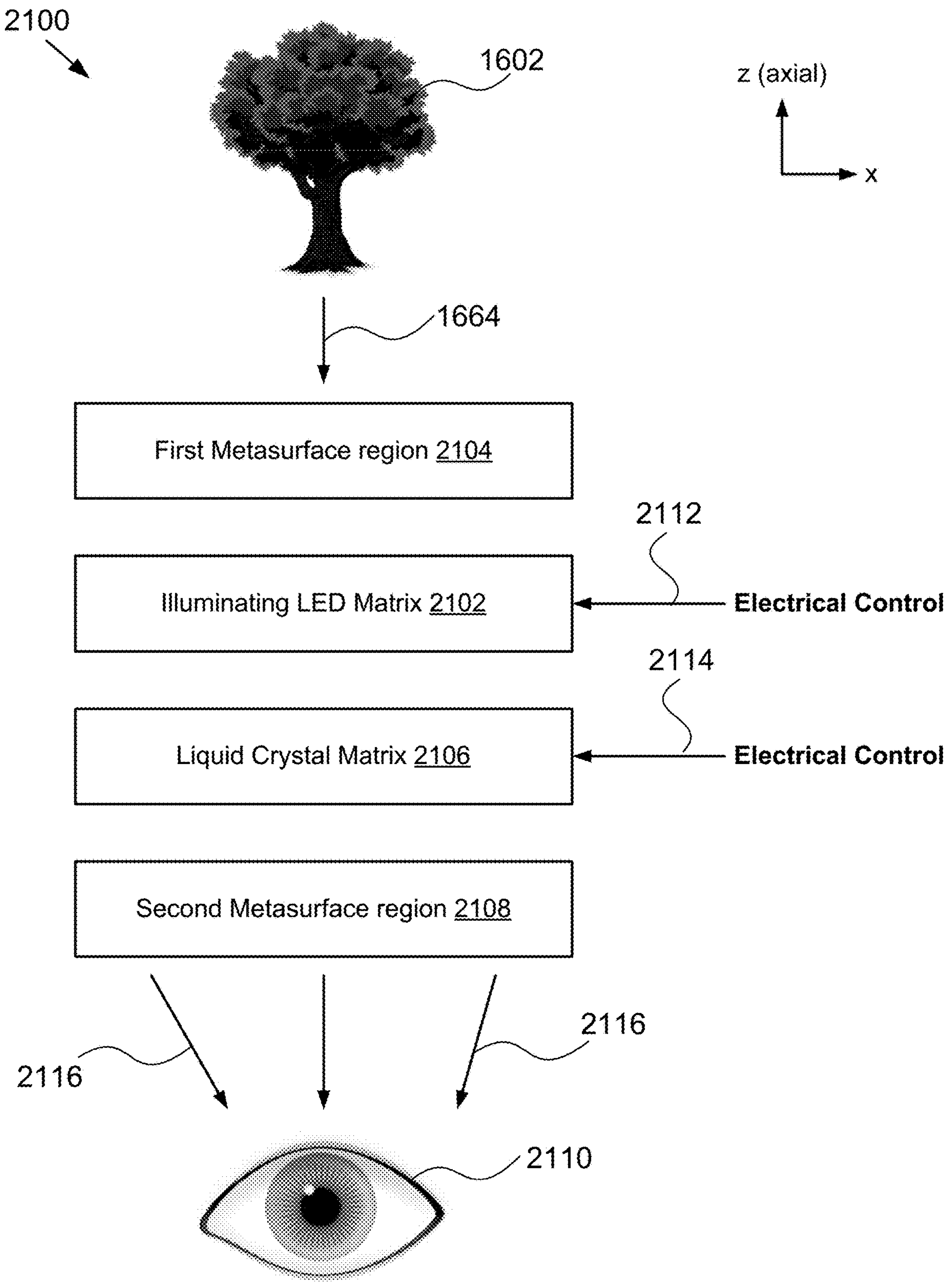
FIGS. 21*a*-21D are block diagrams of an augmented reality device including the metasurface of the present disclosure.
Figures 21B, 21C, 21D:
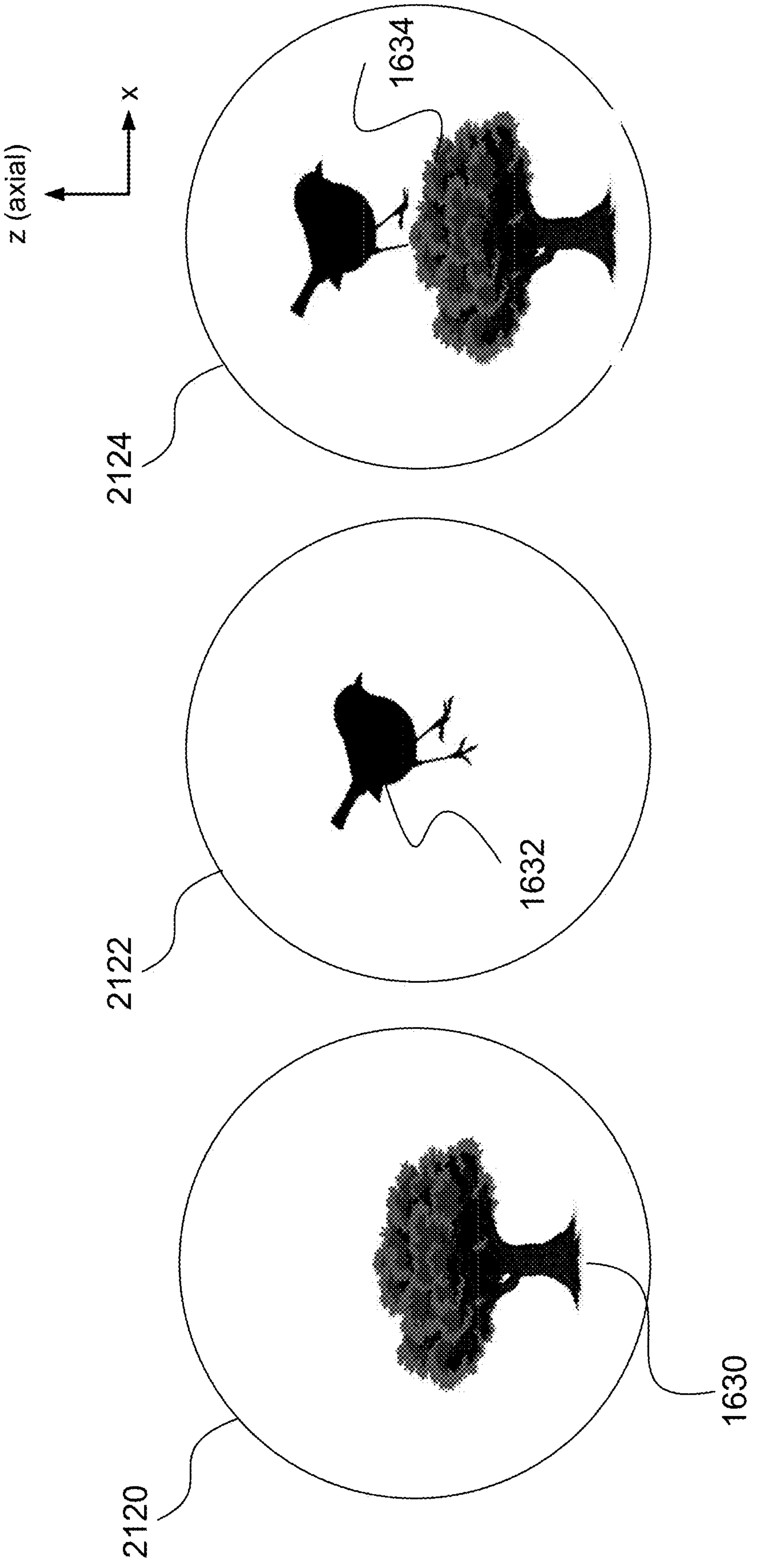

Referring now to FIGS. 21A-21D, an augmented reality device 2100 including the metasurface 102 of the present disclosure is shown. The augmented reality device 2100 comprises a first metasurface region 2104, an LED matrix 2102, a liquid crystal matrix 2106, and a second metasurface region 2108. The first metasurface region 2104 is positioned above the illuminating LED matrix 2102 which is positioned above a liquid crystal matrix 2106 which in turn is positioned above the seconds metasurface region 2108. The illuminating LED matrix 2102 is coupled to signal line 2112 to receive a first electrical control signal. Similarly, the liquid crystal matrix 2106 is coupled to signal line 2114 to receive an independent second electrical control signal. Using signal lines 2112 and 2114, the LED matrix 2102 and the liquid crystal matrix 2106 may be independently controlled, respectively. The first metasurface region 2104 has its top surface exposed to receive light 1664 representing a scene or object 1602. The second metasurface region 2108 as one or more spots on its bottom surface to produce light 2116 representing an augmented image. The second metasurface region 2108 is exposed and visible to the eye 2110 of the user. Essentially, device 2100 is a beam combiner that can be used for reality augmentation and augmented reality applications. The liquid crystal matrix 2102 and light sources 1664 can be modulated such that they express an image, with the liquid crystal matrix 2106 being used to encode depth and the source being used to encode intensity. A remote scene 1602 also exists which illuminates the device 2100. The metasurfaces 102 are based on the local polarization imparted by the actively controlled liquid crystal matrix 2106, map the corresponding light from the light sources 1602, which can be a matrix of organic light emitting diodes, to spots 104 with wavefronts emulating those which would be produced by a point source at a desired distance. Secondly, the metasurface 102 is designed to combine this light with the light from the remote illuminating scene. The result of this to a human eye 2110 looking at the second metasurface region 2108 is an emulated scene in which the desired 3D image, as encoded by the liquid crystal matrix 2106 and light sources 1664, is superimposed in 3D onto the illuminating scene. Referring now also to FIGS. 21B-21D, this can be seen more clearly. FIG. 21B shows an image 2120 of an object 1602 generated by the first metasurface region 2104. FIG. 21C shows an image 2122 within augmented object 1632 generated by the illuminating LED matrix 2102 in response to electrical control signals. FIG. 20 1D illustrates an augmented reality image 1634 generated by the second metasurface region 2108 and presented to the human eye 2110 of the user. As can be seen, the augmented reality image 1634 combines the images 2120 and 2122 from different components of the augmented reality device 2100.

Figure 22:
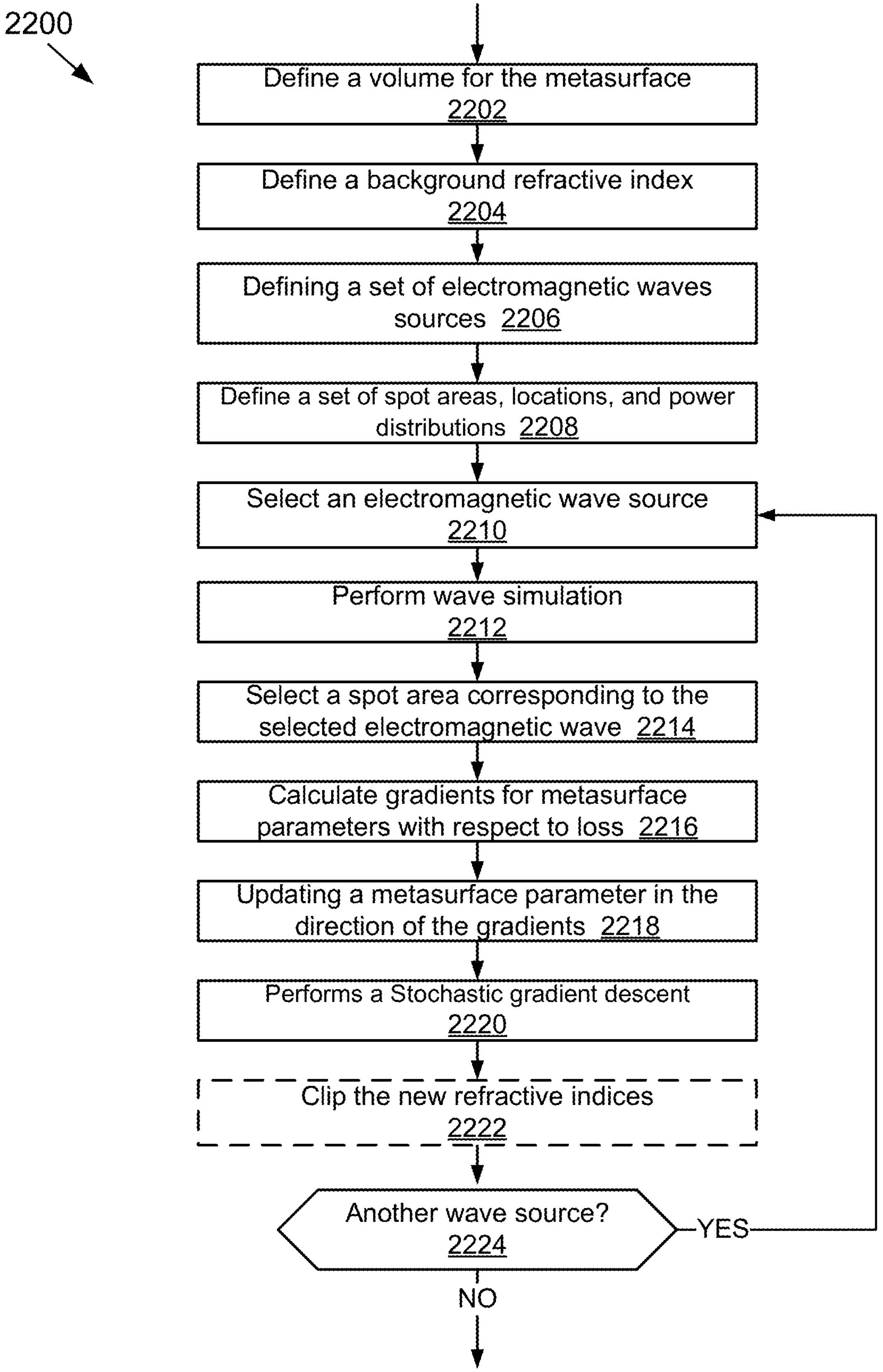
FIG. 22 is a flowchart of an example method for creating a metasurface.

Referring now to FIG. 22, one method 2200 for creating the metasurface 102 will be described. The method 2200 identifies, for a given set of incident waves and corresponding desired output spots, a viable spatial configuration of one or more material optical properties, such as refractive index, which realizes a specific complex (or complexes) of the structural optical properties previously described. When the complex (or complexes) is physically created in the metasurface 102, the metasurface 102 performs the described function. The method 2200 essentially defines a set of input waves paired with desired output spots. The method 2200 begins by defining 2202 a volume for the metasurface 102. For example, consider a rectangular volume which in a particular instance might be 100 μm by 100 μm by 100 μm. This volume is meshed using a Yee grid, which comprises two fine voxel grids in which one grid represents electric field and the other magnetic field. In some implementations, the two grids are offset by ½ of a voxel side length for the x, y, and z directions. More specifically, the voxels may be square, with side lengths equal to the shortest wavelength in the design set divided by 20. The method 2200 continues to define 2204 a background reflective index. For example, the background refractive index may be defined as 1.0. In a portion of the volume, a sub-volume in the shape and size of the desired metasurface 102 is used and meshed into a voxel grid in which the side length of each voxel is smaller than the smallest desired feature of the desired metasurface 102. This voxel grid is initialized to a value or values, such as 1.0. The method 2200 continues by defining 2206 a set of sources of electromagnetic waves. A set of electromagnetic wave sources are defined such that each source in the set produces a wave corresponding to an input wave in the design set. Next, the method 2200 defines 2208 a set of spot areas, locations, and power distributions for the metasurface 102. The set of spot areas, locations, and power distributions corresponds to each the desired output spot characteristics for the input waves from block 2206. The method 2200 continues to block 2210 to select one of the electromagnetic wave sources defined in block 2206. The method 2200 then performs 2212 a wave simulation for the electromagnetic wave source selected in block 2210. The simulation may be a full wave simulation, a time domain simulation, or a frequency domain simulation. For example, for the electromagnetic wave source selected, a differentiable, complex-valued Finite Difference Time Domain simulation may be performed using the previously defined grids. Also, for example, a machine learning model which has been trained using supervised methods to take refractive indices or equivalent values as input and predict electromagnetic field values may be used. This training may be performed using the finite difference time domain method to produce input-output pairs of training data, for instance by simulating metamaterials with randomized parameters, then using supervision methods to train the model on this training data. Using the so-trained model, the machine learning model is treated as a differentiable simulator and queried differentiably for the electromagnetic fields corresponding with the metasurface described by the previously defined grid. The final electric and magnetic powers are saved and used to calculate the complex Poynting vector at each simulation location, and the real part of this is taken to yield the average power at equilibrium at each simulation location. Next, the method 2200 selects 2214 a spot area corresponding to the currently chosen electromagnetic wave source. In some examples, the difference between its current power distribution and the desired power distribution is taken, absolute valued, and summed into a loss value. In some examples, the absolute value of the power distribution may be squared before summation, or other functions such as contrastive losses, power ratios, transmission maximization, Strehl ratios, or a combination of these may be used to calculate the loss. Next, the method 2200 calculates 2216 gradients for the metasurface parameters with respect to loss. For example, a backpropagation is performed using the loss value in conjunction with the differentiable simulator, calculating the derivatives of the loss value with respect to the refractive index at each of the voxels of the metasurface 102. In another example, an adjoint method is used to calculate the derivatives of the loss value with respect to the refractive index at each of the voxels of the metasurface 102, performing an adjoint simulation and using this in conjunction with the existing simulation to calculate these derivatives. The method 2200 continues by updating 2218 one or more metasurface parameter(s) in the direction of the gradients. Then, the method 2200 next performs 2220 a form of gradient descent. For example, a Stochastic gradient descent may be performed on the refractive indices at each voxel of the metasurface 102 using the calculated gradients. Next, the method 2200 clips 2222 the new refractive indices of the metasurface 102 to fall within a desired range, for example between 1.0 and 3.0. As illustrated in FIG. 22, block 2222 is optional and is depicted with dashed lines to indicate such. Then, the method 2200 determines 2224 whether there has been another wave source that has not been processed. If so, the method 2200 returns to block 2210 to repeat this blocks 2210 to 2222 for each input wave-output spot(s) pair in the set. On the other hand, if there are no other electromagnetic waves sources the method 2200 ends. While FIG. 22 depicts the method 2200 as a serial process in which blocks 2210 to 2222 are repeatedly for each wave source, it should be understood that, in some implementations, multiple wave sources may be processed in parallel in blocks 2210 to 2222. In some implementations, the method 2200 may also determine whether the loss value for the simulation of each of these pairs reaches a satisfactorily low value, and if so completes. It should be further noted that when the metasurface 102 is composed of two materials (binary in the sense that it can have either a low refractive index or high refractive index at each point), then the method 2200 may include a final binarization process block 2224 in which all the values are pushed to be one or the other refractive index, whichever is closer.

In a related method, a machine learning model can be used to perform the metasurface design in a different way. In this method, the machine learning model is trained using supervised methods such that it predicts optimized devices given a set of wave inputs and their corresponding desired set of spots. This training may be performed by using the finite difference time domain method to produce input-output pairs of training data, for instance by simulating metamaterials with randomized parameters, saving the wave inputs and the corresponding electromagnetic field responses on the second surface of the metasurface, then using supervision methods to train the model on this training data. For a given design process, this so-trained model is then queried with the desired sets of wave inputs and corresponding spots. The model then predicts an optimized set of refractive indices which describe an optimized metamaterial which will closely perform the desired mapping of sets of wave inputs to corresponding spots.

Figure 23:
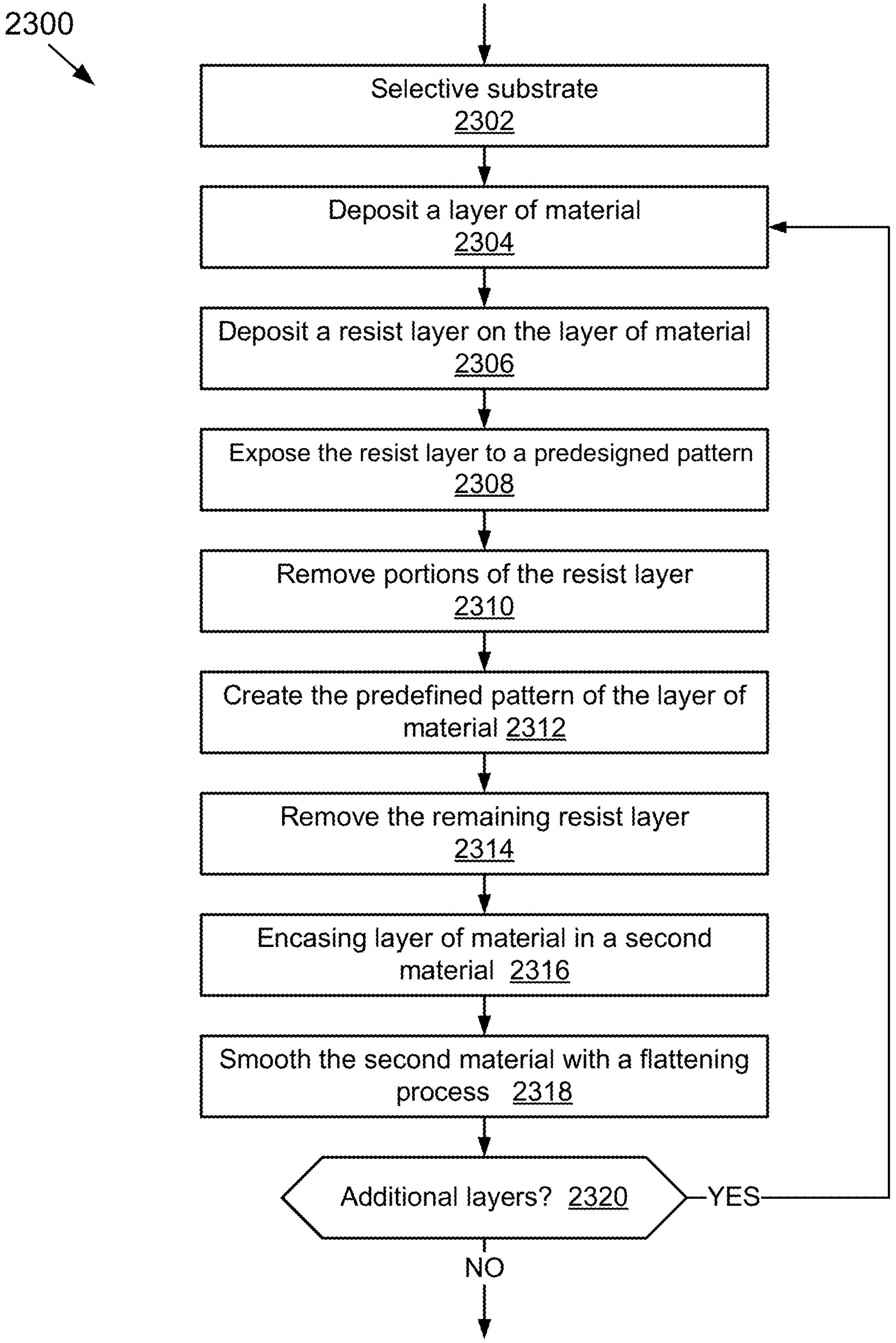
FIG. 23 is a flowchart of an example method for manufacturing a metasurface.

Referring now to FIG. 23, one example method 2300 for manufacturing the metasurface 102 will now be described. The method 2300 begins by selecting 2302 a substrate. For example, the substrate may be fused silica, clear plastic or another clear glass, crystal, or polymer material, or a composite of these. In some instances, the substrate will be a flat, thin material perhaps 1 mm thick, often a circular disk. Several different metasurfaces 102 may be patterned at different locations on the same substrate, which can then be cut into pieces such that every piece is a separate metasurfaces 102. Next, the method 2300 deposits 2304 a layer of material on the substrate. In some implementation the layer of material is a material with a high refractive index above 2. For example, the first layer of material may be Tantalum Pentoxide (Ta2O5), Silicon Nitride or mononitride (SiNx), Gallium Nitride (GaN), Niobium Pentoxide (Nb2O5), or Titanium Dioxide (TiO2). It should be understood that when block 2304 is performed after block 2302, a first layer of material is deposited on the substrate. However, when block 2304 is performed after block 2320, a new layer of material is deposited on the first layer of material or the prior layer of material in the cases where there are more than two layers. The layer of material may be deposited using physical vapor deposition, chemical vapor deposition, spin coating, or plasma-enhanced vapor deposition. The method 2300 continues by depositing 2306 a resist layer on top of the layer of material. For example, the resist layer may be electron-beam resist or photoresist on top of the layer of material. Next, the method 2300 exposes 2308 the resist layer to a predesigned pattern. Some examples of predesigned patterns were described above with reference to FIGS. 1C to 1E. For example, an electron-beam or photomask may be used to expose the resist layer to the predetermined pattern. The method 2300 continues by removing 2310 portions of the resist layer that are not part of the predetermined pattern. For example, the method 2300 may either deposit a layer of etching mask, for example, aluminum oxide ($Al_2O_3$) or lift off the undeveloped portions of the photomask. Next, the method 2300 creates 2312 the predefined pattern of the layer of material on the substrate, and in subsequent layers on the preceding layer. For example, the method 2300 may use an etching process, e.g., a fluorine-based reactive ion etch or plasma etch, to selectively etch the first layer of material into the predesigned pattern. Then the method 2300 removes 2314 the remaining resist layer etching mask, for example, using a chemical bath, if the etching mask was deposited. The method 2300 continues by encasing 2316 the first layer of material in a second material. For example, the pattern layer of the first material may be encased in a second material. The second material preferably has a low refractive index. The material may be a clear glass like silica or a clear plastic polymer, or something similar. In some implementations, the encasing may be done by process such as spin coating, physical vapor deposition, chemical vapor deposition, or plasma-enhanced vapor deposition. Next the method 2300 smoothens 2318 the second material with a flattening process. For example, chemical-mechanical polishing may be used. This produces a new flat surface in which the patterned high refractive index material is encased in a low refractive index material. Then method 2300, then determines 2320 whether the metasurface 102 will have more than one layer. If so, the method 2300 returns to block 2304 to add additional layers is necessary. For example, the method 2300 may loop several times for several layers as described for the devices in FIGS. 1L to 1P above. If not, the method 2300 has completed manufacturer of the metasurface 102.

While at least one example implementation has been presented in the foregoing detailed description of the technology, it should be appreciated that a vast number of variations may exist. It should also be appreciated that an exemplary implementation or exemplary implementations are examples, and are not intended to limit the scope, applicability, or configuration of the technology in any way. Rather, the foregoing detailed description will provide those skilled in the art with a convenient road map for implementing an example implementation of the technology, it being understood that various modifications may be made in a function and/or arrangement of elements described in an exemplary implementation without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware implementation, an entirely software implementation (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of the order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A device for processing electromagnetic waves, the device comprising:

a first metasurface having a first surface and a second surface, the first surface of the first metasurface receiving the electromagnetic waves, the first metasurface defining a complex of structural optical properties; and wherein the first metasurface nonlocally maps the electromagnetic waves at the first surface to a spot directly on the second surface by transporting and processing electromagnetic waves internally with purpose-designed nonlocal properties of the first metasurface; and wherein the first metasurface comprises a first material and a second material, the first material having a refractive index different than the second material.

2. The device of claim 1, wherein the complex of structural optical properties includes 2 or more from a group of: sub-wavelength material-wave interaction; super-wavelength material-wave interaction; internal guidance; resonance; and one other effect.

3. The device of claim 1, wherein the first material of the first metasurface is disposed volumetrically.

4. The device of claim 1, wherein the spot has a shape of a circle, oval, lenticular shape, rectangle, square or a polygon.

5. The device of claim 1, wherein:

the electromagnetic waves have a first wave set and a second wave set;

the first metasurface nonlocally maps the first wave set to the spot on the second surface; and the first metasurface nonlocally maps the second wave set to a second spot on the second surface.

6. The device of claim 1, wherein the first metasurface also nonlocally maps the electromagnetic waves at the first surface to a second spot on the second surface.

7. The device of claim 1, wherein the first material and the second material are discrete, the second material is patterned in the first material, and a pattern is one from a group of: a grid of cylinders, an unstructured arrangement, and a plurality of rings.

8. The device of claim 1, wherein the first material and the second material are a continuous structure with gradients of refractive indices between a first refractive index of the first material and a second refractive index of the second material.

9. The device of claim 1, further comprising a sensor, the sensor positioned to sense signal from the spot of the first metasurface.

10. The device of claim 9, wherein the sensor is one from a group of: a photovoltaic device, a photovoltaic cell, a photosensitive device, a spectrometer, a distance sensor, a polarization sensor and an image capture device.

11. The device of claim 9, further comprising a support mechanism to hold the first metasurface in a fixed position relative to the sensor with the second surface of the first metasurface and the spot facing the sensor.

12. The device of claim 9, further comprising a position adjuster to hold the first metasurface in different positions relative to the sensor with the second surface of the first metasurface and the spot facing the sensor, the position adjuster capable of moving the second surface and the spot of the first metasurface to different distances from the sensor.

13. The device of claim 9, wherein the first metasurface is affixed to the sensor.

14. The device of claim 9, wherein the sensor is an image sensor and wherein the first metasurface is configured to produce images.

15. The device of claim 9, further comprising a digital computing device, wherein data from the sensor is transmitted to and processed by the digital computing device.

16. The device of claim 15, wherein the processing includes a machine learning model, and wherein the machine learning model and metasurface are formed or trained such that, when used together, they are together suitable for a predefined sensing task.

17. The device of claim 1, wherein the first metasurface is configured to conditionally or flexibly redirect and delocalize light based on one or more from a group of wavelength, polarization, incidence angle, and wavefront shape.

18. The device of claim 1, further comprising a second metasurface having a first surface and a second surface, the first surface of the second metasurface receiving electromagnetic waves, the second metasurface defining a second complex of structural optical properties, wherein the device nonlocally maps the electromagnetic waves received by the first surface of the first metasurface to a spot on the second surface of the second metasurface.

19. The device of claim 18, further comprising a layer positioned between the first metasurface and second metasurface, and wherein the layer is one or more from a group of: a uniform supporting region, a liquid crystal matrix, a nonlinear optical component, and an illuminating LED matrix.

20. The device of claim 19, wherein the layer positioned between the first metasurface and second metasurface includes the liquid crystal matrix and wherein electrically modulating the liquid crystal matrix modulates a depth at which the device is focused.

21. The device of claim 1, wherein the device is part of one from a group of a smartphone, a computer, and a digital system.

22. The device of claim 1, wherein the second material is vacuum or air.

23. The device of claim 1, wherein the first metasurface is formed from a stack of discrete layers.

24. The device of claim 23, wherein the thickness of at least one layer varies across its extent.

25. The device of claim 23, wherein the stack of discrete layers comprises at least one substrate.

26. The device of claim 25, wherein patterned layers are etched into the at least one substrate.

27. The device of claim 25, wherein the at least one substrate is formed from silica or glass.

28. The device of claim 1 wherein materials of the first metasurface are disposed in a porous supporting material.

29. The device of claim 1, further comprising an aperture.

30. The device of claim 1, wherein the transporting and processing of electromagnetic waves internally is accomplished primarily by diffraction.

31. The device of claim 1, wherein the distribution of intensity within the spot region is one or more from a group of: uniform, Gaussian, and an Airy disk.

32. A method for manufacturing a metasurface, the method comprising:

selecting a substrate;

creating a defined pattern of a first material on or in the substrate;

encasing the defined pattern of the first material with a second material; and wherein the defined pattern of the first material has a refractive index different than the second material, and the encasing forms a volumetric metasurface that nonlocally maps electromagnetic waves at a first surface of the volumetric metasurface to a spot directly on a second surface of the volumetric metasurface by transporting and processing electromagnetic waves internally with purpose-designed nonlocal properties of the metasurface.

33. The method of claim 32, further comprising:

depositing a layer of the first material on the substrate.

* * * * *